United States Patent

Kakemura et al.

[11] Patent Number: 5,968,616
[45] Date of Patent: Oct. 19, 1999

[54] COMPOUND CONTAINER

[75] Inventors: Toshiaki Kakemura; Katsuyuki Ohno; Terutaka Iwasaki; Toshikazu Katoh; Takekuni Seki; Keiko Nakamura, all of Tokyo, Japan

[73] Assignee: Toppan Printing Co., Ltd., Tokyo, Japan

[21] Appl. No.: 08/524,282

[22] Filed: Sep. 6, 1995

[30] Foreign Application Priority Data

| Sep. 6, 1994 | [JP] | Japan | 6-212537 |
| Sep. 6, 1994 | [JP] | Japan | 6-212538 |
| Oct. 28, 1994 | [JP] | Japan | 6-265342 |
| Nov. 10, 1994 | [JP] | Japan | 6-276411 |
| Feb. 16, 1995 | [JP] | Japan | 7-027985 |
| Mar. 31, 1995 | [JP] | Japan | 6-075499 |
| Mar. 31, 1995 | [JP] | Japan | 7-099782 |
| Apr. 17, 1995 | [JP] | Japan | 7-090505 |
| Jun. 6, 1995 | [JP] | Japan | 7-139606 |

[51] Int. Cl.$^6$ ............ B65D 25/54; B65D 17/28
[52] U.S. Cl. ............ 428/34.2; 428/34.3; 428/35.2; 428/35.4; 428/35.7; 428/36.6; 428/36.7; 428/36.91; 428/43; 428/198; 428/903.3; 428/913; 428/1; 215/12.1; 229/162; 229/240; 229/237
[58] Field of Search ............ 428/34.2, 34.3, 428/34.5, 34.6, 34.7, 35.2, 35.4, 35.7, 1, 36.6, 36.7, 93.3, 36.91, 913, 198, 43; 215/12.1; 229/162, 237, 240; 222/105; 220/461, 462

[56] References Cited

U.S. PATENT DOCUMENTS

| 3,871,568 | 3/1975 | Bahler | 220/410 |
| 4,590,131 | 5/1986 | Yazaki et al. | 428/36.6 |
| 4,596,696 | 6/1986 | Scoville, Jr. | 422/61 |
| 4,608,286 | 8/1986 | Drotoishi et al. | 428/516 |
| 4,696,840 | 9/1987 | McCullough et al. | 220/462 |
| 4,943,458 | 7/1990 | Buechler | 428/35.7 |
| 4,953,750 | 9/1990 | Abernathy | 222/1 |
| 5,012,972 | 5/1991 | Nordstrom et al. | 229/162 |
| 5,344,045 | 9/1994 | Richter et al. | 428/35.2 |
| 5,366,102 | 11/1994 | Bergner et al. | 215/12.1 |
| 5,435,452 | 7/1995 | Nishigami et al. | 215/12.1 |
| 5,470,016 | 11/1995 | Ljungstrom et al. | 229/101.1 |
| 5,609,293 | 3/1997 | Wu et al. | 229/3.5 R |

*Primary Examiner*—Rena L. Dye
*Attorney, Agent, or Firm*—Armstrong, Westerman, Hattori, McLeland & Naughton

[57] ABSTRACT

This invention relates to a compound container which can completely be separated into paper and plastics upon abandonment thereof, whose volume can substantially be reduced upon abandonment, which permits the reduction of the amounts of paper and plastics to be used, which exhibits excellent resistance to falling impact, which has a high oxygen gas barrier properties or water vapor barrier properties. This compound container comprises an inner container of a plastic and an outer container of paper or mainly comprising paper, wherein the inner container is produced by blow-molding or stretch blow-molding a resin composition comprising at least two resins including a barrier resin.

200 Claims, 19 Drawing Sheets

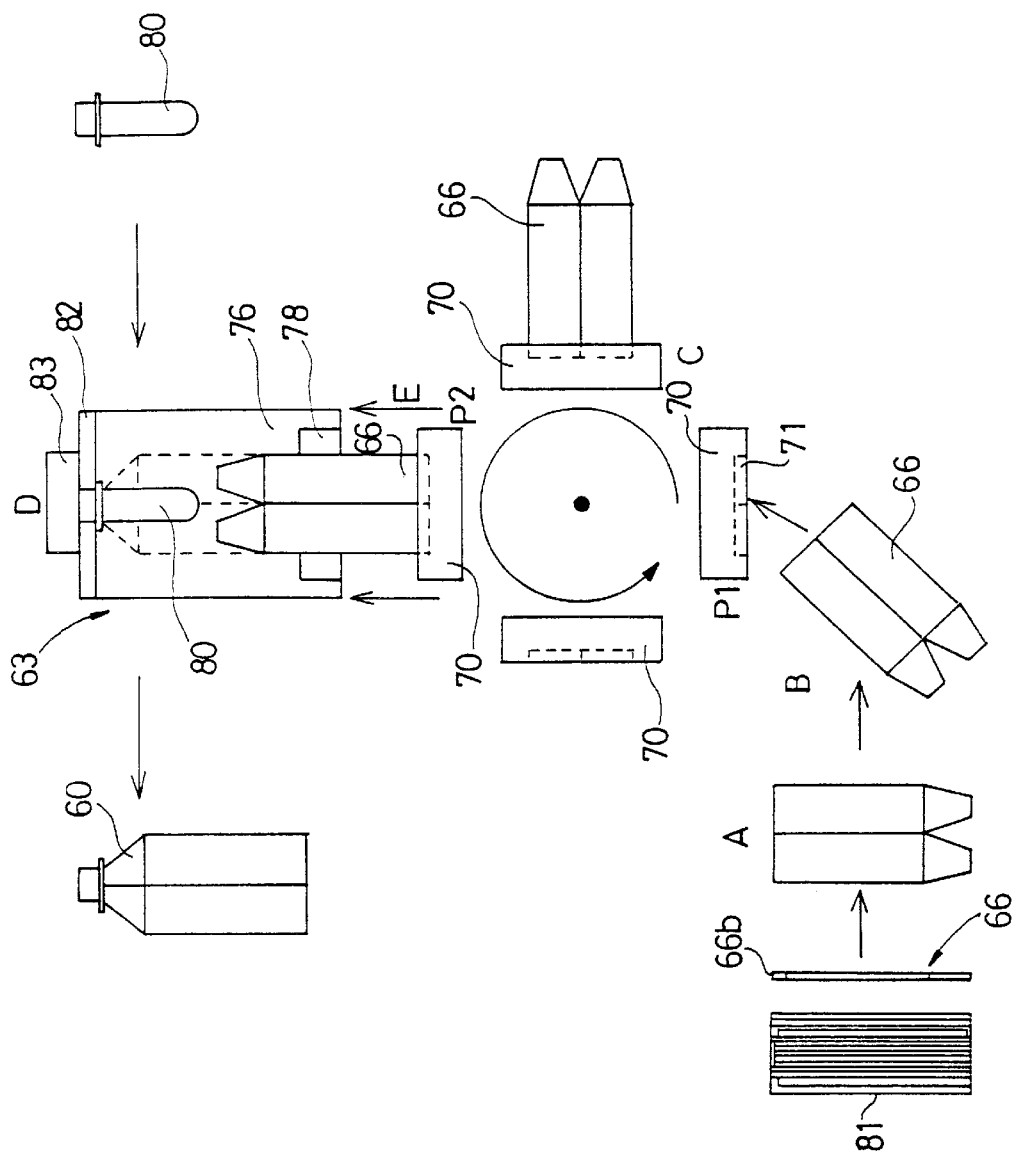

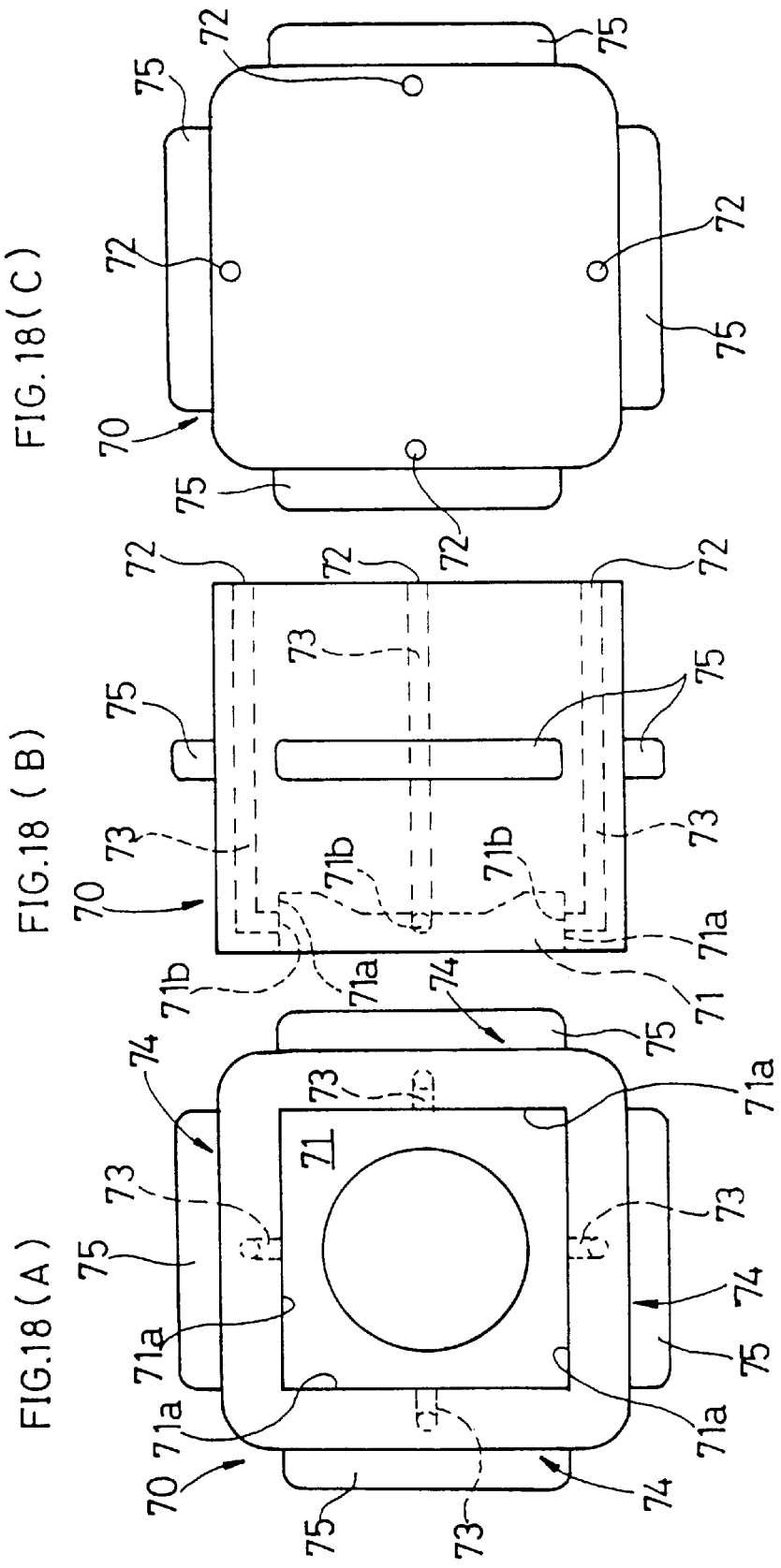

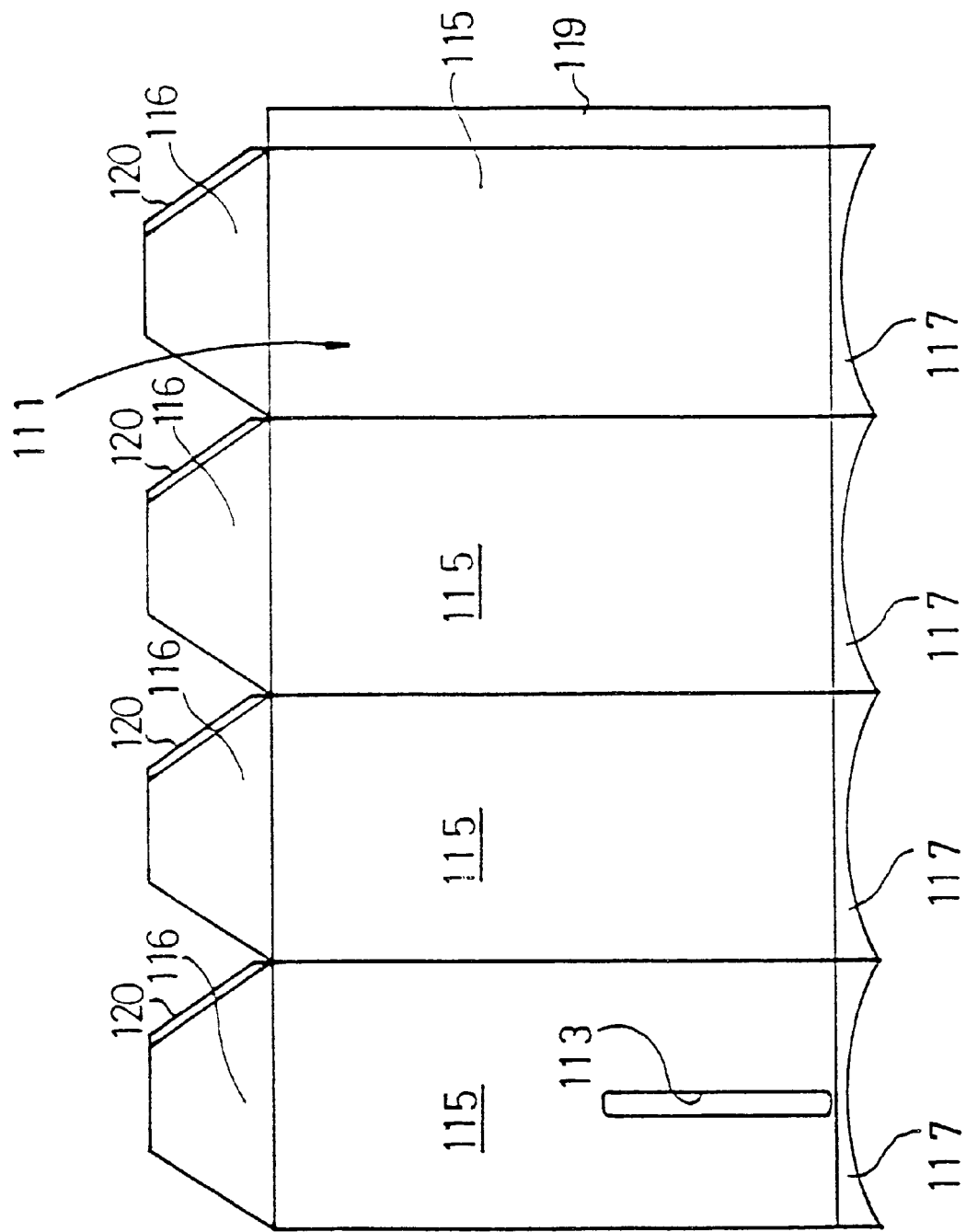

COMPOUND CONTAINER

BACKGROUND OF THE INVENTION

The present invention relates to a compound container which comprises an inner container of a plastic and an outer container of paper.

PRIOR ART

There has been a demand for reducing the amount of plastics used as the environmental disruption has become of major interest lately. As one of the measures, there has widely been used a compound container which comprises an outer container of paper and a plastic bag-like container which is provided with an opening for pouring and is accommodated in the outer container. This compound container is light-weight and can be folded compact when contents are not accommodated therein. Therefore, the compound container can easily be transported and permits the separate abandonment of paper and plastics.

Such compound containers are disclosed in, for instance, Japanese Un-Examined Utility Model Publication Nos. Sho 58-151570 and Sho 58-136468.

In these compound containers, the thickness of the inner container should substantially be reduced for the purpose of reducing the volume thereof upon its abandonment. The inner container of the compound container is prepared from a polyethylene terephthalate resin alone and the thickness of the side wall thereof is thin on the order of 0.02 to 0.025 mm.

However, such a thin polyethylene terephthalate resin is insufficient in the oxygen barrier properties and water vapor barrier properties and therefore, it is insufficient in the contents-keeping quality. For instance, it is reported that the oxygen barrier properties of a biaxially oriented film of polyethylene terephthalate having a thickness of 0.025 mm range from 40 to 50 $cm^3/m^2$ ·day·etm and the water vapor barrier properties thereof range from 5 to 8 $g/m^2$·day·atm. Moreover, a container of polyethylene terephthalate has advantages of high transparency, light-weight and high safety, while it is inferior in shading properties to glass bottles and metallic cans. For this reason, PET bottles suffer from a problem of change in color tone such as decolorization and discoloration; and deterioration depending on the kinds of contents thereof. In particular, when the resin is used for preparing a container for carbonated beverages, the carbon dioxide gas may be released from the contents and therefore, such a container is not suitable for long term storage of contents.

There have also been widely used a container of paper whose surface is coated with polyethylene and a paper container having a multi-layered laminate structure which comprises a paper container and a laminated aluminum foil for the purpose of improving the content-protecting function thereof. However, such conventional compound containers are disadvantageous in that it is difficult to separate paper from plastics, that the residual quantity of contents cannot be confirmed and that the degree of deterioration of the contents cannot be confirmed on the basis of, for instance, the color of the contents. There has also been known a container which is provided with a window on the wall of the outer container so that the side wall of the inner container can be seen from the outside, but the side wall of the inner container cannot easily be observed since it lies deep in the outer container.

In addition, a compound container which comprises an outer container and a container having a small thickness and accommodated in the outer container is disclosed in Japanese Laid-Open Patent No. Sho 56-150763. This compound container is produced by preparing the outer container in advance and then inserting a thin plastic container into the outer container. The container of this type is advantageous in that it is light-weight, can be folded compact when contents are not accommodated therein and, therefore, the compound container can easily be transported and permits the reduction of the volume upon abandonment thereof.

However, only the outer container must serve to ensure the strength of the compound container since the inner container is not completely adhered to the outer container, but is adhered thereto only at the opening part. It is thus inevitable to increase the thickness of the paper container (outer container) to some extent. For this reason, the overall amount of the material to be used cannot substantially be reduced.

Moreover, the production of the inner container requires many steps since it is produced by first adhering the peripheral portion of a single layered or multi-layered film through, for instance, heat sealing, then forming an opening for pouring through, for instance, injection molding and further connecting the opening to the heat-sealed film by fusion bonding. In addition, the heat-sealed portion of the film edges and the fused portion at the opening are in general inferior in the impact resistance and accordingly, the bag is often damaged by falling impact.

Moreover, there has been proposed a method for solving the foregoing problems concerning the falling impact strength and the number of production steps. This method for preparing a compound container comprising an outer container and an inner container comprises the steps of placing, in a mold for blow molding, an outer container mainly comprising paper in which an adhesive is applied onto the inner surface; then introducing a preform heated at a molding temperature and then blow molding the preform.

A problem arises when contents are charged in the compound container. More specifically, contents such as juices and alcoholic drinks are charged in a container while heating at a temperature for sterilizing the container and then the container is closed with a cap. However, as the contents is cooled with the lapse of time, the pressure in the container is reduced and accordingly, it is inwardly deformed and the appearance thereof as a commodity is impaired. As a measure for solving the problem, the trunk part thereof may be designed in such a manner that it is provided with a convex surface outwardly projected, but it is impossible to prepare a compound container comprising an outer container and an inner container in this case.

In regard to the adhesive for adhering the inner container to the outer container, if the adhesive strength thereof is too strong, it is difficult to separate the compound container into paper and plastics upon abandonment thereof and even if the compound container can be separated into paper and plastics, paper remains on the surface of the plastics. On the other hand, if it is too weak, paper is easily peeled off during using the compound container.

In regard to reclamation and reuse, containers of paper have widely been reclaimed and reused, but the use of reclaimed plastic containers spoils the beauty of the container, results in color fade and discoloration thereof since foreign substances such as carbonaceous materials are mixed in and the reclaimed resin is contaminated.

SUMMARY OF THE INVENTION

The present invention has been completed to solve the foregoing problems associated with the conventional techniques and accordingly, it is an object of the present invention to provide a compound container which can completely be separated into paper and plastics upon abandonment thereof, whose volume can substantially be reduced upon abandonment, which permits the reduction of the amounts of paper and plastics to be used, which exhibits excellent resistance to falling impact, which has a high oxygen gas barrier properties or water vapor barrier properties, whose number of production steps can be reduced, which is not deformed by pressure reduction even when contents are charged during hot, which does not cause peeling off of the paper during use, which permits confirmation of the contents from the outside, in which reclaimed plastic material can be used and whose beauty is not spoiled.

BRIEF DESCRIPTION OF THE DRAWINGS

FIG. 17 is a flow diagram showing an example of the process for producing the compound container according to an embodiment of the present invention.

FIG. 18(A) is a plan view of a part for molding the bottom portion of the split mold used in the production process shown in FIG. 17, FIG. 18(B) is an elevational view thereof and FIG. 18(C) is a bottom view thereof.

FIG. 27(*b*) is an extend elevation of the outer container according to the embodiment Ver 8.2 of the present invention.

FIG. 27(*c*) is an extend elevation of the outer container according to the embodiment Ver 8.3 of the present invention.

FIG. 27(*d*) is an extend elevation of the outer container according to the embodiment Ver 8.4 of the present invention.

FIG. 27(*e*) is an enlarged detail of the adhesive coated in a stripe-like pattern shown in FIG. 27(*d*).

FIG. 27(*f*) is an extend elevation of the outer container according to the embodiment Ver 8.5 of the present invention.

FIG. 27(*g*) is an extend elevation of the outer container according to the embodiment Ver 8.6 of the present invention.

FIG. 31 is an extend elevation showing the outer container of the compound container shown in FIG. 29.

EMBODIMENTS
(Japanese Patent Application Serial No. Hei 6-212537)
First Embodiment A first embodiment of the present invention will hereinafter be described in detail.

Figure 1:
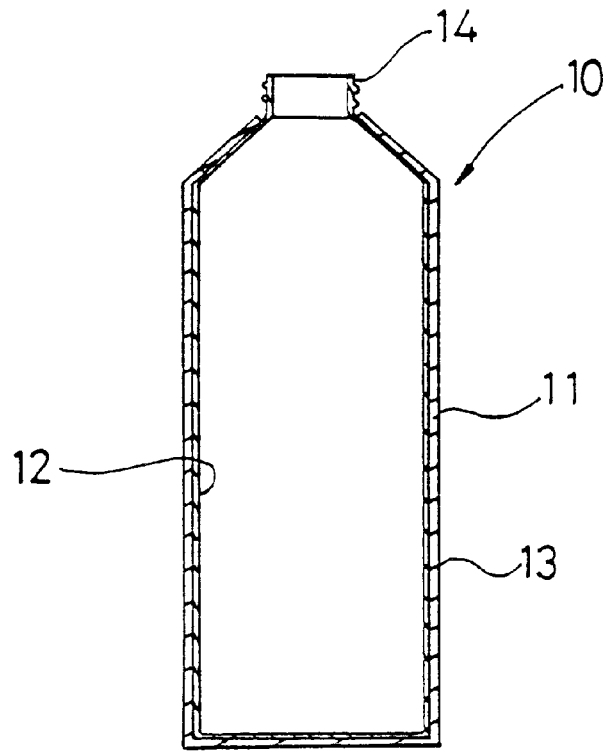
FIG. 1 is a cross sectional view illustrating an example of the compound container according to a first embodiment of the present invention.

In FIG. 1 which shows an embodiment of multi-layered plastic container according to the present invention, the reference numeral 10 represents a compound container, 11 an outer container, 12 an inner container, 13 a trunk part, 14 an opening for pouring contents present in the compound container, 15 a turning portion and 16 a concave portion. The compound container is composed of the outer container 11 which mainly comprises paper and an inner container 12 of a plastic which is accommodated in the outer container 11. The inner container 12 comprises the trunk part 13 and the opening 14 for pouring which are monolithically molded through blow molding.

An important characteristic property of the compound container 10 of the present invention resides in that the thickness of the outer container 11 mainly comprising paper is not less than 2.5 times and preferably 2.5 to 5 times the average thickness of the trunk part of the plastic inner container 12. This is because if the thickness of the outer container 11 is less than 2.5 times that of the inner container 12, i.e., the thickness of the inner container 12 is too thick, the rigidity of the inner container 12 is high and the volume of the resulting compound container cannot sufficiently be reduced upon abandonment thereof, while if the thickness of the outer container 11 exceeds 5 times that of the inner container 12, i.e., the outer container 11 is too thin, the resulting compound container 10 is insufficient in the mechanical strength. These knowledges are derived from the results of experiments performed by the inventors of this invention.

The inner plastic container 12 is produced by the blow molding in this embodiment, but if it is produced by the stretch blow molding, the plastic molecules are oriented in the direction of orientation and accordingly, the mechanical strength of the inner container 12 is substantially improved.

Examples of materials suitably used in the stretch blow molding are polyethylene terephthalate resins, polypropylene resins, resins each having a high nitrile content, polystyrene resins, polyvinyl chloride resins and polycarbonate resins. Among these, polypropylene resins are particularly preferred because of their good stretch blow-moldability, excellent water vapor barrier properties and hygienic qualities. Moreover, the polypropylene resins may be copolymers comprising ethylene moieties or may comprise a nucleating agent for crystallization.

The outer container 11 and the inner container 12 can be converted into a compound container by forming the inner container 12 through the blow molding and then inserting into the outer container 11 in the subsequent step, or by placing the outer container 11 in a mold for the blow molding and then blow-molding the inner container 12 in the mold.

If the contents to be accommodated In the inner container 12 are those susceptible to oxygen or those from which carbon dioxide gas is easily released such as carbonated beverages, the inner container 12 desirably comprises a single layer of a material excellent in gas barrier properties or has a multi-layered structure which comprises at least one layer of a material excellent in gas barrier properties.

Examples of materials having excellent gas barrier properties usable herein are polyamide resins, saponified products of ethylenevinyl acetate copolymer resins and resins having a high nitrile content.

If accommodating, into the compound container, contents which are apt to easily lose their moisture or absorb water vapor, the inner container may be formed from a material excellent in water vapor barrier properties. As such materials excellent in water vapor barrier properties, there may be used, for instance, non-crystalline resins obtained by copolymerizing cyclic olefins and ethylene.

The foregoing first embodiment of the present invention will be described in more detail with reference to the following Examples and Comparative Examples.

EXAMPLE 1

An inner container 12 having an average thickness of the trunk part of 0.2 mm and an inner volume of 1000 ml was formed by direct blow-molding a high density polyethylene resin. Then an outer container 11 produced from manila board having a thickness of 0.7 mm was fitted to the outside of the inner container to give a compound container 10 shown in FIG. 2.

The compound container 10 is a cylinder having the upper and lower open ends during use and has a structure in which the turning portion 6 at the upper end of the cylinder is fitted and secured to a concave portion 16 arranged on the upper portion of the inner container 12, but the cylinder 11 can easily be separated from the inner container after use and the inner container 12 can easily be crushed to reduce the volume thereof.

The results of the drop test, buckling strength test and oxygen gas and water vapor permeability determination are summarized in the following Table 1.

EXAMPLE 2

An inner container 12 shown in FIG. 1 was produced by forming a preform by injection-molding a polyethylene terephthalate resin, heating the preform with an infrared heater, then blow-molding the preform while biaxially orienting the same in a mold in which a previously prepared outer container 11 of manila board having a thickness of 0.7 mm was placed. The resulting inner container 12 had an average thickness at the side wall of the trunk part of 0.17 mm and an inner volume of 1000 ml. The inner container 12 and the outer container 11 of the compound container 10 could easily be separated from one another after use and the inner container 12 could easily be crushed to reduce the volume thereof.

The results of the drop test, buckling strength test and oxygen gas and water vapor permeability determination are summarized in the following Table 1.

EXAMPLE 3

An inner container 12 shown in FIG. 1 was produced by forming a preform by injection-molding a polyethylene terephthalate resin, heating the preform with an infrared heater, then blow-molding the preform while biaxially orienting the same in a mold in which a previously prepared outer container 11 of manila board having a thickness of 0.9 mm was placed. The resulting inner container 12 had an average thickness at the side wall of the trunk part of 0.35 mm and an inner volume of 2000 ml. The inner container 12 and the outer container 11 of the compound container 10 could easily be separated from one another after use and the inner container 12 could easily be crushed to reduce the volume thereof.

The results of the drop test, buckling strength test and oxygen gas and water vapor permeability determination are summarized in the following Table 1.

EXAMPLE 4

In this Example 4, a preform formed, in advance, by injection-molding a polypropylene resin was used. After heating the preform with an infrared heater, it was blow-molded while biaxially orienting the same in a mold in which a previously prepared outer container 11 of manila board having a thickness of 0.7 mm was placed, to thus give an inner container 12 shown in FIG. 1. The resulting inner container 12 had an average thickness at the side wall of the trunk part of 0.17 mm and an inner volume of 1000 ml.

The inner container 12 and the outer container 11 of the compound container 10 could easily be separated from one another after use and the inner container 12 could easily be crushed to reduce the volume thereof.

The results of the drop test, buckling strength test and oxygen gas and water vapor permeability determination are summarized in the following Table 1.

EXAMPLE 5

There was used, in this Example 5, a preform formed, in advance, by multi-layer injection-molding so that the skin layer was composed of a polyethylene terephthalate resin, while the core layer was composed of a polyamide resin. After heating the preform with an infrared heater, it was blow-molded while biaxially orienting the same in a mold in which a previously prepared outer container 11 of manila board having a thickness of 0.7 mm was placed, to thus give an inner container 12 shown in FIG. 1. The resulting inner container 12 had an average thickness at the side wall of the trunk part of 0.17 mm and an inner volume of 1000 ml. The inner container 12 and the outer container 11 of the compound container 10 could easily be separated from one another after use and the inner container 12 could easily be crushed to reduce the volume thereof.

The results of the drop test, buckling strength test and oxygen gas and water vapor permeability determination are summarized in the following Table 1.

EXAMPLE 6

There was used, in this Example 6, a preform formed by injection-molding a non-crystalline resin obtained by copolymerizing a cyclic olefin and ethylene. After heating the preform with an infrared heater, it was blow-molded while biaxially orienting the same in a mold in which a previously prepared outer container 11 of manila board having a thickness of 0.7 mm was placed, to thus give an inner container 12 shown in FIG. 1. The resulting inner container 12 had an average thickness at the side wall of the trunk part of 0.17 mm and an inner volume of 1000 ml. The inner container 12 and the outer container 11 of the compound container 10 could easily be separated from one another after use and the inner container 12 could easily be crushed to reduce the volume thereof.

The results of the drop test, buckling strength test and oxygen gas and water vapor permeability determination are summarized in the following Table 1.

Comparative Example 1

Figure 3:
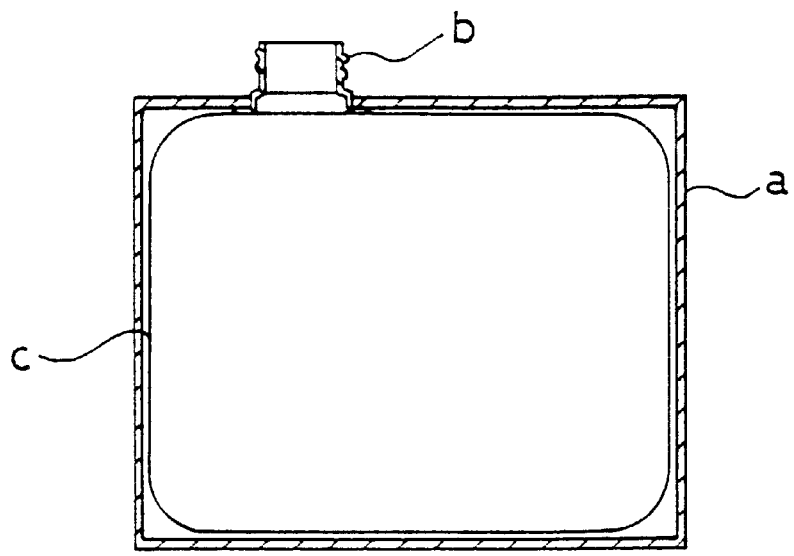
FIG. 3 is a cross sectional view illustrating a comparative example with respect to the first embodiment of the compound container of the present invention.

In this Comparative Example 1, a bag was prepared by adhering the peripheral edges of a polyethylene film having a thickness of 0.2 mm, followed by adhering a polyethylene opening for pouring, which was formed by injection molding, through fusion bonding and fitting an outer container produced from manila board having a thickness of 0.7 mm to the bag to give a compound container shown in FIG. 3 having an inner volume of 1000 ml.

The inner container and the outer container of the compound container could easily be separated from one another after use and the inner container could easily be crushed to reduce the volume thereof.

The results of the drop test, buckling strength test and oxygen gas and water vapor permeability determination are summarized In the following Table 1. The results of the drop test indicate that some of the compound containers were insufficient in the strength at the fused portion of the opening.

Comparative Example 2

A compound container was produced by repeating the same procedures used in Example 1 except that a container of a high density polyethylene having a thickness of 0.3 mm which was produced by direct blow-molding was used as an inner container.

The inner container and the outer container of the compound container could easily be separated from one another after use, but the inner container could not easily be crushed to reduce the volume thereof.

The results of the drop test, buckling strength test and oxygen gas and water vapor permeability determination are summarized in the following Table 1.

Comparative Example 3

A compound container was produced by repeating the same procedures in Example 2 except that a container of a polyethylene terephthalate resin having a thickness of 0.3 mm which was produced by blow-molding while biaxially orienting the resin was used as an inner container. The inner container and the outer container of the compound container could easily be separated from one another after use, but the inner container could not easily be crushed to reduce the volume thereof.

The results of the drop test, buckling strength test and oxygen gas and water vapor permeability determination are summarized in the following Table 1.

TABLE 1

| Ex. No. | Drop Test Result No. of Cracked Samples | Buckling Strength Test Result kgf | Oxygen Permeability cc/pkg/day | Water Vapor Permeability g/pkg/day |
| --- | --- | --- | --- | --- |
| 1 | 0 | 25.6 | 5.02 | 0.18 |
| 2 | 0 | 26.8 | 0.18 | 0.20 |
| 3 | 0 | 25.4 | 0.24 | 0.23 |
| 4 | 0 | 20.3 | 4.05 | 0.08 |
| 5 | 0 | 27.6 | 0.08 | 0.24 |
| 6 | 0 | 28.6 | 4.15 | 0.03 |
| 1* | 3 | 24.6 | 5.23 | 0.17 |
| 2* | 0 | 31.2 | 3.54 | 0.11 |
| 3* | 0 | 35.4 | 0.12 | 0.14 |

*Comparative Example

In Table 1, the drop test was carried out by adding a predetermined amount of water to each bottle (10 bottles in all), then storing at 5° C. for 12 hours and subjecting each bottle to free dropping on a concrete ground from a level of 1 m high to determine the number of bottles which were cracked. Moreover, the buckling strength herein means the buckling strength at yield point observed when each sample bottle is compressed at a compression rate of 20 mm/min.

The compound container 10 according to the present invention is excellent in mechanical strength such as falling impact resistance and the buckling strength and can be produced using a small amount of a plastic through a reduced number of steps. In addition, the compound container comprises a thin inner container 12 whose volume can be reduced upon abandonment thereof (for instance, the volume thereof can be reduced by folding or crushing). Therefore, the compound container of the present invention permits the solution of the problem of the waste disposal and would exert a good influence on the environment.

Second Embodiment (Japanese Patent Application Serial No. Hei 6-212 538)

Figure 4:
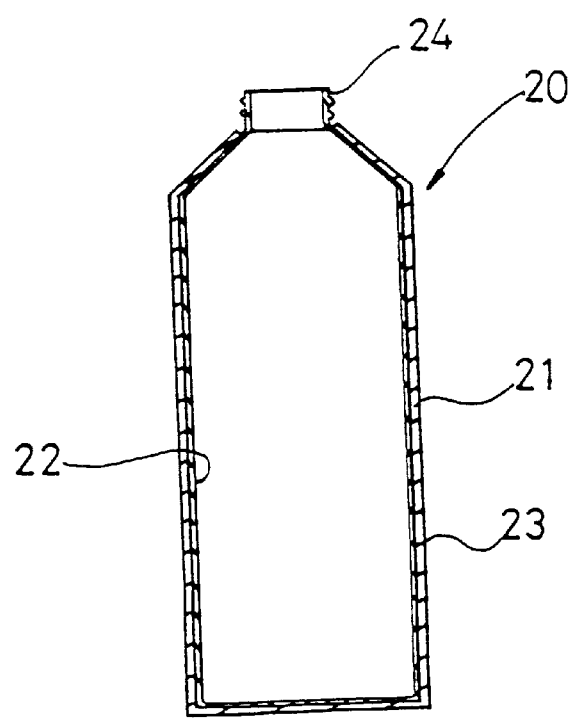
FIG. 4 is a cross sectional view illustrating an example of the compound container according to a second embodiment of the present invention.
Figure 5:
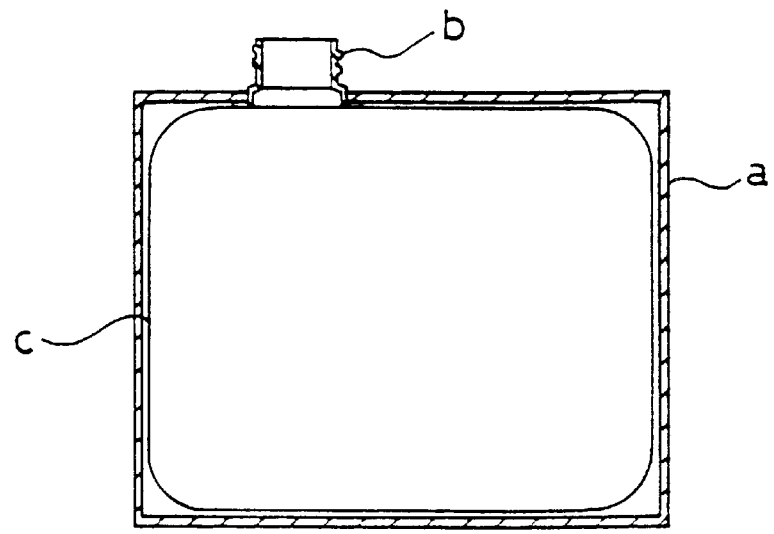
FIG. 5 is a cross sectional view illustrating a comparative example with respect to the second embodiment of the compound container of the present invention.

A second embodiment of the compound container according to the present invention will hereinafter be described in detail with reference to the accompanying FIG. 4. In FIG. 4, the compound container 20 is constructed by an outer container 21 which mainly comprises paper and an inner container 22 of a plastic which is accommodated in the outer container 21. In the inner container, a trunk part 23 and a pouring opening 24 are monolithically molded through blow molding.

The compound container 20 of the present invention is characterized in that the outer container 21 is formed by adhering paper and a barrier film. More specifically, if the outer container 21 is made of paper, the inner container 22 should have barrier properties since the paper is insufficient in the oxygen and water vapor barrier properties. In this case, however, it is not desirable to increase the thickness of the inner container 22 in order to reduce the volume thereof upon abandonment and correspondingly, it is not impossible to impart sufficient barrier properties to the inner container 22. For this reason, if an outer container 21 used is produced by adhering a barrier film to paper as a principal component, sufficient barrier properties can be imparted to the resulting compound container 20.

Examples of such barrier films usable herein are a single layer of a resin excellent in barrier properties, multi-layered films, films the surface of which is coated with a resin excellent in barrier properties, and films on the surface of which a thin film of a barrier material is formed.

Examples of resins having excellent oxygen barrier properties usable herein include saponified products of ethylene-vinyl acetate copolymers, polyamide resins, resins having a high nitrile content and polyvinylidene chloride resins. Examples of resins having excellent water vapor barrier properties usable herein are non-crystalline resins obtained by copolymerizing cyclic olefins and ethylene.

Inorganic or metal oxides may be used as materials for the foregoing barrier thin layers formed on the surface of the films. The thickness of the metal oxide layers ranges from about 100–3000 A. In particular, these films on which metal oxide thin layers are formed are preferred because of their excellent oxygen and water vapor barrier proeprties. Examples of inorganic or metal oxides usable in the present invention are silicon oxide, magnesium oxide and alumina.

If higher barrier properties are required, it is desirable that the plastic inner container be composed of a single layer of a material excellent in barrier properties or a multi-layered structure which comprises at least one layer of a material excellent in barrier properties. As resins excellent in oxygen barrier properties, there may be used, for instance, saponified products of ethylene-vinyl acetate copolymers, polyamide resins, resins having a high nitrile content and polyvinylidene chloride resins. As resins having excellent water vapor barrier properties, there may be used, for instance, non-crystalline resins obtained by copolymerizing cyclic olefins and ethylene.

The inner plastic container 22 is produced by the blow molding in this embodiment, but if it is produced by stretch blow molding, the plastic molecules are oriented in the direction of orientation and accordingly, the mechanical strength of the inner container 22 is substantially improved. Examples of materials suitably used in the stretch blow molding are polyethylene terephthalate resins, polypropylene resins, resins having a high nitrile content, polystyrene resins, polyvinyl chloride resins and polycarbonate resins.

The outer container 21 and the inner container 22 can be converted into a compound container by forming the inner container 22 through blow molding and then inserting into the outer container 21 in the subsequent step, or by placing the outer container 21 in a mold for the blow molding and then blow-molding the inner container 22 in the mold.

The foregoing second embodiment of the present invention will be described in more detail with reference to the following Examples of the compound container according to the second embodiment and Comparative Examples.

Example 1 of Second Embodiment

There was used, in this Example 1 of the second embodiment, a preform produced by injection-molding a polyethylene terephthalate resin. An outer container produced by adhering manila board having a thickness of 0.7 mm to a multi-layered film of a saponified product of an ethylene-vinyl acetate copolymer having a thickness of 0.1 mm was arranged in a mold, while heating the preform with an infrared heater, followed by blow-molding the preform while biaxially orienting the preform within the outer container 21 to give a compound container shown in FIG. 1 and provided with an inner container having an average thickness of the trunk part of 0.17 mm and an inner volume of 1000 ml.

The inner container 22 and the outer container 21 of the compound container 20 could easily be separated from one another after use and the inner container 22 could easily be crushed to reduce the volume thereof.

The results of the drop test and oxygen gas and water vapor permeability determination are summarized in the following Table 2.

Example 2 of Second Embodiment

A compound container 20 was produced by repeating the same procedures used in Example 1 except that a product obtained by adhering manila board having a thickness of 0.7 mm and a film was used and that the film was prepared by vapor-depositing a silicon oxide film having a thickness of 500 A on the surface of a polyethylene terephthalate film having a thickness of 0.01 mm. The inner container 22 and the outer container 21 of the compound container 20 could easily be separated from one another after use and the inner container 22 could easily be crushed to reduce the volume thereof.

The results of the drop test and oxygen gas and water vapor permeability determination are summarized in the following Table 2.

Example 3 of Second Embodiment

In this Example 3, a preform and an outer container were used. The preform was prepared by multilayer injection molding so that the skin layer was composed of a polyethylene terephthalate resin and the core layer was composed of a polyamide resin. The outer container 21 was prepared by adhering manila board having a thickness of 0.7 mm to a polyethylene terephthalate film having a thickness of 0.01 ma on which a magnesium oxide film was vapor-deposited in a thickness of 500 A.

The preform was heated with an infrared heater, followed by arranging the outer container in a mold and blow-molding the preform while biaxially orienting the same within the outer container 21 to give a compound container shown in FIG. 1 and provided with an inner container having an average thickness of the trunk part of 0.17 mm and an inner volume of 1000 ml.

The inner container 22 and the outer container 21 of the compound container 20 could easily be separated from one another after use and the inner container 22 could easily be crushed to reduce the volume thereof.

The results of the drop test and oxygen gas and water vapor permeability determination are summarized in the following Table 2.

Comparative Example 1 of Second Embodiment

In this Comparative Example 1, a bag was prepared by adhering the peripheral edges of a polyethylene film having a thickness of 0.2 mm, followed by adhering a polyethylene opening for pouring, which was formed by injection molding, through fusion bonding. An outer container produced from manila board having a thickness of 0.7 mm was fitted to the bag to give a compound container shown in FIG. 3 having an inner volume of 1000 ml.

The inner container and the outer container of the compound container could easily be separated from one another after use and the inner container could easily be crushed to reduce the volume thereof.

The results of the drop test and oxygen gas and water vapor permeability determination are summarized in the following Table 2. The results of the drop test indicate that some of the compound containers were insufficient in the strength at the fused portion of the opening.

Comparative Example 2

A compound container was produced by repeating the same procedures used in Example 1 of the second embodiment except that a container of manila board having a thickness of 0.7 mm was used as an outer container.

The inner container and the outer container of the compound container could easily be separated from one another after use and the inner container could easily be crushed to reduce the volume thereof.

The results of the drop test and oxygen gas and water vapor permeability determination are summarized in the following Table 2.

TABLE 2

| Ex. No. | Results of Drop Test No. of Samples Cracked | Oxygen Permeability cc/pkg/day | Water Vapor Permeability: g/pkg/day |
| --- | --- | --- | --- |
| 1 | 0 | 0.09 | 0.18 |
| 2 | 0 | 0.02 | 0.02 |
| 3 | 0 | 0.01 | 0.01 |
| 1* | 3 | — | — |
| 2* | 0 | 0.18 | 0.20 |

*Comparative Example

In Table 2, the drop test was carried out by adding a predetermined amount of water to each bottle (10 bottles in all), then storing at 5° C. for 12 hours and subjecting each bottle to free dropping on a concrete ground from a level of 1 m high to determine the number of bottles which were cracked.

In the compound container 20 according to the second embodiment of the present invention, the outer container 21 has a structure comprising paper and a barrier film adhered to one another and therefore, the inner container 22 may be constituted by a thin plastic container and the compound container 20 is excellent in various properties such as falling impact resistance and the gas barrier properties. In addition, the compound container comprises a thin inner container 12 whose volume can be reduced upon abandonment thereof by, for instance, folding or crushing. Therefore, the compound container of the present invention permits the solution of the problem of the waste disposal and would not exert a bad influence on the environment. Furthermore, since the amount of the plastic required for producing the inner container can substantially reduced, the volume of the compound container can be reduced upon abandonment, the container has excellent physical properties such as buckling strength and is excellent in barrier properties. Therefore, the amount of waste can be reduced and the volume thereof can likewise be reduced.

Third Embodiment (Japanese Patent Application Serial No. Hei 6-265342)

Figure 6:
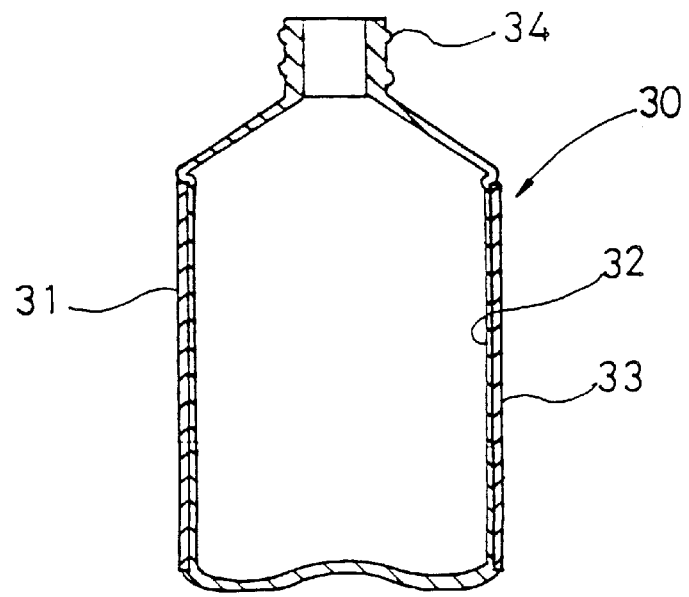
FIG. 6 is a cross sectional view illustrating an example of the compound container according to the embodiment Ver 3.1 of the present invention.

A third embodiment of the compound container according to the present invention will hereinafter be described in detail with reference to the accompanying drawing, FIG. 6. In FIG. 6, the compound container 30 is constituted by an outer container 31 which mainly comprises paper and an inner container 32 of a resin mainly comprising PEN, which is accommodated in the outer container 21. In the inner container, a trunk part 33 and a pouring opening 34 are monolithically molded through stretch blow molding.

Figure 7:
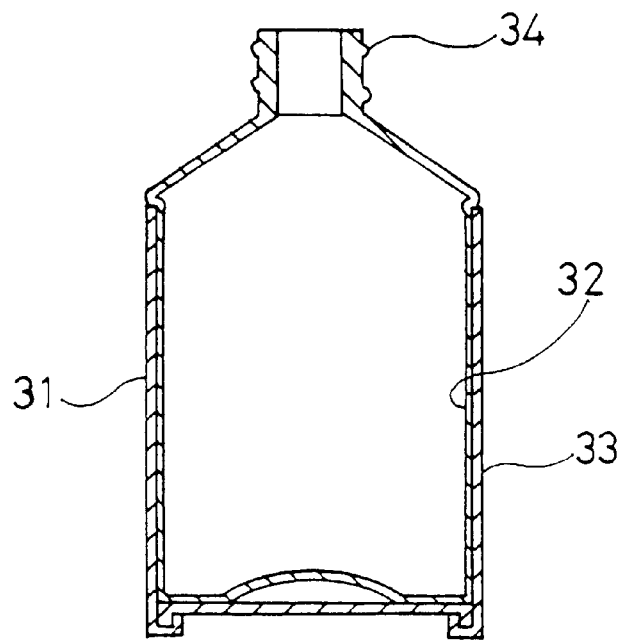
FIG. 7 is a cross sectional view illustrating the compound container according to the embodiment Ver 3.2 of the present invention.

The outer container 31 shown in FIG. 6 has a structure whose upper and bottom faces are both opened, but may have another structure such that it surrounds not only the trunk part 33, but also the bottom 18 of the inner container 32, i.e., it may have a closed bottom structure as shown in FIG. 7.

Figure 8:
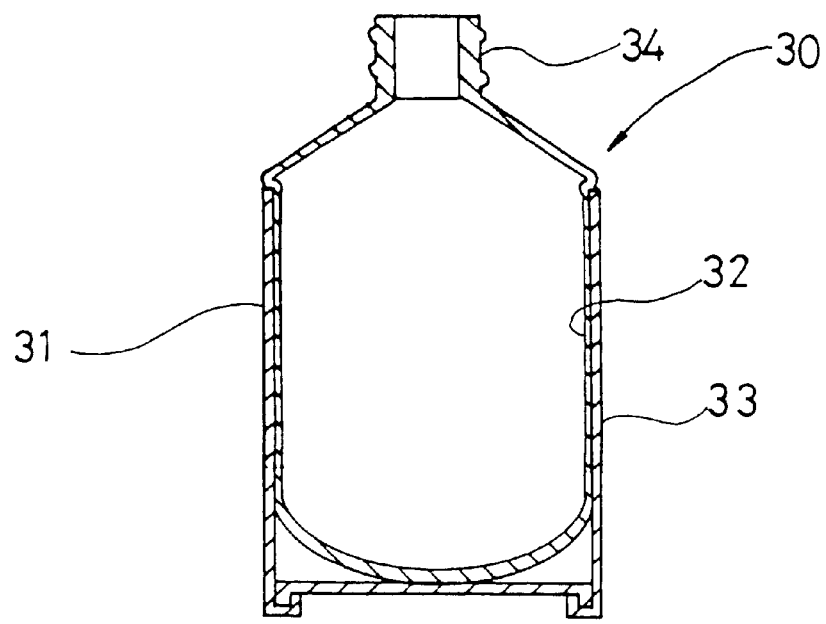
FIG. 8 is a cross sectional view illustrating the compound container according to the embodiment Ver 3.3 of the present Invention.

If the outer container 31 has a closed bottom structure as shown in FIG. 7, the bottom of the inner container 32 preferably has a downwardly projected convex shape as shown in FIG. 8. The inner container can thus withstand the pressure originated from the contents thereof.

Figure 9:
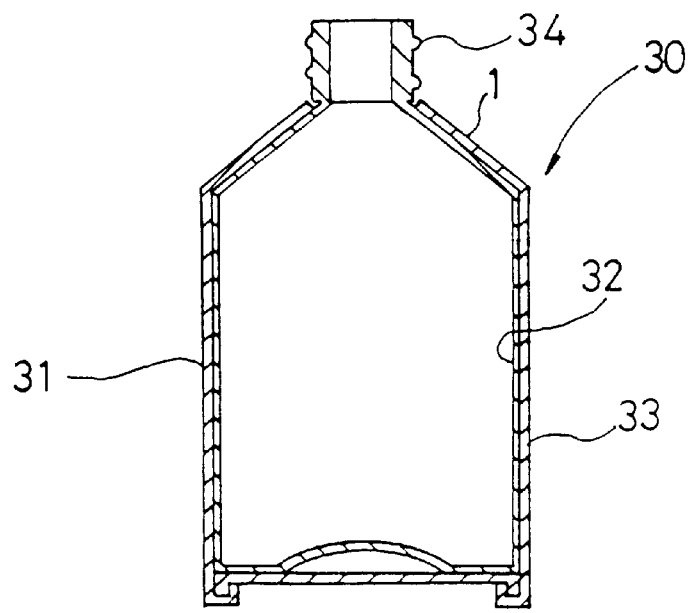
FIG. 9 is a cross sectional view illustrating the compound container according to the embodiment Ver 3.4 of the present invention.

The outer container 31 may have a structure such that it surrounds the shoulder of the inner container 32 as shown in FIG. 9. This embodiment is more suitable as a pressure container since most of the outer wall of the inner container 32 is surrounded by the outer container 31. In this respect, the amount of the resin to be used can be saved by reducing the average thickness of the side wall (trunk part 33) covered with the outer container 31 to a thickness of not more than ½ time that of the portion of the inner container 32 which is not covered with the outer container 31.

Alternatively, a predetermined rigidity can be imparted to the compound container 30 and a higher pressure resistance can be imparted thereto by increasing the thickness of the side wall of the outer container 31 to a level of not less than 2.5 times that of the average thickness of the side wall (trunk part 33). If the thickness of the outer container 31 is less than 2.5 time the average thickness of the trunk part 33 of the Inner container 32, i.e., the outer container 31 is too thin, the resulting compound container 30 is insufficient in mechanical strength.

The outer container 31 comprises paper or a material mainly comprising paper. If the outer container 31 is made of paper alone, it has poor gas (such as oxygen) and water vapor barrier properties. For this reason, barrier properties are Imparted to the outer container 31 according to a variety of means.

For Instance, the barrier properties may be imparted to the outer container 31 by adhering a barrier film to paper.

Examples of such barrier films are mono-layer or multi-layer films of resins excellent in barrier properties, films the surface of which is coated with resins excellent in barrier properties and films on which thin films of barrier materials are formed.

Examples of resins having excellent oxygen barrier properties usable herein include saponified products of ethylene-vinyl acetate copolymers, polyamide resins, resins having a high nitrile content and polyvinylidene chloride resins. Examples of materials excellent in water vapor barrier properties are non-crystalline resins obtained by copolymerizing cyclic olefins and ethylene.

As the metal thin films formed on the surface of films to impart the barrier properties to the films, there may be used, for instance, those obtained from inorganic oxides or metal oxides such as silicon oxide, magnesium oxide and aluminum oxide. In addition, examples of the films are those prepared from PET, polypropylene and nylons. These films on which thin films of metal oxides are formed are excellent in both oxygen and water vapor barrier properties and particularly preferably used in the present invention. The thin film layer is formed by vapor-deposition or coating techniques and preferably has a thickness ranging from 100 m to 3000 A If water resistance is imparted to the outer container, the adhesion of a barrier film to the outer container may be effective as has been discussed above, while it is also effective to subject the outer container to an edge-treatment or impregnation which a resin.

The inner container 32 used in the present invention consists of a resin mainly comprising polyethylene-2,6-naphthalate (PEN). PEN is superior to polyethylene terephthalate (PET) in oxygen barrier, carbon dioxide barrier and water vapor barrier properties and the amount of acetaldehyde oozed out to the surface thereof is low. These barrier properties and the mechanical strength are further improved through orientation. It also has a glass transition point about 50° C. higher than that of PET and therefore, excellent In heat resistance. This permits the charging of contents during hot. Moreover, it is excellent in ultraviolet screening action and resistance to chemicals and therefore, any deterioration and change of taste and flavor of the contents due to irradiation with ultraviolet rays can be prevented even if only a part of the inner container is covered with the outer container.

PEN usable in the present invention may be those obtained by copolymerizing other monomers, for instance, acidic components such as aromatic dicarboxylic acids (e.g., isophthalic acid), alicyclic dicarboxylic acids (e.g., hexahydroisophthalic acid) and aliphatic dicarboxylic acids (e.g., adipic acid and sebacic acid); and/or glycol components such as methylene glycol (including tri-, hexa- and deca-derivatives) and cyclohexane dimethanol, in an amount of not more than 10% by weight.

The inner container may have a multi-layered structure comprising at least two layers including a PEN layer and a PET layer, depending on the quality thereof required for contents to be accommodated. In this case, the inner container is prepared by forming a premolded article having a multi-layered structure through injection molding and then subjecting it to the stretch blow-molding.

Examples of the multi-layered structures of the inner container include two component-three layer structures such as PET/PEN/PET and PEN/PET/PEN; or two component-five layer structures such as PET/PEN/PET/PEN/PET and PEN/PET/PEN/PET/PEN, which are arranged in the order of from the innermost layer to the outermost layer.

The inner container may comprise a resin blend containing at least two kinds of resins including PEN depending on the quality required for contents to be accommodated, with a resin composition comprising a blend of PEN and PET being more preferably used as a material for the inner container 32. PEN is an expensive resin and therefore, the cost thereof can be saved by blending with other resins. In this respect, the mixing ratio may be determined by the quality of the mixture required for contents and the inner container is improved in the barrier properties and ultraviolet screening action in proportion to the ratio of PEN to PET.

PET used in such a blend may be those obtained by copolymerizing with other monomer components, for instance, acidic components such as isophthalic acid, adipic acid and sebacic acid; and/or glycol components such as methylene glycol, propandiol and cyclohexane dimethanol, in an amount of not more than 10% by weight.

It is also possible to use blends of PEN with other barrier resins such as saponified products of ethylene-vinyl acetate copolymers and/or polyamide resins. It is likewise possible that the foregoing blend resin layer including PEN can be substituted for the PEN layer of the inner container 32 having the foregoing multi-layered structure.

The compound container 30 according to the present invention may have a structure in which the inner container 32 may be removed from the outer container 31. To this end, the inner container 32 may be united through fitting it to the outer container 31 or the inner container may be united through an adhesive layer which is soluble in an alkali solution or warmed water. Thus, the inner container 32 can easily be removed from the outer container 31.

Figure 10:
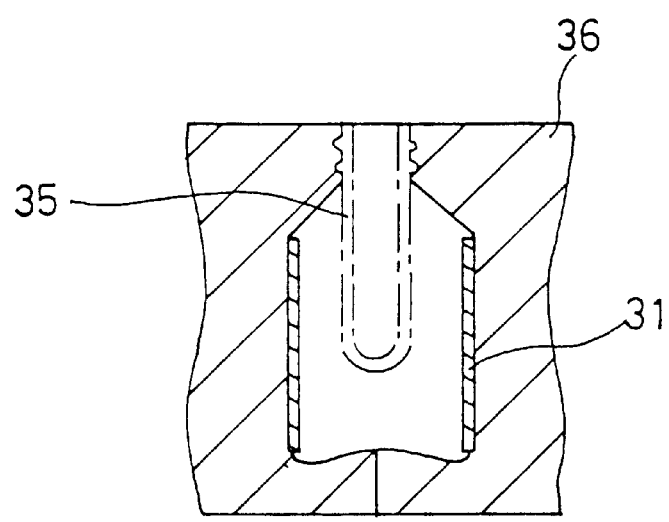
FIG. 10 is a flow diagram for explaining the processes for producing the compound containers according to Embodiments Ver 3.1 to 3.4.

Then the method for preparing the compound container according to the third embodiment will hereunder be explained in detail. First of all, a preform 35 consisting of a resin mainly comprising PEN is formed, in advance, by injection molding as shown in FIG. 10. Thereafter, an inner container produced by stretch blow-molding the preform 35 may be fitted to an outer container, but it is preferred, while taking into consideration the production efficiency, to simultaneously unify an inner container 32 and an outer container 31 previously formed into a desired shape by arranging the outer container 31 in a mold and then stretch blow-molding the preform 35 for preparing the inner container 32 which is heated to the molding temperature within the outer container 31 arranged in the mold.

In the compound container 30 of the present invention, the thickness of the trunk part 33 of the inner container 32 is reduced and therefore, the amount of the resin required for the preparation of the inner container 32 is reduced as compared with a plastic container having the same inner volume. In addition, the inner container 32 is improved in the barrier properties and mechanical strength since it is stretch blow-molded. Moreover, since the outer container comprising paper or a material mainly comprising paper is united to the inner container 32 at the trunk part 33, the resulting compound container accordingly has an additional strength against the internal pressure and can thus sufficiently withstand the internal pressure originated from contents accommodated therein.

The resin mainly comprising PEN used for the production of the inner container 32 is excellent in oxygen barrier, carbon dioxide barrier and water vapor barrier properties and at least the trunk part 33 whose thickness is reduced is unified to the outer container 31 having good barrier properties. For this reason, the resulting compound container is improved in the barrier properties, permits the extension of the term for protecting contents and the pressure resistance thereof is also improved substantially.

Unless the inner container 32 is unified with the outer container 31 through an adhesive layer, the former can be separated from the latter after use prior to the abandonment thereof.

On the other hand, If the inner container 32 is unified with the outer container 31 through an adhesive layer, the compound container may be treated with an alkali solution or warmed water to thus solubilize the adhesive layer and to easily separate the inner container from the outer container as has been discussed above and then disposed separately. The adhesive force between the inner and outer containers 32, 31 may be controlled by appropriately selecting the kinds of the adhesive used and thus they can easily be removed from one another.

The compound container 30 may be prepared by fitting an outer container 31 to a molded inner container 32. Alternatively, the compound container 30 may likewise be prepared by arranging an outer container in a mold for preparing an inner container 32 and then simultaneously molding the inner container and unifying it with the outer container.

Examples of the third embodiment of the compound container will hereinafter be described in more detail.

Example 1 of Third Embodiment

In this Example 1, there was used a preform obtained by injection molding PEN (intrinsic viscosity: 0.57 g/dl). An outer container 31 was produced from a material obtained by adhering a multi-layered film of a saponified product of ethylene-vinyl acetate copolymer having a thickness of 0.1 mm to manila board having a thickness of 0.7 mm. Then the outer container 31 was arranged in a mold in such a manner that the innermost layer was formed from the polyethylene surface, followed by heating the preform with an infrared heater and inserting it into the outer container 31. The preform was stretch blow-molded by injecting compressed air into the preform while orienting the preform by inserting a stretching rod therein to thus give a compound container 30 shown in FIG. 9 comprising an outer container and an inner container having an average thickness of the trunk part of 0.17 mm and an inner volume of 500 ml.

Example 2 of Third Embodiment

Figure 11:
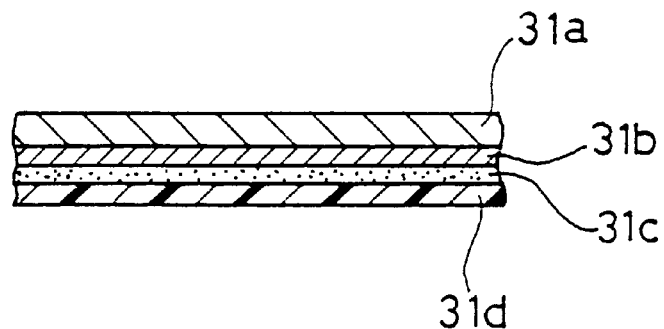
FIG. 11 is a cross sectional view illustrating an example of the outer container according to the embodiment of the present invention.

In this Example 2 of the third embodiment, a compound container was prepared by repeating the same procedures used in Example 1 of the third embodiment except that an outer container 31 as shown in FIG. 11 was produced by adhering manila board 31a having a thickness of 0.7 mm to a multi-layered type PET film and that the multi-layered PET film was prepared by vapor-depositing a silicon oxide film 31c having a thickness of 400 on the surface of a PET film 31b having a thickness of 0.1 mm and then applying a heat-sensitive adhesive layer 31d onto the film 31c.

Example 3 of Third Embodiment

In this Example 3 of the third embodiment, a compound container was prepared by repeating the same procedures used in Example 1 of the third embodiment except that there was used a preform comprising a two component-three layer structure, i.e., comprising two PET layers and an intermediate layer of PEN sandwiched between these two PET layers. The resulting compound container comprised a PET layer having a thickness of 0.5 mm and two PET layers each having a thickness of 0.5 mm.

Example 4 of Third Embodiment

In this Example 4 of the third embodiment, a compound container having an average thickness of the trunk part of 0.17 mm was prepared by repeating the same procedures used in Example 1 of the third embodiment except that a preform comprising 5:95 (weight ratio) PEN-PET blend was substituted for the preform used in Example 1.

Comparative Example 2 of Third Embodiment

In this Comparative Example 2 of the third embodiment, a compound container having an average thickness of the trunk part of 0.17 mm was prepared by repeating the same procedures used in Example 2 of the third embodiment except that a preform comprising PET alone was substituted for the preform used in Example 2.

The oxygen permeability and the water vapor permeability of the compound containers prepared in Examples 1 to 4 and Comparative Examples 1 to 2 are summarized in the following Table 3.

TABLE 3

| Ex. No. | Oxygen Permeability (cc/pkg/day) | Water Vapor Permeability (g/pkg/day) |
| --- | --- | --- |
| 1 | 0.015 | 0.025 |
| 2 | 0.004 | 0.003 |
| 3 | 0.030 | 0.060 |
| 4 | 0.039 | 0.080 |
| 1* | 0.045 | 0.090 |
| 2* | 0.010 | 0.010 |

*Comparative Example

The data listed in Table 3 indicate that the compound container comprising an inner container of PEN exhibited high oxygen barrier and vapor barrier properties.

The compound containers prepared in Examples 1 and 2 and Comparative Example 1 and 2 each was filled with 500 ml of beer and then stored at 5° C. After storing one month, the content of carbon dioxide in each container was determined. In this respect, the content thereof in the beer before charging in the container was assumed to be 100%. The result thus obtained are summarized in the following Table 4.

TABLE 4

| Ex. No. | CO2 Content (%) | Deformation of Container |
| --- | --- | --- |
| 1 | 99.5 | not observed |
| 2 | 99.9 | not observed |
| 1* | 97.5 | not observed |
| 2* | 97.8 | not observed |

*Comparative Example

The data listed in Table 4 clearly indicate that the compound container comprising an inner container consisting of PEN causes only a slight change of the CO2 content and does not undergo any deformation.

As has been discussed above in detail, the compound container 30 according to the third embodiment satisfies the requirements for the oxygen barrier, water vapor barrier and carbon dioxide barrier properties and pressure resistance and the disposal thereof after use is quite convenient since PEN is used as a material for preparing the inner container 32. In addition, the foregoing effects can further be improved if the inner container is formed from a blend of PEN with other resins or has a laminate structure of a PEN layer and at least one layer of another resin.

Moreover, if the compound container is designed in such a manner that the outer container 31 is fitted to the inner container 32 or the former is united with the latter through a layer of an adhesive which is easily soluble in an alkali solution or warmed water or which may be solubilized through irradiation with light rays, the outer container 31 can easily be removed from the inner container 32. Thus, they can easily and separately be disposed and can effectively be reclaimed and reused.

Further the compound container comprises a combination of an outer container 31 of a material mainly comprising paper with an inner container 32 of a plastic and therefore, the amount of the plastic to be used can be reduced to 30% of that required for the preparation of conventional bottles of plastics alone. Moreover, the compound container can maintain the shape retention at least at the opening and can thus be filled with contents in the same manner conventionally used.

In addition, practically acceptable buckling strength and pressure resistance can be imparted to the resulting compound container by increasing the thickness of the outer container 31 to not less than 2.5 times the average thickness of the trunk part 33 of the inner container 32 even if the amount of plastic used for preparing the inner container 32 is reduced.

Therefore, the compound container has sufficiently high pressure resistance and may be filled with carbon dioxide gas-containing beverages (such as cola drinks) without undergoing any deformation.

Moreover, the method for preparing the compound container according to the present invention permits the molding of the inner container 32 simultaneous with the adhesion thereof to the outer container 31. This leads to reduction of the number of steps required for the production thereof and the improvement in the adhesive force between the inner and outer containers 32, 31.

Japanese Patent Application Serial No. Hei 6-276411

Then the compound container according to a fourth embodiment of the present invention will hereinafter be described in more detail.

Figure 12:
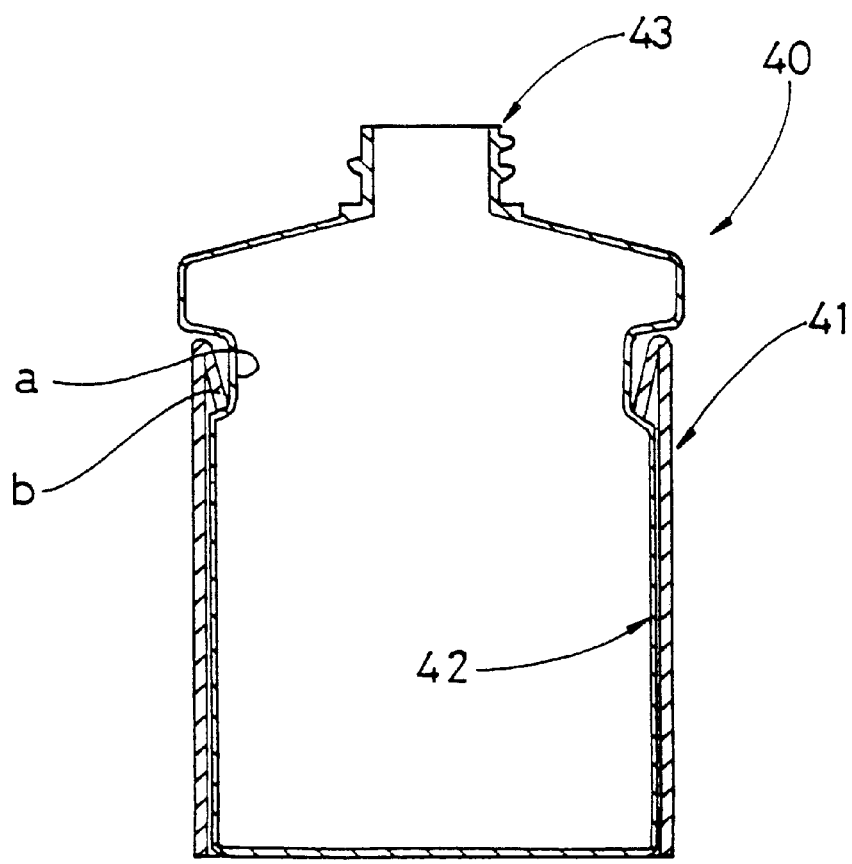
FIG. 12 is a cross sectional view illustrating the compound container according to the embodiment Ver 4.1 of the present invention.
Figure 13:
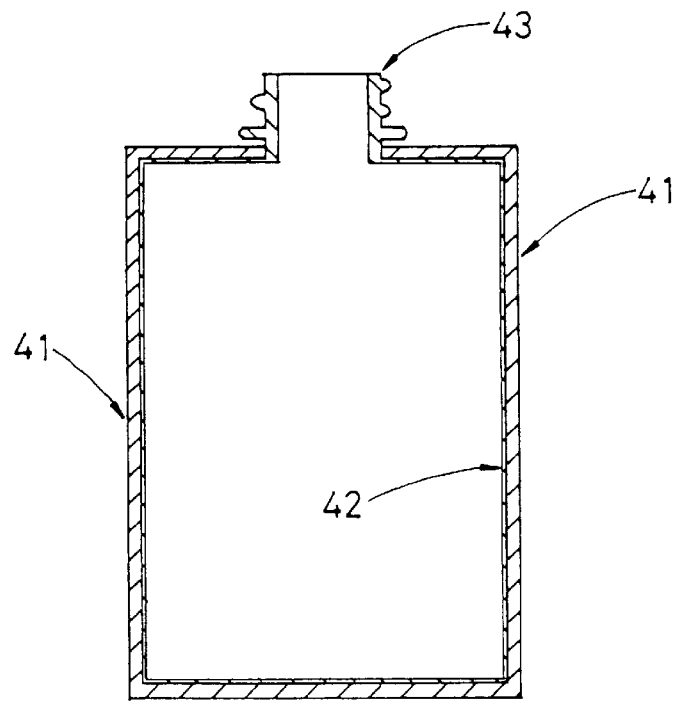
FIG. 13 is a cross sectional view illustrating the compound container according to the embodiment Ver 4.2 of the present invention.

FIG. 12 is a cross sectional view showing the compound container 40 according to the fourth embodiment. FIG. 13 is a cross sectional view showing an example of the compound container according to the fourth embodiment. In these figures, the reference numeral 40 represents a compound container, 41 an outer container, 42 an inner container, 43 an opening and a a recess and b a fixing flap.

In FIG. 12, a compound container 40 comprises an outer container 41 of paper having shape retention and an inner container 42 having an opening 43 which is accommodated in the outer container 41. The outer container 41 and the inner container 42 are assembled by forming a recess a on the trunk part of the inner container 42 and fitting, for instance, a flap b formed at the upper portion of the outer container 41 to the recess or partially adhering the container 41 to the container 42 in a predetermined pattern in order that the container 41 can easily be separated from the container 42. Thus, the inner container 42 (particularly, the trunk part) is surrounded by the outer container 41 except for the opening 43 and the bottom of the container 42. For this reason, any contamination of the resulting container by, for Instance, carbonaceous substances encountered when reclaimed materials are employed can be made inconspicuous and thus the use thereof does not spoil the beauty of the resulting container body.

The outer container 41 Is preferably prepared from a material having relatively thick and a high rigidity such as a paper tube, but may be formed by forming a square paperboard into a cylinder through adhesion of the edges thereof without any problem.

Moreover, the outer container 41 may be designed such that it surrounds the inner container 42 even at the shoulder and bottom portions thereof to thus improve the strength thereof.

Examples of material for preparing the inner container 42 include polyethylene, polypropylene, polyacrylonitrile, nylons, polyethylene terephthalate and polyvinyl chloride, but the use of polyethylene terephthalate is desirable to impart high strength to the resulting compound container and to improve the moldability of the inner container.

The use of polyethylene terephthalate permits substantial reduction of the thickness of the container if the biaxial stretching blow molding technique is adopted and this in turn permits the reduction of the amount of waste to be disposed. Moreover, the combustion energy generated when it is subjected to the incineration treatment is low as compared with other materials and thus the environment is not adversely affected so much.

The outer container 41 also serves to reinforce the resulting compound container 40 and therefore, ensures an acceptable or sufficient buckling strength and falling impact resistance of the compound container 40 even when the plastic inner container 42 is substantially thin.

Furthermore the outer container 41 can easily be removed from the inner container 42. Therefore, they can be separated from one another after the contents thereof is used and the container is disposed and the volume thereof can substantially be reduced prior to the disposal.

The inner container 42 can be prepared by, for instance, a direct blow molding or biaxial stretch blow molding technique.

The outer container 41 and the inner container 42 may be assembled by molding the inner container 42 in advance and then fitting the outer container 41 thereto; or arranging the outer container 41 in a mold for forming inner container prior to the molding of the container 42 and then blow-molding the inner container 42 within the outer container 41 to thus mold the inner container 42 simultaneously with the adhesion of the inner container 42 to the outer container 41. Moreover, the compound container 40 according to the present invention may comprise an inner container 42 having a multi-layered structure.

The use of a reclaimed material as the innermost layer for the inner container 42 suffers from a problem in that the reclaimed material has poor mechanical strength as compared with the virgin material (unused material) and a problem of hygienic quality when contents thereof are foods, drugs or toiletry products which are brought into contact with human bodies such as cosmetics, shampoo and rinses.

To solve these problems, virgin materials are used for preparing the outermost and innermost layers while the intermediate layers are produced from reclaimed materials. This permits the prevention of any reduction in the mechanical strength and the problem of hygienic quality can be eliminated since the inner layer which comes in contact with contents is composed of a virgin material.

When a reclaimed material is used in the compound container of the present invention, foreign substances and carbonaceous materials mixed in the reclaimed material can be made inconspicuous and any change of color of the container can likewise be made inconspicuous. Therefore, the present invention permits the effective use of reclaimed materials without spoiling the beauty of the container body. At the same time, the compound container permits the reduction of the thickness of the inner container and the amount of plastics to be used may correspondingly be reduced.

Examples of the fourth embodiment of the present invention will hereunder be described in more detail.

Example 1 of Fourth Embodiment

In this Example 1 of the fourth embodiment, there was prepared an inner container 42 having an amount for weighting of 33 g and an inner volume of 1000 ml and provided with a recess a at the upper portion of the trunk part by direct blow-molding using a reclaimed material. Then a cylindrical outer container 41 of cardboard having a flap b for fixing at the upper end thereof was fitted to the outside of the inner container 42 so that the flap b was fitted to and fixed to the recess a to give a compound container having the structure as shown in FIG. 12.

This compound container 40 did not suffer from any problem of appearance and the inner container 42 and the outer container 41 could easily be separated from one another by pulling them in the opposite directions after use.

The results of drop test and buckling strength test are summarized in the following Table 5.

Example 2 of Fourth Embodiment

In this Example 2 of the fourth embodiment, there was used a preform prepared by injection-molding using a reclaimed material of polyethylene terephthalate resin. The preform was heated with an infrared heater and formed into an inner container having an amount for weighting of 15 g and an inner volume of 1000 ml through biaxial stretch blow molding. A cylindrical outer container of cardboard was fitted to the outside of the inner container by the same method used In Example 1 to give a compound container having the structure as shown in FIG. 12.

This compound container did not suffer from any problem of appearance and the inner container and the outer container could easily be separated from one another after use.

The results of drop test and buckling strength test are summarized in the following Table 5.

Example 3 of Fourth Embodiment

In this Example 3 of the fourth embodiment, there was used a preform prepared by injection-molding using a reclaimed material of polyethylene terephthalate resin. The preform was heated with an infrared heater followed by blow-molding an inner container having an amount for weighting of 15 g and an inner volume of 1000 ml in a mold in which a cylindrical outer container of cardboard having a closed bottom and previously prepared had been arranged in advance to thus give a compound container having the structure as shown in FIG. 12.

This compound container did not suffer from any problem of appearance and the inner container and the outer container could easily be separated from one another after use.

The results of drop test and buckling strength test are summarized in the following Table 5.

Example 4 of Fourth Embodiment

In this Example 4 of the fourth embodiment, there was formed an inner container through multi-layer blow molding and direct blow molding techniques using an unused (virgin) high density polyethylene resin for the outermost and innermost layers and a reclaimed material of a high density polyethylene resin for an intermediate layer. In this inner container, the amount for weighting was 33 g and the inner volume was 1000 ml. An outer container of cardboard was fitted to the outside of the inner container thus prepared to give a compound container having the structure as shown in FIG. 11. In this case, problems of appearance and hygienic quality did not arise and the inner container and the outer container could easily be separated from one another after use.

The results of drop test and buckling strength test are summarized in the following Table 5.

Example 5 of Fourth Embodiment

In this Example 5 of the fourth embodiment, there was used a preform having a two component-three layer structure through multi-layer injection molding. The preform was formed using an unused (virgin) polyethylene terephthalate resin for the outermost and innermost layers and a reclaimed material of a polyethylene terephthalate resin for an intermediate layer. The preform was heated with an infrared heater and molded into an inner container having an amount for weighting of 15 g and the inner volume of 1000 ml through biaxial stretch blow molding. An outer container of cardboard was fitted to the outside of the inner container thus prepared to give a compound container having the structure as shown in FIG. 12. In this case, problems of appearance and hygienic quality did not arise and the inner container and the outer container could easily be separated from one another after use.

The results of drop test and buckling strength test are summarized in the following Table 5.

TABLE 5

| Ex. No. | Result of Drop Test No. of Sample Cracked | Buckling Strength (kgf) |
| --- | --- | --- |
| 1 | 0 | 25.2 |
| 2 | 0 | 26.2 |
| 3 | 0 | 25.8 |
| 4 | 0 | 27.3 |
| 5 | 0 | 26.7 |

In Table 5, the drop test was carried out by adding a predetermined amount (1000 cc) of water to each bottle (10 bottles in all), then storing at 5° C. for 12 hours and subjecting each bottle to free dropping on a concrete ground from a level of 1 m high to determine the member of bottles which were cracked. Moreover, the buckling strength herein means the buckling strength at yield point observed when each sample bottle is compressed at a compression rate of 20 mm/min.

Incidentally, the shapes of the outer and inner containers are not specified in the description of the foregoing Examples of the fourth embodiment, but may of course be those having circular, elliptic, triangular, square and polygonal cross sections.

The compound container according to the fourth embodiment permits effective use of reclaimed materials and considerable reduction of the amount of plastics to be used. Therefore, the container shows an effect of reducing the amount of waste to be disposed, an effect of recycling plastics since reclaimed materials are used and is excellent from the viewpoint of environmental protection. Moreover, the use of a polyethylene terephthalate resin as a material for preparing the inner container permits the substantial reduction of the thickness of the resulting compound container and the compound container exhibits another effect such that the environment is not adversely affected so much since the combustion energy generated when it is subjected to the incineration treatment is, accordingly, low. In addition, when the inner container is designed to have a multi-layered structure, reclaimed materials may be used as materials for preparing the intermediate layer without causing the problems concerning deterioration of mechanical strength and hygienic quality associated with the use of the reclaimed materials and plastic materials can be recycled.
Japanese Patent Application Serial No. Hei 7-27985

Then the compound container according to a fifth embodiment of the present Invention will hereinafter be explained in detail.

Figure 14:
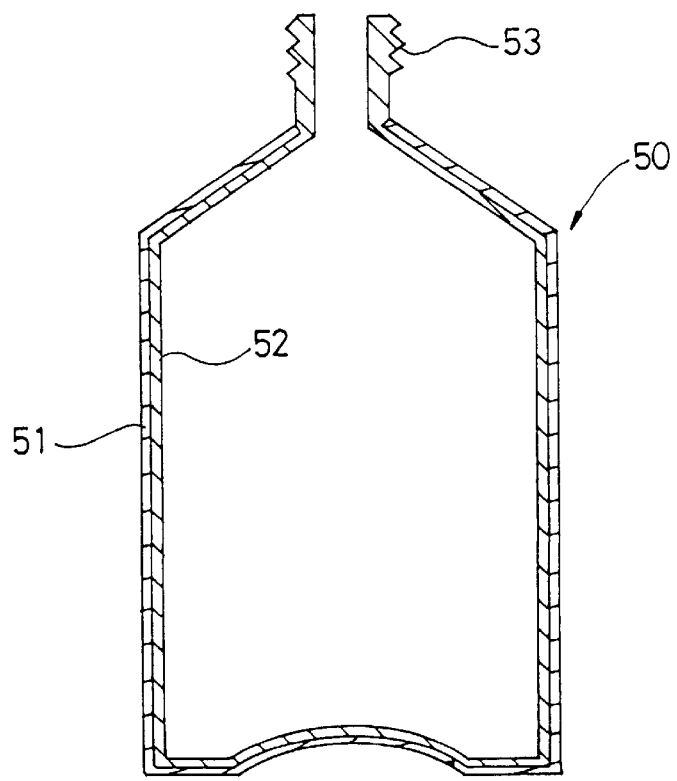
FIG. 14 is a cross sectional view illustrating the compound container according to the embodiment Ver 5.1 of the present invention.
Figure 15:
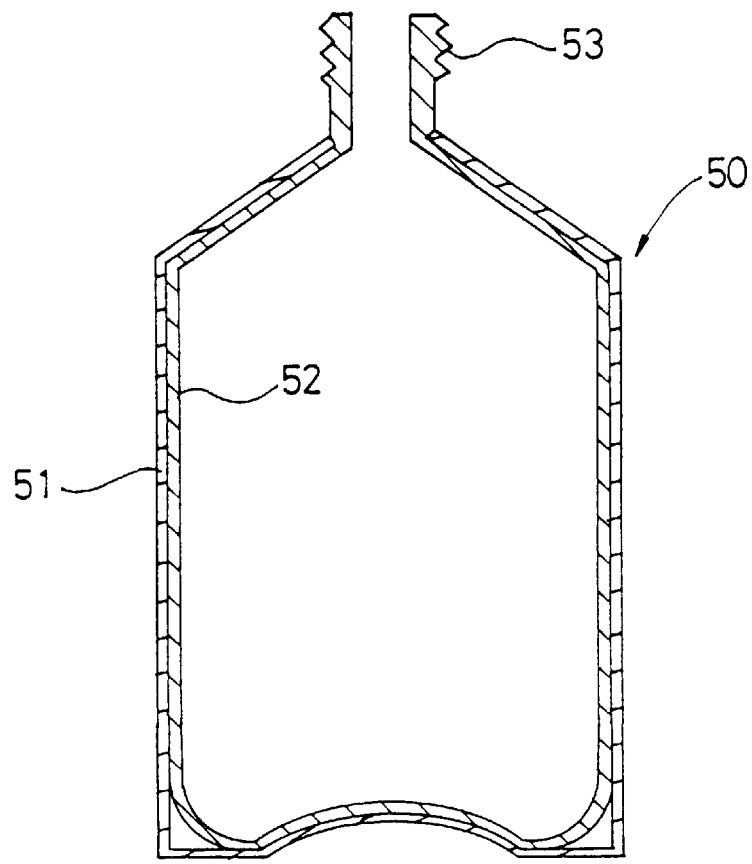
FIG. 15 is a cross sectional view illustrating the compound container according to the embodiment Ver 5.2 of the present invention.

In FIGS. 14 and 15, an outer container 51 of paper having shape retention may be prepared from the usual cardboard. The paper preferably has a basis weight ranging from about 150 to 350 g, but the basis weight is not restricted to the range defined above since the quality required for the paper may widely vary depending on the various factors such as the volume, size and shape of the intended compound container 50. Moreover, the paper usable herein may be those obtained by coating a part or the whole of either or both sides of base paper with a resin layer. The shape of the outer container 51 may vary according to need, but it is preferably designed in such a manner that it can approximately completely or partially cover the outside of the compound container 50. For instance, the compound container 51 may be designed such that the outer container 51 partially covers the bottom of the container 50, while an inner container 52 prepared through stretch blow molding is directly exposed at the remaining portions and in this case, an opening 53 of the inner container 52 is of course directly exposed (see FIG. 14).

One of the characteristic properties of the fifth embodiment is that the outer container 51 is united with the inner container 52 formed through stretch blow molding. In this connection, the degree of unification of these containers can be determined by the kinds of coating resin used for forming the inner layer of the outer container 51, the kinds of resin materials for preparing the inner container 52 through stretch blow molding and the conditions for the stretch blow molding.

Another characteristic property of the fifth embodiment is that a mixture comprising at least two plastic materials is used as the material for the inner container 52. In this respect, the use of such a mixture permits the improvement in the gas barrier properties of the resulting compound container 50 and the control of the adhesive force between the outer and inner containers 51, 52 and hence the control of the strength of the unified container.

Materials for preparing the inner container 52 formed through stretch blow molding may be, for instance, a combination of a material mainly comprising a polyester resin with a resin having gas barrier properties higher than those of the polyester resin. The polyester resin may in general be one produced by a condensation reaction of ethylene glycol and terephthalic acid, but the polybasic acid and the polyhydric alcohol may comprise other polybasic acids and polyhydric alcohols as comonomer components, respectively or may be ester resins prepared from other polybasic acids and polyhydric alcohols.

However, polyethylene terephthalate resins commonly used are preferred as the polyester resins as principal components while taking into consideration the cost for the materials.

The barrier resins used in combination with the polyester resin as the principal component may be any materials so far as they have oxygen barrier and water vapor barrier properties higher than those of the polyester resin. As an example of materials having excellent oxygen barrier properties is a saponified product of an ethylene-vinyl acetate copolymer. Preferably used are saponified products of ethylene-vinyl acetate copolymers each having an ethylene content ranging from 25 to 50%.

In regard to the relative amounts of the polyester resin and the saponified product of the ethylene-vinyl acetate copolymer, the latter is preferably used in an amount ranging from 1 to 30 parts by weight per 100 parts by weight of the former. This is because if the amount of the saponified product is too large, the moldability of the blend through stretch blow molding is impaired and accordingly, it is difficult to obtain a container having an appropriate thickness distribution. On the other hand, if it Is too small, the resulting compound container has insufficient oxygen barrier properties.

Another example of the gas barrier resin usable herein is a polyamide resin. Specific examples of such polyamide resins commonly known in the art include aliphatic polyamides such as 6-nylon and 6,6-nylon, with m-xylylene group-containing polyamide resins being preferably used. The m-xylyiene group-containing polyamide resin is excellent in oxygen gas barrier properties and permits the formation of a compound container having excellent oxygen gas barrier properties through the combination with a polyester resin. In regard to the relative amounts of the polyester resin and the m-xylylene group-containing polyamide resin, it is preferred to use the latter in an amount ranging from 3 to 50 parts by weight per 100 parts by weight of the former, but the relative amounts thereof are not necessarily restricted to the range defined above. If the added amount of the polyamide resin is small, the oxygen gas barrier properties of the resulting compound container are not satisfactorily improved, i.e., any effect due to blending is not expected, while if it exceeds 50 parts by weight, the stretchability of the resulting blend is impaired and accordingly, it is difficult to obtain a compound container having a uniform thickness distribution.

A further example of the gas barrier resin usable herein Is a thermoplastic liquid crystalline resin. Examples of such thermoplastic liquid crystalline resins are polymers comprising moieties derived from rigid monomers, for instance, oxycarboxylic acids such as paraoxybenzoic acid and 2-hydroxy-6-naphthoic acid; phenolic diols such as 4,4'-hydroxy-1,1'-biphenol and hydroquinone; or dicarboxylic acids such as 2,6-naphthalene dicarboxylic acid and 4,4'-biphenyl dicarboxylic acid. If the liquid crystalline resin is used as a barrier resin, polyester resins are preferred as base resins. Moreover, if a polyester resin is used as the base resin, it is at least partially compatible with the thermoplastic liquid crystalline resin and the resulting blend thereof is quite suitable for stretch blow molding.

Moreover, the gas barrier properties of the resulting compound container may be improved by improving the compatibility of the blend and the dispersibility of the harrier material.

A still further example of the gas barrier resin usable herein is a polyethylene terephthalate resin and it is also important in the present invention to use a combination of a polyethylene terephthalate resin which is one of currently used polyester resins with a polyethylene terephthalate resin serving as a gas barrier resin. Polyethylene terephthalate resins have widely been used in large amounts as cheap materials for stretch blow-molded containers, while the polyethylene terephthalate resin serving as a gas barrier resin is excellent in gas barrier properties and heat resistance, but it is very expensive and therefore, have not widely been used. In this fifth embodiment, the use of such a combination which comprises 1 to 10% of a polyethylene terephthalate serving as a gas barrier resin can provide a material excellent in stretchability, permits molding of the inner container 52 integrally with the outer container 51 and permits the production of a material for containers having well-balanced quality and cost.

Moreover, if a non-crystalline polyolefin resin (such as a cyclic polyolefin resin) is blended with a polyester resin as a base material, the problem such that the polyester resin has a low water vapor barrier properties can be eliminated. The cyclic polyolefin resin is incorporated into the resin composition mainly comprising such a polyester resin in an amount preferably ranging from 5 to 20%. This is because if the added amount of the cyclic polyolefin resin is lower than the lower limit defined above, the resulting container does not have sufficiently improved water vapor barrier properties, i.e., any container having desired quality cannot be obtained. On the other hand, if the added amount of the cyclic polyolefin is too high, the resulting resin composition sometimes suffers from a problem in that it has insufficient oxygen gas barrier properties and poor stretch blow-moldability.

As the non-crystalline polyolefin resin, there may be used, for instance, olefin-cyclic olefin copolymer resins. Examples of such cyclic olefins include bicyclo(2,2,1)hept-2-ene or derivatives thereof, tetracyclo(4,4,0,12,5,17,10)-3-dodecene or derivatives thereof, hexacyclo(6,6,1,13,6,110,13,02,7,09,14)-4-heptadecene or derivatives thereof, octacyclo(8,8,0,12,9,14,7,111,10,113,16,03,8,012,17)-5-docosene or derivatives thereof, pentacyclo(6,6,1,13,6,02,7,09,14)-4-hexadecene or derivatives thereof, pentacyclo(6,5,1,13,6,02,7,09,13)-4-pentadecene or derivatives thereof, heptacyclo(8,7,0,12,9,14,7,111,16,03,8,012,16)-5-heneicosene or derivatives thereof, tricyclo(4,4,0,12,5)-3-undecene or derivatives thereof, tricyclo(4,3,0,12,5)-3-decene or derivatives thereof, pentacyclo(6,5,1,13,6,02,7,09,13)-4,10-pentadecadiene or derivatives thereof, pentacyclo(4,7,0,12,5,08,13,19,12)-3-pentadecene or derivatives thereof, pentacyclo(7,8,0,13,6,02,7,110,17,011,16,112,15)-4-eicosene or derivatives thereof and nonacyclo(9,10,1,14,7,03,8,02,10,012, 21,113,20,014,19,115,19)-5-pentacosene or derivatives thereof.

Examples of the olefin components copolymerized with the cyclic olefins are ethylene, propylene, butene-1, pentene-1,4-methylpentene, 3-methylpentene, hexene-1, heptene-1, octene-1, nonene-1 and decene-1. These olefin components may be used alone or in any combination. In the cyclic polyolefin copolymers comprising cyclic olefin moieties, the amount of the structural units derived from the olefin components such as ethylene ranges from 40 to 95 mole %, preferably 50 to 80 mole %. On the other hand, the desired effect can be obtained at a content of the structural units derived from the cyclic olefins of not less than 1 mole %, but if the content thereof is too low, a sufficient effect of improving the water vapor barrier properties which is the subject of this fifth embodiment cannot be expected. Accordingly, the content of the structural units derived from the cyclic olefins in general ranges from 5 to 60 mole % and preferably 20 to 50 mole % and thus the copolymer may comprise the randomly distributed structural units derived from olefins such as ethylene and those derived from cyclic olefins.

Another characteristic property of the fifth embodiment is that the inner container prepared through stretch blow molding which satisfies the requirements for both oxygen gas barrier and water vapor barrier properties may be prepared from a blend of a polyester resin as a main component and a non-crystalline polyolefin resin and a polyethylene naphthalate resin as barrier resin materials. A polyethylene terephthalate is used as the polyester resin, i.e., the main component and a resin composition comprising 5 to 20 parts by weight of a non-crystalline polyolefin resin and 2 to 10 parts by weight of a polyethylene naphthalate resin per 100 parts by weight of the polyester resin is subjected to stretch blow molding to give a compound container integrated with an outer container of paper. In this case, the non-crystalline polyolefin resin is used for improving the water vapor barrier properties of the resulting compound container, while the polyethylene naphthalate resin is used for the improvement of the oxygen gas barrier properties thereof. Examples of such blends which permit simultaneous improvement in these two physical properties are not limited to those listed above and include combinations of non-crystalline polyolefins and thermoplastic liquid crystalline resins and combinations of non-crystalline polyolefins and saponified products of ethylene-vinyl acetate copolymers and these combinations likewise permit the improvement in the foregoing physical properties. In this connection, if the saponified product is used for the improvement of the oxygen gas barrier properties, the amount thereof to be incorporated should be limited to a level on the order of 1 to 5% by weight. This is because the saponified product has high hygroscopicity by nature. For this reason, if the added amount of the resin is too high, the water vapor barrier properties of the resulting compound container may be impaired.

A still another characteristic property of the fifth embodiment is that materials for preparing the inner container through stretch blow molding may have a composition mainly comprising a polyolefin resin. Such polyolefin resins generally used include polypropylene resins, but is not limited to such specific polymers and may be, for instance, polyethylene resins such as high density polyethylene resins and low density polyethylene resins. As the barrier resins to be blended with the polyolefin resins, there may be selected, for instance, saponified products of ethylene-vinyl acetate copolymers, polyester resins, thermoplastic liquid crystalline resins and polyamide resins. These barrier resins has oxygen gas barrier properties higher than those observed for the polyolefin resins and greatly contribute to the improvement in the quality of the resulting compound container. The amount of the barrier resin to be blended with the polyolefin resin preferably ranges from 3 to 25% by weight for the saponified product of an ethylene-vinyl acetate copolymer. This is because if it is too high, the stretchability of the resulting blend is impaired or the resulting compound container per se becomes brittle.

If a polyester resin is used as the barrier resin, preferred are, for instance, polyethylene terephthalate resins and other copolymerized polyester resins, but the use of a resin having a high softening point is not preferred since it is difficult to process and shape the resulting blend without impairing the stretchability of the polyolefin resin. Therefore, the amount thereof to be incorporated preferably ranges from about 5 to 20% by weight. The same is true for polyamide resins and thermoplastic liquid crystalline resins as the barrier resins. In general, the polyolefin resins do not have good compatibility with the foregoing barrier resins. Therefore, if a compatibilizing agent is added to the blend composition, the resulting blend can be improved in the stretch blow-moldability, and the strength and gas barrier properties of the stretch blow-molded compound container can be improved.

Moreover, if a non-crystalline polyolefin resin is used as the barrier resin, the water vapor barrier properties of the polyolefin resin can substantially be improved and accordingly, the non-crystalline polyolefin resin can be incorporated into the blend in an amount ranging from 5 to 80% by weight. If the added amount of the non-crystalline polyolefin resin is small, the water vapor barrier properties are not improved, while if it is too high, the falling impact resistance of the resulting compound container prepared through stretch blow molding is often impaired. If the polyolefin resin as the main component has insufficient compatibility with the non-crystalline polyolefin resin, a compatibilizing agent may be added to the polymer blend to thus improve physical properties of the resulting compound container.

Examples of the compatibilizing agents usable herein generally include polymerized products obtained by grafting maleic anhydride to polymers mainly comprising polyolefins and grafted vinyl polymers and further include, in addition thereto, ethylene-glycidyl methacrylate copolymers, ethylene-ethyl acrylate copolymers and ethylene-vinyl acetate copolymers.

A still further characteristic property of this fifth embodiment is that the outer member of paper and the inner container prepared by stretch blow molding are united to one another. The compound container according to this embodiment has high strength since the outer member and the inner container are firmly united and the inner container and the outer member make up for strengths of each other. Therefore, the compound container ensures the shape retention when it is filled with contents and put on the market and the amount of materials to be used can be reduced. In this respect, however, the outer member and the inner container is not necessarily united completely or may partially be united.

For instance, a part of the bottom edge portion of the inner container may be separated as shown in FIG. 15.

Figure 16:
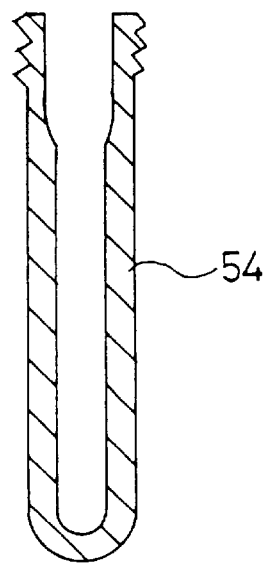
FIG. 16 is a cross sectional view illustrating a preform used for stretch blow-molding.

The foregoing materials are stretch blow-molded into the compound container according to this embodiment having its desired ultimate shape, but it is also possible to preparing a pre-molded body 53 (preform) for use in stretch blow molding as shown in FIG. 16 by injection-molding the foregoing blend, heating the preform 54 to a temperature suitable for stretching, introducing it into a mold for stretch blow molding in which an outer member of paper is inserted and fixed thereto, closing the mold, and then stretch blow-molding the preform 54 using a stretching rod and high pressure air to thus unify the inner container to the outer container 51 and to thus give a compound container 50.

Then Examples of the compound container according to the fifth embodiment will hereinafter be described in more detail.

Example 1 of Fifth Embodiment

To 100 parts by weight of a polyethylene terephthalate resin, there was added 7 parts by weight of a saponified product of an ethylene-vinyl acetate copolymer followed by injection-molding the resulting blend into a preform 54 (see FIG. 16). A beautiful pattern was printed on the surface of cardboard having a basis weight of 250 g, while an adhesive resin mainly comprising an ethylene-vinyl acetate copolymer was printed on the back face thereof as a thin film, then the cardboard was cut into pieces having a desired size and bent to give an outer container, followed by arranging the outer container in a mold for stretch blow molding and fixing thereto, inserting the preform 54 previously heated to 105° C. into the mold and stretch blow-molding the preform. The resulting molded article was a container which comprised an inner stretch blow-molded article having an average thickness of the trunk part of 0.2 mm, in which the outer container 51 and the inner container 52 were united and which had high strength. The inner volume of the container was found to be about one liter.

Example 2 of Fifth Embodiment

To 100 parts by weight of a polyethylene terephthalate resin, there was added 10 parts by weight of a m-xylylene group-containing polyamide resin followed by injection-molding the resulting blend into a preform in the same mold used in Example 1. A beautiful pattern was printed on the surface of cardboard having a basis weight of 250 g, while an adhesive resin mainly comprising an ethylene-vinyl acetate copolymer was printed on the back face thereof as a thin film, then the cardboard was cut into pieces having a desired size and bent to give an outer container, followed by arranging the outer container in a mold for stretch blow molding and fixing thereto, inserting the preform 54 previously heated to 105° C. into the mold and stretch blow-molding the preform. The resulting molded article was a container which comprised an inner stretch blow-molded article having an average thickness of the trunk part of 0.2 mm, in which the outer container 51 and the inner container 52 were united and which had high strength.

Example 3 of Fifth Embodiment

To 100 parts by weight of a polyethylene terephthalate resin, there were added 7 parts by weight of Vectra A available from Ceraneese Company and 4 parts by weight of ethylene-glycidyl methacrylate copolymer as a compatibilizing agent followed by injection-molding the resulting blend into a preform 54 using the same mold used in Example 1. A beautiful pattern was printed on the surface of cardboard having a basis weight of 150 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing thereto, inserting the preform 54 previously heated to 120° C. into the mold and stretch blow-molding the preform. The resulting molded article was a container in which the outer container 51 and the stretch blow-molded inner container were united and which had high strength.

Example 4 of Fifth Embodiment

To 100 parts by weight of a polyethylene terephthalate resin, there was added 5 parts by weight of polyethylene naphthalate resin as a barrier resin followed by injection-molding the resulting blend into a preform 54 using the same mold used in Example 1. A beautiful pattern was printed on the surface of cardboard having a basis weight of 150 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing thereto, inserting the preform 54 previously heated to 120° C. Into the mold and stretch blow-molding the preform. The resulting molded article was a container in which the outer container 51 and the stretch blow-molded inner container were united and which had high strength.

Example 5 of Fifth Embodiment

To 100 parts by weight of a polyethylene terephthalate resin, there were added 20 parts by weight of a cyclic olefin copolymer which comprised 65 mole % of an ethylene moiety and 35 mole % of a cyclic olefin moiety and 5 parts by weight of ethylene-glycidyl mathacrylate copolymer as barrier resins followed by injection-molding the resulting blend into a preform 54 using the same mold used in Example 1.

A beautiful pattern was printed on the surface of cardboard having a basis weight of 150 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing thereto, inserting the preform 54 previously heated to 120° C. into the mold and stretch blow-molding the preform. The resulting molded article was a container in which the outer container 51 and the stretch blow-molded inner container were united and which had high strength.

Example 6 of Fifth Embodiment

To 100 parts by weight of a polyethylene terephthalate resin, there were added 10 parts by weight of a cyclic olefin copolymer which comprised 65 mole % of an ethylene moiety and 35 mole % of a cyclic olefin moiety, 10 parts by weight of a m-xylylene group-containing polyamide resin and 5 parts by weight of ethylene-glycidyl mathacrylate copolymer as barrier resins followed by injection-molding the resulting blend into a preform 54 using the same mold used in Example 1. A beautiful pattern was printed on the surface of cardboard having a basis weight of 150 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing thereto, inserting the preform 54 previously heated to 120° C. into the mold and stretch blow-molding the preform. The resulting molded article was a container in which the outer container 51 and the stretch blow-molded inner container were united and which had high strength.

Example 7 of Fifth Embodiment

To 100 parts by weight of a polyethylene terephthalate resin, there were added 10 parts by weight of a cyclic olefin copolymer which comprised 65 mole % of an ethylene moiety and 35 mole % of a cyclic olefin moiety, 8 parts by weight of a saponified product of an ethylene-vinyl acetate copolymer and 5 parts by weight of ethylene-glycidyl mathacrylate copolymer as barrier resins followed by injection-molding the resulting blend into a preform 54 using the same mold used in Example 1. A beautiful pattern was printed on the surface of cardboard having a basis weight of 150 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing thereto, inserting the preform 54 previously heated to 120° C. into the mold and stretch blow-molding the preform. The resulting molded article was a container in which the outer container 51 and the stretch blow-molded inner container were united and which had high strength.

Example 8 of Fifth Embodiment

To 100 parts by weight of a polypropylene resin, there was added 20 parts by weight of a cyclic olefin copolymer which comprised 65 mole % of an ethylene moiety and 35 mole % of a cyclic olefin moiety as a barrier resin followed by injection-molding the resulting blend into a preform 54 using the same mold used in Example 1. A beautiful pattern was printed on the surface of cardboard having a basis weight of 150 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing thereto, inserting the preform 54 previously heated to 130° C. into the mold and stretch blow-molding the preform. The resulting molded article was a container in which the outer container 51 and the stretch blow-molded inner container were united and which had high strength.

Example 9 of Fifth Embodiment

To 100 parts by weight of a polypropylene resin, there were added 7 parts by weight of Vectra A available from Ceraneese Company and 4 parts by weight of ethylene-glycidyl methacrylate copolymer as a compatibilizing agent followed by injection-molding the resulting blend into a preform 54 using the same mold used in Example 1. A beautiful pattern was printed on the surface of cardboard having a basis weight of 150 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing thereto, inserting the preform 54 previously heated to 130° C. into the mold and stretch blow-molding the preform. The resulting molded article was a container in which the outer container 51 and the stretch blow-molded inner container were united and which had high strength.

Example 10 of Fifth Embodiment

To 100 parts by weight of a polypropylene resin, there were added 7 parts by weight of a saponified product of an ethylene-vinyl acetate copolymer and 3 parts by weight of ethylene-α-olefin copolymer which had been modified with an organic acid followed by injection-molding the resulting blend into a preform 54 (see FIG. 16). A beautiful pattern was printed on the surface of cardboard having a basis weight of 250 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing thereto, inserting the preform 54 previously heated to 120° C. into the mold and stretch blow-molding the preform. The resulting molded article was a container which comprised an inner stretch blow-molded article having an average thickness of the trunk part of 0.2 mm, in which the outer container 51 and the inner stretch blow-molded container were united and which had high strength.

Example 11 of Fifth Embodiment

To 100 parts by weight of a polypropylene resin, there were added 7 parts by weight of a polyethylene terephthalate resin and 3 parts by weight of ethylene-α-olefin copolymer which had been modified with an organic acid followed by injection-molding the resulting blend into a preform 54. A beautiful pattern was printed on the surface of cardboard having a basis weight of 250 g, while an adhesive resin mainly comprising an ethylene-vinyl acetate copolymer was printed on the back face thereof as a thin film, then the cardboard was cut into pieces having a desired size and bent to give an outer member, followed by arranging the outer member in a mold for stretch blow molding and fixing it thereto, inserting the preform 54 previously heated to 120° C. into the mold and stretch blow-molding the preform. The resulting molded article was a container which comprised an Inner stretch blow-molded article having an average thickness of the trunk part of 0.2 mm, in which the outer container 51 and the inner stretch blow-molded container were united and which had high strength.

Comparative Example 1 of Fifth Embodiment

The same procedures used in Example 1 of the fifth embodiment were repeated except that a polyethylene terephthalate resin alone was substituted for the polymer blend used in Example 1 to give a container. The resulting molded article was a container which comprised an inner stretch blow-molded article having an average thickness of the trunk part of 0.2 mm, in which the outer container 51 and the inner stretch blow-molded container were united and which had high strength.

Comparative Example 2 of Fifth Embodiment

The same procedures used in Example 8 of the fifth embodiment were repeated except that a polypropylene resin alone was substituted for the polymer blend used in Example 8 to give a container. The resulting molded article was a container which comprised an inner stretch blow-molded article having an average thickness of the trunk part of 0.2 mm, in which the outer container 51 and the inner stretch blow-molded container were united and which had high strength.

Comparative Example 3 of Fifth Embodiment

A preform 53 was formed by injection-molding a polyethylene terephthalate resin alone using the same mold used in Example 1 of the fifth embodiment. The preform 53 was stretch blow-molded in a currently used mold to give a container having an inner volume of one liter. A beautiful pattern was printed on the surface of cardboard having a basis weight of 150 g, while an adhesive resin mainly comprising an ethylene-vinyl acetate copolymer was printed on the back face thereof as a thin film, then the cardboard was cut into pieces having a desired size and bent to give an outer member, followed by coating a hot melt agent on the surface of the stretch blow-molded container to thus unite the outer member with the blow-molded container. The resulting molded article was a container in which the outer container 51 and the inner stretch blow-molded container were not sufficiently united and which had insufficient strength.

Comparative Example 4 of Fifth Embodiment

A preform 53 was formed by injection-molding a polypropylene resin alone using the same mold used in Example 1 of the fifth embodiment. The preform 53 was stretch blow-molded in a currently used mold to give a container having an inner volume of one liter. A beautiful pattern was printed on the surface of cardboard having a basis weight of 250 g, while an adhesive resin mainly comprising an ethylene-vinyl acetate copolymer was printed on the back face thereof as a thin film, then the cardboard was cut into pieces having a desired size and bent to give an outer member, followed by coating a hot melt agent on the surface of the stretch blow-molded container to thus unite the outer member with the blow-molded container. The resulting molded article was a container in which the outer container 51 and the inner stretch blow-molded container were not sufficiently united and which had insufficient strength.

Physical properties of the compound containers according to the fifth embodiment are summarized In the following Tables 6 and 7.

TABLE 6

Polyester System

| Ex. No. | Oxygen Gas Permeability $cm^3$/bottle · day · atm | Water Vapor Permeability g/bottle · day |
|---|---|---|
| 1 | 0.09 | 0.18 |
| 2 | 0.11 | 0.16 |
| 3 | 0.08 | 0.11 |
| 4 | 0.13 | 0.16 |
| 5 | 0.25 | 0.08 |
| 6 | 0.18 | 0.12 |
| 7 | 0.13 | 0.15 |
| 1* | 0.17 | 0.16 |
| 3* | 0.19 | 0.20 |

Conditions for Determination:
Oxygen Gas Permeability Determination: 25° C., 65% RH
Water Vapor Permeability: 40° C., 90% RH
*Comparative Example

TABLE 7

Polypropylene System

| Ex. No. | Oxygen Gas Permeability $cm^3$/bottle · day · atm | Water Vapor Permeability g/bottle · day |
|---|---|---|
| 8 | 2.9 | 0.033 |
| 9 | 2.1 | 0.035 |
| 10 | 2.3 | 0.042 |
| 11 | 3.1 | 0.041 |
| 2* | 4.5 | 0.042 |
| 4* | 4.9 | 0.060 |

Conditions for Determination:
Oxygen Gas Permeability Determination: 25° C., 65% RH
Water Vapor Permeability: 40° C., 90% RH
*Comparative Example Examples and Comparative Examples concerning the compound containers whose base resin is a polyester type one are summarized in Table 6. The compound container of Comparative Example 1 is produced by stretch blow-molding an inner container in a mold using a polyethylene terephthalate resin alone to thus unite an outer member to the inner container. The compound container of Comparative Example 3 is produced by separately stretch blow-molding a polyethylene terephthalate resin alone into a bottle and then unifying the bottle to an outer member of paper.

In Table 6, the compound containers produced in Examples 1, 2, 3, 4 and 7 are improved in the oxygen gas barrier properties and those produced in Examples 5 and 6 are improved in the water vapor barrier properties.

The compound container of Comparative Example 3 exhibits poor strength.

Examples and Comparative Examples concerning the compound containers whose base resin is a polypropylene resin are summarized in Table 7. The compound container of Comparative Example 2 is produced by stretch blow-molding an inner container in a mold using a polypropylene resin alone to thus unite an outer member to the inner container. The compound container of Comparative Example 4 is produced by separately stretch blow-molding a polypropylene resin alone into a bottle and then unifying the bottle to an outer member of paper.

In Table 7, the compound containers produced in Examples 8 and 9 are improved in both oxygen gas barrier and water vapor barrier properties, while those produced in Examples 10 and 11 are improved in the oxygen gas barrier properties.

The compound container of Comparative Example 4 exhibits poor strength.

The compound container according to the fifth embodiment is excellent in the oxygen gas barrier properties and/or the water vapor barrier properties. Moreover, the outer member of paper and the inner container member produced by stretch blow-molding a blend material are united so as to ensure sufficient strength and therefore, the amount of the material used for producing the outer member and that of the material used for preparing the stretch blow-molded inner container can be reduced as compared with that required for the production of the conventional compound container. Thus, the compound container of the present invention is excellent from the viewpoint of environmental protection.

Then a sixth embodiment of the compound container according to the present invention will hereinafter be explained in detail.

First, the compound container produced by the present Invention will be discussed below.

FIG. 21(A) is a plan view showing the compound container, FIG. 21(B) is an elevational view of the compound container and FIG. 21(C) is a bottom view of the compound container. The compound container 60 comprises a bottom part 61, a trunk part 62, an opening 63 and a shoulder part 64 positioned between the trunk part 62 and the opening 63.

The bottom part 61 is approximately in a square shape and correspondingly, the cross section of the trunk part 62 is approximately in a square shape. The cross section of the shoulder part 64 is gradually reduced upwardly and the narrowest portion of the shoulder part 64 is connected to the opening 63 having a circular section.

The compound container 60 comprises an outer container 66 (also called carton) which extends from the bottom part 61 to the shoulder part 64 through the trunk part 62 and an Inner container 60 made from PET which has a roughly square cross section and extends from the bottom part 61 to the opening 63 through the trunk part 62 and the shoulder part 64.

Figure 20B:
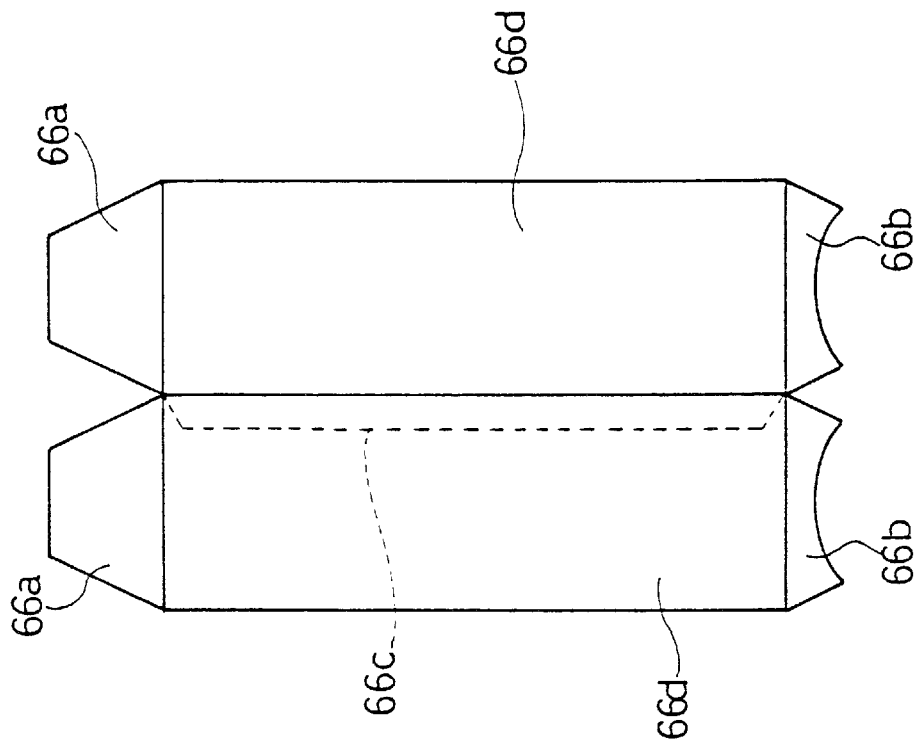
FIG. 20(B) is an elevational view thereof.
Figure 20A:
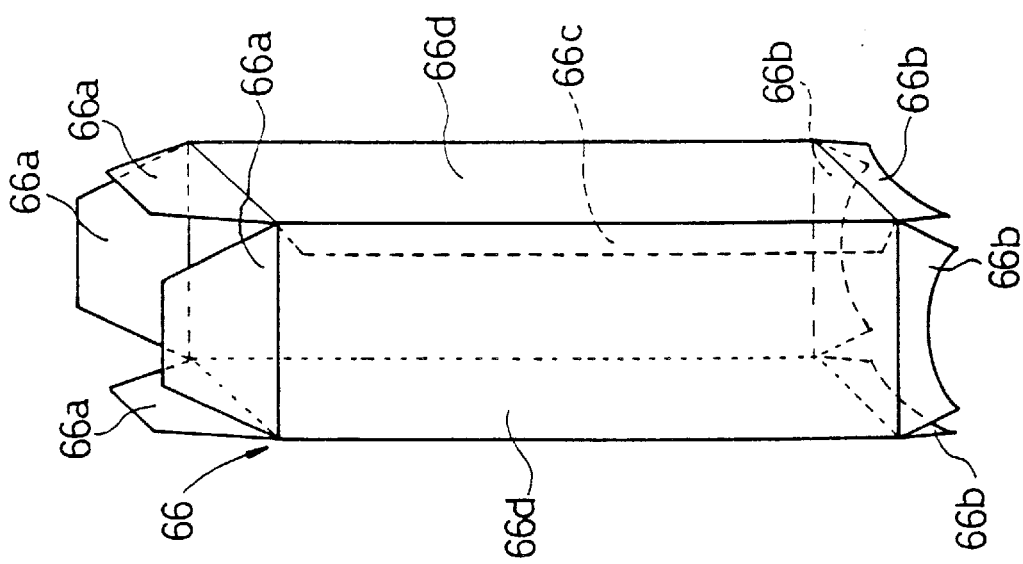
FIG. 20(A) is a perspective diagram showing the outer container used in the production process shown in FIG. 17

The outer container 66 has a shape as shown in FIG. 20(A) prior to the incorporation thereof into the compound container. More specifically, the outer container 66 comprises a sheet of paper which is constituted by four rectangular trunk-pieces 66d constituting a longitudinally elongated rectangular parallelopipedon, four shoulder pieces 66a each connected to the upper edge of the corresponding trunk-piece 66d and four bottom-pieces 66b each connected to the lower edge of the corresponding trunk-piece 66d and the sheet of paper is adhered at an overlap width 66c to form the longitudinally elongated rectangular parallelopipedon as shown in FIGS. 20(A) and 20 (B). The outer container having such a structure is flattened by crushing the trunk-pieces 66d as shown in FIG. 20(B) before being fitted to a mold and a large number of such flattened outer containers 66 are piled up and received in a container for accommodating the same.

Figure 21:
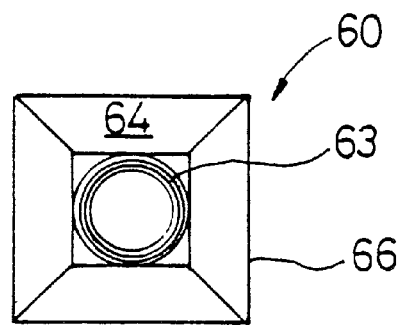
FIG. 21(A) is a plan view illustrating the compound container.
FIG. 21(B) is a side elevational view thereof and FIG. 21(C) is a bottom view thereof.
Figure 21:
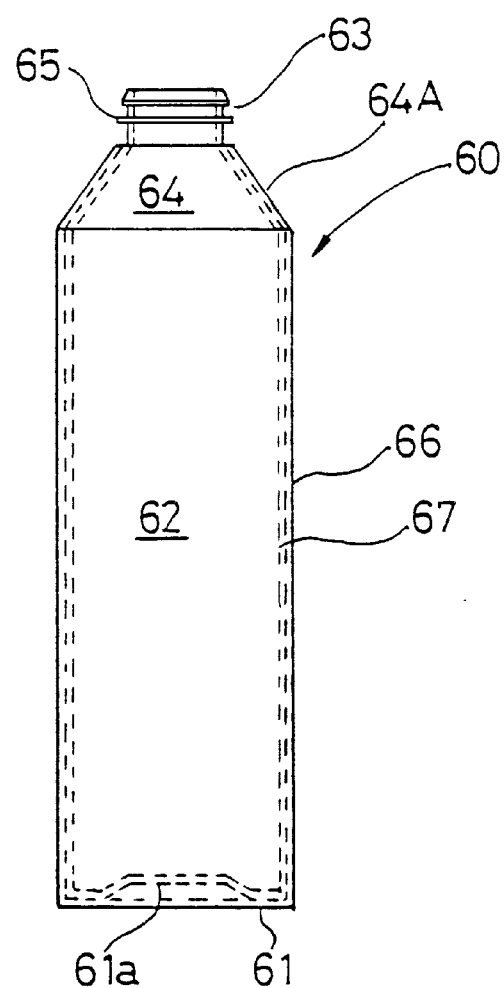
Figure 21:
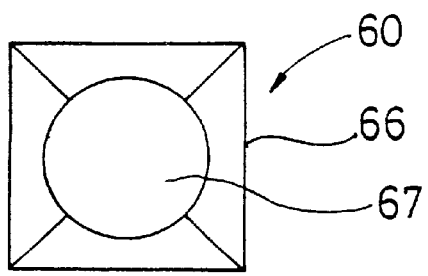

In this case, the inner container 67 is constituted by a bottom part 61A, a trunk part 62A and a shoulder part 64A, which correspond to the bottom part 61, the trunk part 62 and the shoulder part 64 of the compound container 60 respectively, as well as an opening 63 and the opening part 63 Is provided with flange parts 65, as shown in FIG. 21.

Then the bottom-mold used in this embodiment will be explained below in detail.

FIG. 18(A) is a plan view of the bottom-mold, FIG. 18(B) is an elevational view of the same and FIG. 18(C) Is a bottom view thereof.

This bottom-mold 70 is a mold for forming the bottom part of the compound container 60 shown in FIGS. 20 and 21 and is provided with a cavity 71 for inserting the bottom 61 of the outer container 66 and supporting the outer container 66.

The cross section of the cavity 71 has a square shape like the cross sectional shape of the outer container 66 and the size thereof is designed such that it is identical to or slightly larger than the size of the cross section of the outer container 66. The four side walls 71a of the cavity 71 serves to form the sides of the compound container 60 near the lower edges of the trunk part 62 thereof and each side wall 71a is provided with an aperture 71b at the center as shown in FIG. 18(B).

Moreover, four apertures 72 corresponding to these four apertures 71b are formed through the bottom face of the bottom mold 70 and the aperture 71b and the corresponding aperture 72 are communicated to one another through a passage 73.

The bottom face of the cavity 71 is slightly and upwardly projected at the center thereof so that the bottom part 61A of the resulting compound container 60 is inwardly concaved to improve the strength thereof at the bottom and to thus make the bottom withstand the weight of contents to be accommodated therein.

Each of four outer walls 74 of the bottom mold 70 which are parallel to the side walls 71a is provided with a corresponding laterally elongated projected part 75.

When the bottom mold 70 is combined with another mold as will be detailed later, these projected parts 75 serve to accurately place the bottom mold 70 at its position with respect to the other mold.

Then molds other than the bottom mold 70 used in this embodiment, i.e., a pair of split molds 76 for forming the trunk part 62, the shoulder part 64 and a part of the opening 63 of the compound container shown in FIG. 21 will be detailed below.

In this connection, the paired split molds 76, 76 are parallel to one another with respect to the plane on which they are combined together and therefore, only one of them will be explained below.

Figure 19A:
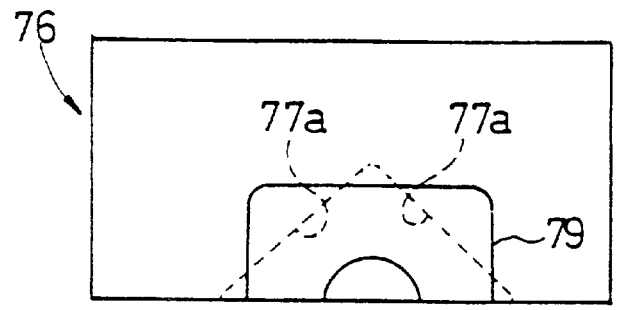
FIG. 19(A) is a plan view showing a pair of split mold parts of the mold used in the production process shown in FIG. 17.
Figure 19B:
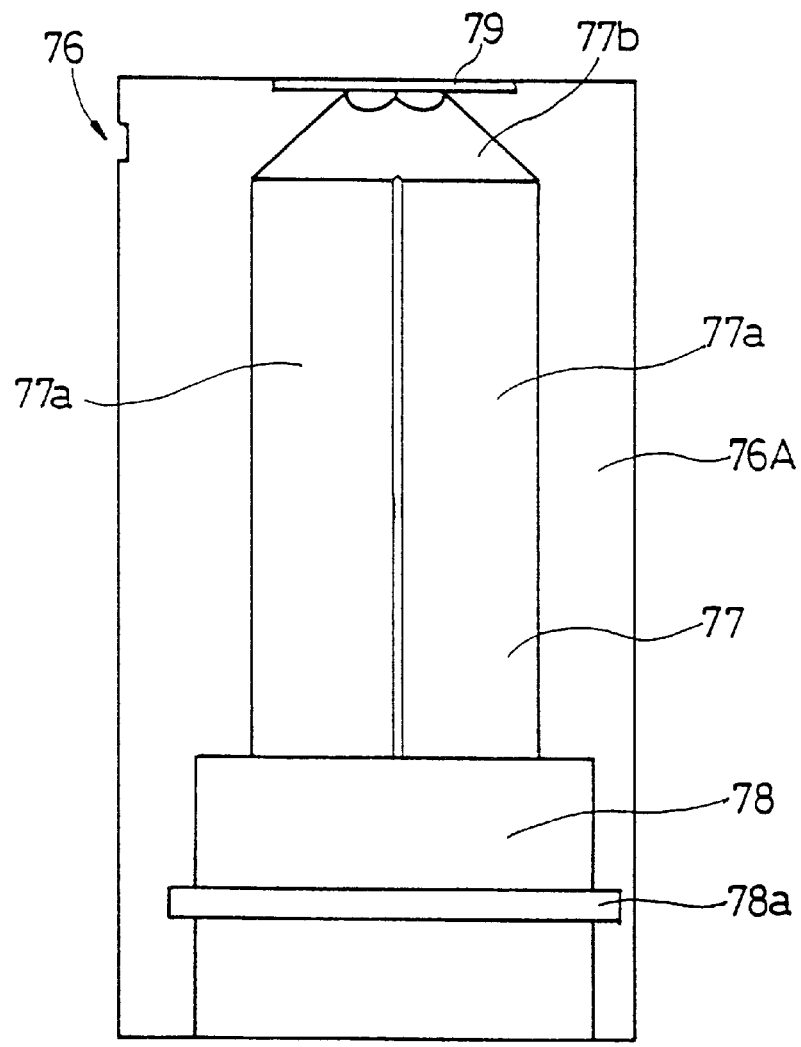
FIG. 19(B) is an elevational view thereof and FIG. 19(C) is a bottom view thereof.
Figure 19C:
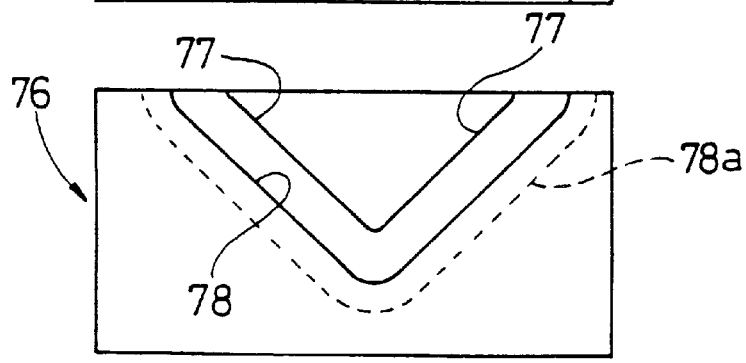

FIG. 19(A) is a plan view of the split mold, FIG. 19(B) is an elevational view thereof and FIG. 19(C) is a bottom view of the same.

The split mold 76 has a mold surface 76 A which comprises, for instance, a cavity wall 77 having a shape corresponding to the shape of the compound container 60 and a cavity wall 78 to which the bottom mold 70 is fitted.

The cavity wall 77 comprises a wall face 77a for molding the outer face of the trunk part 62 of the container 60 and a wall face 77b for molding the outer face of the shoulder part 64 thereof.

A recess 79 is formed on the upper edge of the split mold 76 and the flange part 65 of the opening 63 is arranged in the recess 79 when a preform 80 used for producing the container 60 is fitted to the mold.

When the foregoing bottom mold 70 is combined with the split mold, the cavity wall 78 serves to form a space for fitting the bottom mold 70 to the split mold 76. When combining it with the bottom mold 70, the projected part 75 of the bottom mold 70 is fitted to a recess 78a formed on the wall face of the cavity 78.

Incidentally, a template 82 which comprises right and left split bodies is combined with the split mold 76 at the upper portion thereof as shown in FIG. 17. This template forms the upper portion of the preform 80, but these template 82 and holder 83 used herein are known ones and therefore, the details thereof is herein omitted. In the method for producing the compound container 60 according to the embodiments of the present invention, the container 60 is stretch blow-molded using such a mold.

The method for producing the compound container 60 will be detailed below referring to the flow diagram shown in FIG. 17.

A large number of outer containers 66 are flattened as shown in FIG. 20(B) and accommodated in a feeder 81 and one of the outer containers 66 is withdrawn from the feeder 81 in a step A and then formed into a box-like shape as shown in FIG. 20(A) by a means for forming the outer container (not shown).

At this stage, the shoulder parts 66a and the bottom parts 66b are simultaneously and inwardly folded by the same outer container forming means.

In this respect, an adhesive which is converted into a sticky condition through heating and shows its adhesive action is applied onto the inner face of the outer container 66.

In a step B, the outer container 66 formed into such a box-like shape is transferred to the position of the bottom mold 70 by a conveying means (not shown).

The bottom mold 70 is fitted to a rotating mechanism (not shown) while the cavity wall face 71 lays down, when the rotating mechanism is interrupted at a point P1, the bottom part of the outer container 66 transported by the conveying means is fitted to the bottom mold 70 while the portion of the trunk part 66 near the bottom and the bottom part 66b are inserted into the cavity 71.

At this stage, the air is aspirated by an aspiration means (not shown) through the opening 72 of the bottom mold 70, i.e., through the passage 73 and as a result, the portion of the trunk part 66 (of the outer container 66 thus fitted) near the bottom and the bottom part 66b are adhered to the opening 71b on the side wall of the cavity wall face 71, respectively.

Thus, the outer container 66 is surely fitted to and supported by the bottom mold 70 (a step C, i.e., the step for fitting the outer container according to the present invention).

Thereafter, the rotating mechanism rotates in the counterclockwise direction and correspondingly, both of the bottom mold 70 and the outer container 66 also circulate.

Then when the bottom mold reaches a point P2 just above the point P1, the rotating mechanism is interrupted while the outer container 66 on the bottom mold 70 points upward.

On the other hand, when the outer container 66 is withdrawn from the feeder 81 and formed into a box-like shape, the preform 80 used for forming a compound container is heated to about 90° C., then fed to a holder 83 placed above the point P2 and held by the holder 83 in such a manner that the opening thereof points upward (a step D, i.e., the step for holding the preform).

Then, in a step E, the bottom mold 70 on the point P2 moves upward by a means for ascending and descending the same (not shown), the preform 80 is thus inserted and accommodated in the outer container 66 fitted to the bottom mold 70 at a predetermined position and then stopped at that position (a step for inserting the preform).

Incidentally, the preform 80 is a preform made from PET having a closed bottom which is produced by injection molding or extrusion blow molding.

Then a pair of split molds 76 are horizontally shifted towards the outer container 66 from the opposite sides thereof respectively by the action of a driving means (not shown) and combined with the bottom mold 70 such that the cavity 78 of the split molds accommodates the bottom mold 70 (a step for combining the molds).

A pair of templates 82 are likewise combined thereto.

At this stage, the outer face of the outer container 66 fitted to the bottom mold 70 is approximately brought into close contact with the corresponding wall faces 77a and 24 of the split molds 76.

In this connection, only one of the paired split molds 76 is shown in FIG. 17. In fact, the other split mold is placed at the foreside of the figure so as to face the split mold 76 depicted on the figure.

Therefore, the paired split molds 76 are initially placed at the foreside and backdise of the figure respectively so as to oppose to one another and sandwich the outer container depicted on the figure at a predetermined distance, then come close to one another by the action of the foregoing driving means and combined with one another on the figure plane.

In this respect, when the split molds are combined with the bottom mold 70, the four projected part 75 of the bottom mold 70 are fitted to the corresponding grooves 78a formed on the split molds 76 and as a result, the split molds 76 are accurately aligned with the bottom mold 70 and thus the bottom mold 70 is fixed to the paired split molds 76.

After assembling these molds, a desired stretching rod is inserted into the preform 80 through the opening thereof, the preform 80 is stretched by the action of the stretching rod in the longitudinal direction thereof (a step for stretching), compressed air is, at the same time, injected into the preform 80 through the opening 63 and the preform 80 thus undergoes expansion within the mold, i.e., within the outer container 66.

An inner container 67 is thus molded and completed while the outer wall thereof is closely adhered to the inner wall of the outer container 66 (a step for blowing).

Moreover, an adhesive applied onto the inner wall of the outer container 66 is heated and thus melted, at this stage, by the inner container 67 maintained at a high temperature and thus the inner wall of the outer container 66 is adhered to the outer wall of the inner container due to the adhesive action thereof.

Then a compound container 60 thus completed as shown in FIG. 21 is removed from the molds by releasing the molds 70, 76 and 82.

As has been discussed above, the method for preparing the compound container according to the present invention is designed in such a manner that the outer container 66 is, in advance, supported on the bottom mold 70 then the molds are combined at this stage and subsequently, the inner container 67 is formed through stretching and blowing steps to give the intended compound container 60.

For this reason, the production method does not require the use of any particular parts or devices for inserting the outer container 66 into the molds.

Moreover, the outer container 66 is directly fitted to the mold and this effectively permits the accurate alignment of the outer container 66 and the improvement in the production yield.

Moreover, the inner container 67 is formed through blow molding while holding the outer container 66 within the molds in this production method and this likewise permits the formation of the inner container 67 simultaneous with the integration of the outer container 66 with the inner container 67.

This leads to reduction of the number of steps required for the production as compared with the method in which an inner container 67 is separately formed using a mold and then an outer container 66 is fitted to the inner container by some means. In addition, the adhesive strength between the inner and outer containers 67 and 66 is very high and therefore, the resulting compound container has accordingly high strength.

In the foregoing embodiment, the bottom mold 70 is provided with the cavity walls 71, openings 71b, passages 73 and openings 72 as means for fitting the outer container 66 thereto, but the outer container 66 can be held simply by the cavity walls 71 through the frictional force acting between the outer wall of the container 66 and the side wall of the cavity 71 if the size of the cavity 71 is appropriately established.

It is also possible to adhere a thin plate of a flexible material such as rubber to the side wall of the cavity 71 to enhance the frictional force and to thus securely hold the outer container 66.

Moreover, an inner container of PET is used in this embodiment, but the present invention may of course be applied to compound containers comprising inner container made from plastics other than PET.

In addition, the fluid to be injected into the preform 80 may be various gases other than air so far as they can expand the preform 80 or may be a liquid.

In this embodiment, a compound container 60 having a square cross section is produced by way of example, but the container 60 may have any shape other than that having a square cross section.

In the method for preparing the compound container according to the present invention, as has been discussed above, an outer container is, in advance, fitted to and supported by a bottom mold, then a preform for producing an inner container is placed within the outer container, then other molds are assembled at this stage and finally the inner container is blow-molded. Therefore, the method does not require the use of particular parts or devices for inserting the outer container in the mold.

In addition, the outer container can accurately be placed at its position and the production yield may efficiently be improved since the outer container is directly fitted to the mold.

Moreover, the compound container of the present invention acquires sufficient strength even if the amount of plastics to be used is reduced. Therefore, the container may widely be used as a container for various liquids such as drinking water and alcoholic drinks, or various solid substances and powdery substances and can relieve the degree of environmental pollution.

The present invention permits the production of a compound container at a low cost and simultaneously contributes to the solution of the problem of environmental pollution.

Then a seventh embodiment of the compound container according to the present invention will hereinafter be described in detail.

Figure 22:
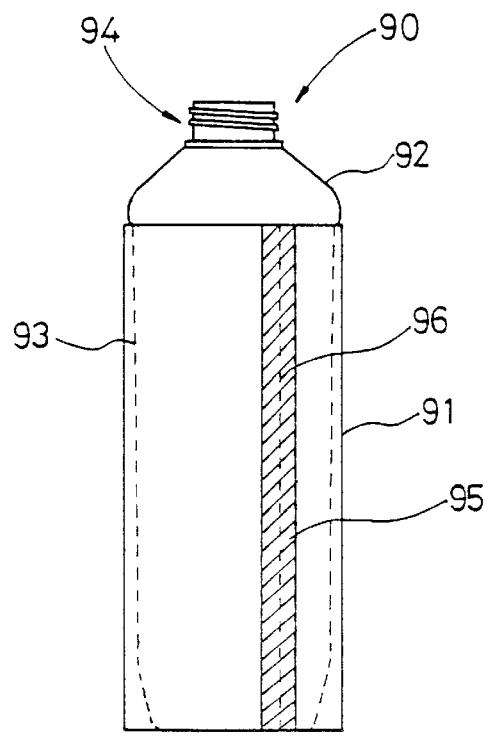
FIG. 22 is a side elevational view illustrating the compound container according to the embodiment Ver 7.1 of the present invention.

In FIG. 22 showing a compound container according to the seventh embodiment, the compound container 90 is constructed by an outer member 91 mainly comprising paper and a plastic inner container 92 accommodated in the outer container 91. The inner container 92 comprises a trunk part 93 and an opening 94 for pouring which are unitarily formed through blow molding.

Figure 23:
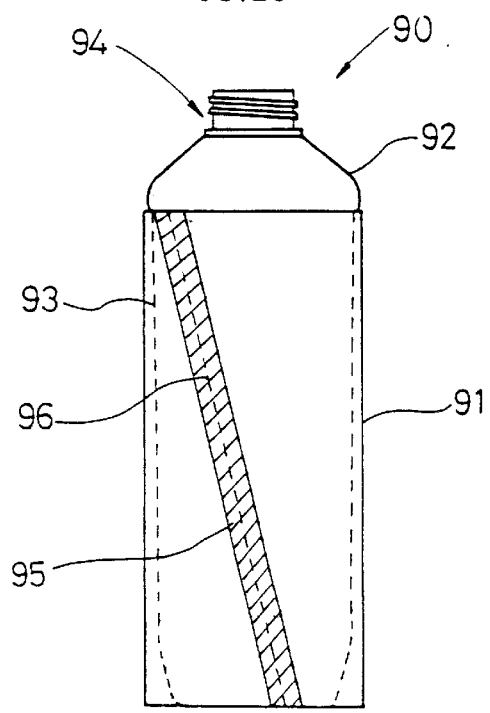
FIG. 23 is a side elevational view illustrating the compound container according to the embodiment Ver 7.2 of the present invention.
Figure 24:
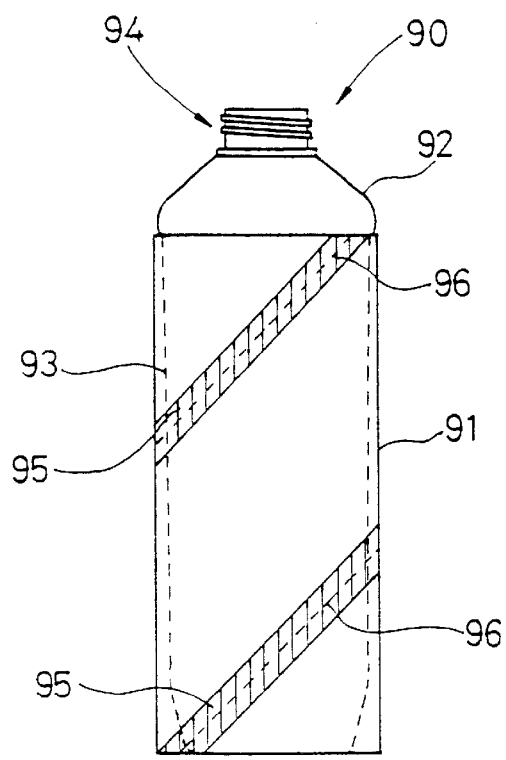
FIG. 24 is a side elevational view illustrating the compound container according to the embodiment Ver 7.3 of the present invention.
Figure 25:
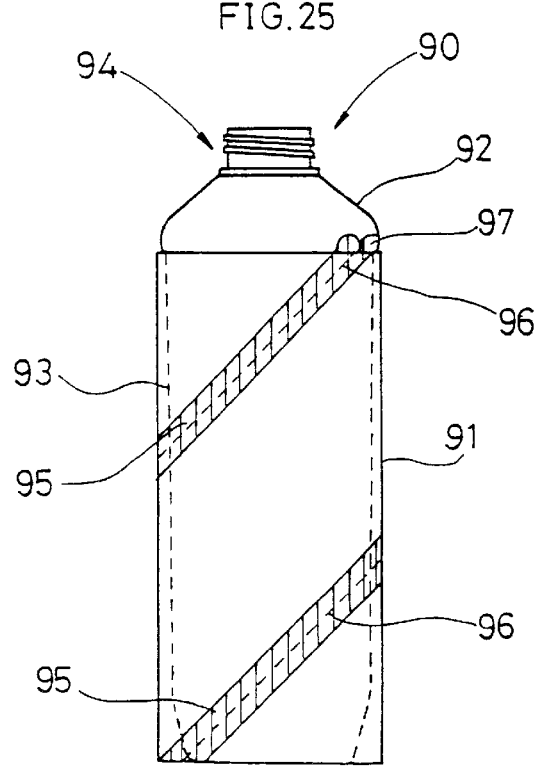
FIG. 25 is a side elevational view illustrating the compound container according to the embodiment Ver 7.4 of the present invention.

An important characteristic property of the seventh embodiment is that perforations are formed on the outer container of paper and that the compound container is provided with an un-adhered area 95, corresponding to the portion on which the perforations are formed (preferably an area extending on both sides of the perforations at a width of up to 20 mm), in which the outer container 91 is not adhered to the inner container 92. In the example shown in FIG. 22, the perforations are formed from the bottom to the upper edge of the outer container 91 through the trunk part thereof. This permits easy separation of the outer container 91 from the inner container 92, i.e., the outer container 91 can easily be detached from the compound container by cutting it along the perforations 96. The perforations 96 may be inclined as shown in FIG. 23 or may be spirally formed on the outer container 91 as shown in FIG. 24. Moreover, a knob 97 may be formed at the beginning of the perforations as shown in FIG. 25 and the presence of the knob 97 makes the cutting of the outer container 91 easier.

Incidentally, the perforations are not necessarily be formed from the bottom to the upper edge of the outer container 91 and may be partially formed starting from one end from which the cutting thereof is initiated, i.e., may be formed beginning from either the bottom edge or the upper edge which serves as a starting point for cutting of the outer container 91.

The plastic inner container is produced by blow molding, but preferably produced by stretch blow molding since the plastic molecules are oriented along the stretching direction and the mechanical strength of the resulting container is improved. Examples of materials suitably used in the stretch blow molding of the inner container are polyethylene terephthalate resins, polypropylene resins, resins having a high nitrile content, polystyrene resins, polyvinyl chloride resins and polycarbonate resins, with polypropylene resins being particularly preferred because of their good stretch blow-moldability as well as excellent water vapor barrier properties and hygienic quality. In this connection, the polypropylene resins used may be copolymers having ethylene moieties or may comprise a nucleating agent for crystallization.

The compound container shown in FIG. 22 is produced by the following method. First of all, a preform suitable for stretch blow molding is formed by injection molding. Then the preform is heated to a temperature suitable for stretching with an infrared heater and subjected to stretch blow molding in a mold for blow molding in which an outer container 91 provided with perforations 96 is inserted.

The foregoing is simply an example of the production method of the compound container and it is, accordingly, possible to fit a box-like or cylindrical outer container whose inner wall is coated with an adhesive to the trunk part of a previously blow-molded container to thus adhere and unite the outer container to the inner container.

The compound container of the present invention has the structure detailed above and the outer container is not adhered to the inner container near the area of the perforations. Therefore, if the outer container is cut along the perforations, the outer container can easily be separated from the Inner container, i.e., the paper part may easily be removed from the plastic part and they can be used as resources for recycle. Moreover, if the perforations are formed in such a manner that they do not simultaneously reach both edges of the outer container, the outer container is still in one piece even when it is cut along the perforations and this makes the disposal thereof easy.

If the shape of the perforations is variously changed (such as vertical line, inclined line or spiral-like shape) depending on the size and shape of the container, the outer container can easily be cut and removed from the inner container. Moreover, if a knob is formed at the end of the perforations, the outer container can more easily be cut.

Further the volume of the inner container can be reduced since it is a thin plastic container. Accordingly, the compound container can easily be handled after separating the outer container from the inner container, it can easily be disposed since the volumes of the separated outer and inner containers can be reduced. Consequently, the compound container of the present invention does not adversely affects the environment so much.

Example and Comparative Example of the 7th embodiment will be described below.

Example of 7th Embodiment

A preform was formed by injection-molding a polypropylene resin (KG300 available from Mitsui Petrochemical Industries, Ltd.). Then the preform was heated with an infrared heater and stretch blow-molded into an inner container in a mold for blow molding the same. The inner container was found to have a weight of 15 g, an inner volume of one liter and an average thickness of the trunk part thereof of 0.25 mm. An outer container of manila board having a thickness of 0.9 mm as shown in FIG. 24 and on which perforations were formed from the bottom edge to the end of the shoulder part through the trunk part was fitted to the outside of the inner container prepared above to give a compound container as shown in FIG. 22. After using the compound container, the outer container thereof could easily be cut and thus could easily be separated from the inner container. Moreover, the Inner container could be crushed to reduce the volume thereof.

Comparative Example of 7th Embodiment

The same procedures used in the foregoing Example except that an outer container free of any perforation was formed to give a compound container. After using the compound container, it was difficult to break the outer container and to thus separate the inner container from the outer container and as a result, the compound container had to be disposed in the form of the hollow body as such.

Since the compound container according to the 7th embodiment has the structure discussed above, if the outer container is cut along the perforations, the inner container can easily be removed, thus the paper part and the plastic part can be separated from one another and therefore, the structure of the compound container makes the disposal thereof easy. Moreover, the inner container is a thin plastic container and accordingly, the volume thereof can substantially be reduced by folding the same when the container is to be disposed. Thus, the compound container of this embodiment contributes to the reduction of the amount of waste.

In addition, the shape of the perforations can variously be changed (such as vetical line, inclined line and spiral-like shapes) depending on the size and the shape of the container and this makes the operation for cutting the outer container easy.

(8th Embodiment) (Japanese Patent Application Serial No. Hei 7-75499)

Figure 26:
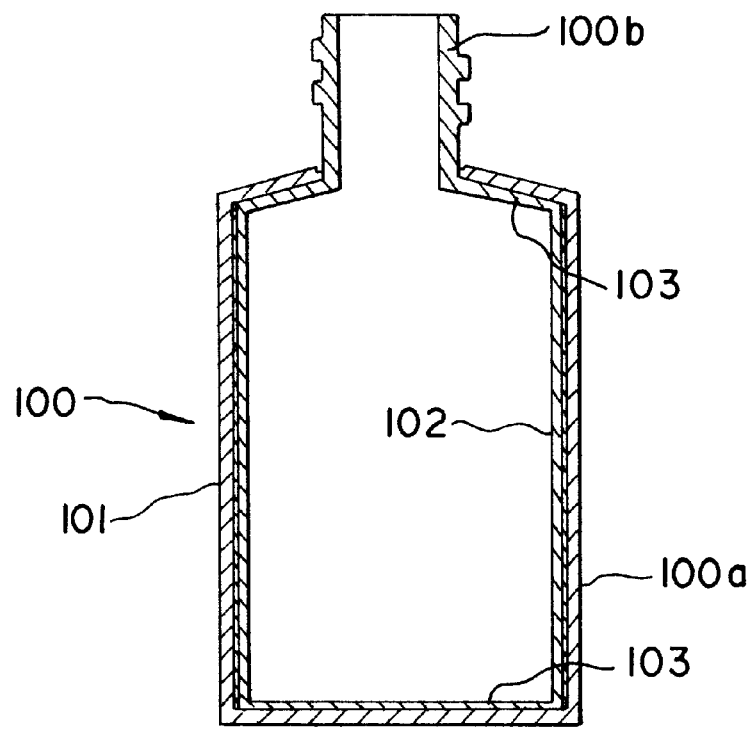
FIG. 26 is a cross sectional view showing the compound container according to the embodiment Ver 8.1 of the present invention.

The compound container according to the 8th embodiment of the present invention will hereinafter be described in detail with reference to the accompanying drawings. FIG. 26 is a diagram showing the compound container according to the 8th embodiment. This compound container 100 is composed of a cylindrical outer container 101 having a rectangular cross section and mainly comprising paper and a plastic inner container 102 accommodated in the outer container 101. The inner container 102 is produced by blow molding a preform and comprises a trunk part 100a and an opening 100b for pouring which are united. The outer and inner containers 101 and 102 are adhered through an adhesive 103 at the shoulder and bottom parts thereof. The compound container 100 shown in FIG. 26 has a cylindrical shape having a rectangular cross section but may have a cylindrical shape having a circular cross section or other shapes.

Examples of materials for producing the inner container 102 usable herein are polyethylene terephthalate resins, polypropylene resins, resins having a high nitrile content, polystyrene resins, polyvinyl chloride resins, polycarbonate resins, polyamide resins and saponified products of ethylene-vinyl acetate copolymers, which may be used in the form of a single-layered or multi-layered structure.

The adhesive used for assembling the compound container 100 is preferably a hot-melt adhesive which is not softened at the temperature for filling the container with contents and exhibits its adhesive action at the molding temperature of the inner container 102. Examples of such hot-melt adhesives are ethylene-vinyl acetate copolymers (EVA), ethylene-ethyl acrylate copolymers (EEA) and those each comprising an olefin as a main component.

Figure 27A:
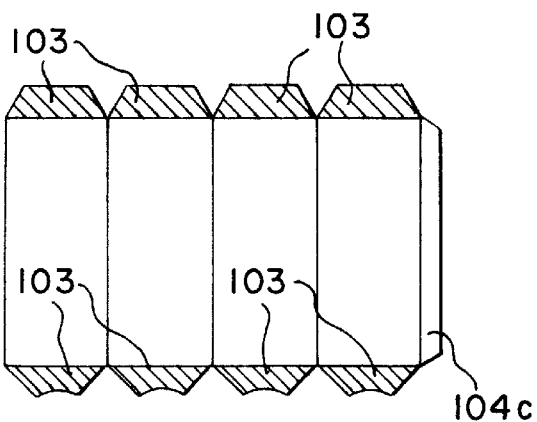
FIG. 27(*a*) is an extend elevation of the outer container according to the embodiment Ver 8.1 of the present invention.

An example of the methods for preparing the compound container 100 is as follows. First, a hot-melt adhesive 103 is applied onto one side of paperboard 104 as shown in FIGS. 27(a) and 27 (b). The hot-melt adhesive 103 is applied to only the upper and lower portions 104a and 104b on the paperboard 104 from which an outer container 101 is produced, i.e., the adhesive 103 is not applied to the middle portion of the paperboard 104. After the application of the hot-melt adhesive 103, the paperboard 104 is subjected to ruling and punching processes and then an overlap width 104 c and the like are sack-adhered to thus give a cylindrical outer container 101 the inner wall of which is coated with an adhesive.

On the other hand, a plastic preform is separately formed by injection molding. A large number of such preforms have previously been produced. The outer container 101 is arranged in a mold for blow molding, followed by introducing the preform which has been heated to the molding temperature into the outer container 101 and then blow-molding the preform into an inner container 102 to thus give an intended compound container 100.

The compound container 100 is characterized in that an adhesive is not present in the whole area wherein the outer container 101 comes in contact with the inner container 102, but only in the upper and lower portions thereof. Therefore, if the compound container 100 is filled with a liquid such as a juice during hot, the internal pressure of the container 100 is reduced as the liquid, i.e., the contents thereof is cooled and the inner container 102 causes deformation. However, the deformation of the inner container 102 is inconspicuous and the container can ensure sufficient strength since the outer container 101 is adhered to the inner container only at the upper and lower portions.

The compound container 100 is excellent in falling impact resistance, does not require the use of a large amount of plastics and can easily be prepared by a method comprising a small number of steps, and the outer container 101 does not undergo any deformation due to pressure reduction even if the container 100 is filled with contents during hot. Moreover, the container 100 comprises a thin inner container and therefore, the volume thereof can be reduced upon the disposal. Consequently, the container 100 is effective for environmental protection.

Then Examples and Comparative Examples of the 8th embodiment will be described below.

Example 1 of 8th Embodiment

The compound container 100 of this Example 1 is a container having a structure as shown in FIG. 26 and an inner volume of 1000 ml. The compound container 100 was formed by fitting an outer container 101 produced from manila board having a basis weight of 340 g/m$^2$ to a mold, arranging, in the outer container 101, a preform which had been formed by injection-molding a polyethylene terephthalate resin and then heated with an infrared heater, followed by biaxial stretch blow-molding the preform. FIG. 27(a) is an extend elevation of the outer container 101. An EVA hot-melt adhesive was applied to the shadowed portion at a rate of 5 g/m$^2$. The outer container 101 and the inner container 102 of the container 100 were adhered to one another only at the upper and lower portions thereof. Therefore, the outer container 101 could quite easily be separated from the inner container after using the container 100 and the plastic part was completely free of remaining paper adhered thereto. The inner container 102 could easily be crushed to reduce the volume thereof.

The container was examined by a drop test. The results obtained are listed in the following Table 8. When the container was filled with a juice of 88° C. during hot and then subjected to capping, any problem of the appearance of the container did not arise.

Example 2 of 8th Embodiment

In this Example 2, a container shown in FIG. 26 having an inner volume of 1000 ml was produced by fitting an outer container 101 produced from manila board having a basis weight of 340 g/m$^2$, heating a preform prepared by injection-molding a polyethylene terephthalate resin with an infrared heater and then subjecting the preform to biaxial stretch blow molding.

Figure 27B:
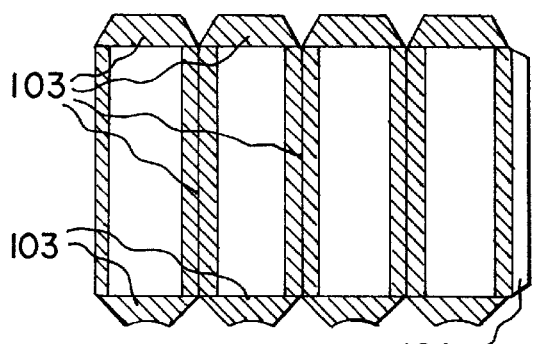

FIG. 27(b) is an extend elevation of the outer container 101 of Example 2. A hot-melt adhesive was applied as shown in FIG. 27(b). More specifically, an EVA hot-melt adhesive was applied to the shadowed portion at a rate of 5 g/m$^2$. The outer container and the inner container of the container 100 could be separated from one another after using the container 100 and the inner container could easily be crushed to reduce the volume thereof.

The container was subjected to a drop test. The results obtained are listed in the following Table 8. When the container was filled with a juice of 88° C. during hot and then subjected to capping, any problem of the appearance of the container did not arise.

Comparative Example 1 of 8th Embodiment

Figure 28:
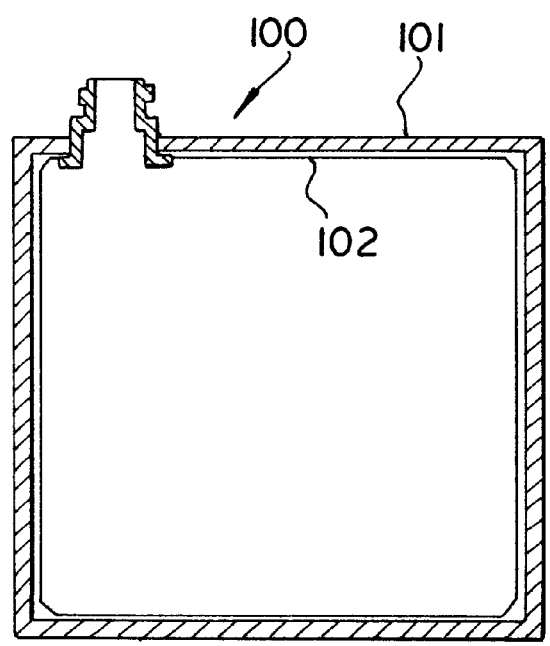
FIG. 28 is a cross sectional view of a bag-in-box type compound container as a comparative example with respect to the present invention.

In this Comparative Example 1, a compound container 100 having a shape as shown in FIG. 28 and an inner volume of 1000 ml was produced. More specifically, the peripheral edges of a polyethylene film having a thickness of 0.2 mm were adhered to one another through heat sealing to give a bag-like product serving as an inner container 102, followed by fusion-bonding a polyethylene opening for pouring formed by injection molding to give the inner container 102 and then fitting an outer container 101 of manila board having a basis weight of 340 g/m$^2$ to the resulting inner container. The inner container 102 and the outer container 12 of the compound container 1000 could be separated from one another after using the container 1000 and the inner container could be crushed to reduce the volume thereof.

The container was subjected to a drop test. The results obtained are listed in the following Table 8. The results of the drop test indicate that the strength is insufficient at the fusion-bonded portion of the opening for pouring.

Comparative Example 2 of 8th Embodiment

In this Comparative Example 2, a container shown in FIG. 26 having an inner volume of 1000 ml was produced by fitting an outer container produced from manila board having a basis weight of 340 g/m$^2$ to a mold, introducing a preform prepared by injection-molding a polyethylene terephthalate resin and heated with an infrared heater into the outer container and then subjecting the preform to biaxial stretch blow molding in the mold. The extend elevation of the outer container is the same as that of the 8th embodiment, but an EVA hot-melt adhesive was applied to the whole inner wall of the outer container at a rate of 5 g/m$^2$. The outer container and the inner container of the compound container could be separated from one another after using the compound container and the inner container could easily be crushed to reduce the volume thereof.

The container was subjected to a drop test. The results obtained are listed in the following Table 8. When the container was filled with a juice of 88° C. during hot and then subjected to capping, even the outer container underwent deformation due to pressure reduction within the container and the compound container had poor appearance.

TABLE 8

| Ex. No. | Results of Drop Test (No. of Cracked Bottle) |
| --- | --- |
| Example 1 | 0 |
| Example 2 | 0 |
| Comp. Ex. 1 | 3 |
| Comp. Ex. 2 | 0 |

In Table 8, the drop test was carried out by adding a predetermined amount of water to each bottle (10 bottles in all), then storing at 5° C. for 12 hours and subjecting each bottle to free dropping on a concrete ground from a level of 1 m high to determine the number of bottles which were cracked.

Embodiment 8-2

Then the embodiment 8-2 of the present invention will hereinafter be described in detail.

The shape of the compound container according to the embodiment 8-2 is the same as that depicted on FIG. 26 and therefore, the same reference numerals are used for explaining the corresponding parts respectively. The compound container 100 comprises an outer container 101 mainly comprising paper and a plastic inner container 102 accommodated in the outer container 101. The inner container 102 comprises a trunk part 6 and an opening 5 for pouring which are monolithically molded through blow molding.

Figure 27C:
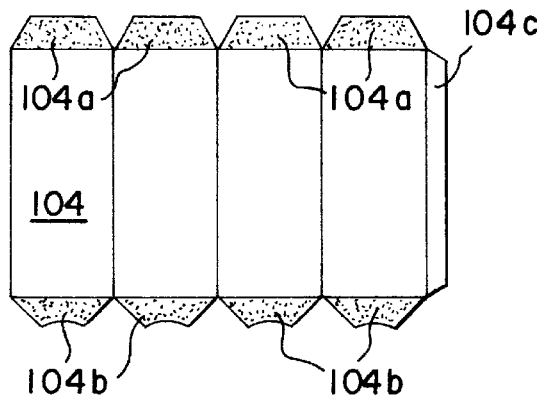

Moreover, the shoulder parts and the bottom parts of the outer and inner containers 101 and 102 are adhered to one another through adhesive layers 104a and 104b respectively as shown in FIG. 27(c).

An example of the methods for preparing this compound container comprises the steps of applying a hot-melt adhesive 104a, 104b on one side of paperboard, subjecting the paperboard to ruling and punching processes and then sack-pasting the paperboard to give an outer container 101 the inner wall of which is coated with an adhesive. Then a plastic preform called molded article is formed by injection molding. The outer container 101 is placed in a mold for blow molding, then the preform previously heated to the molding temperature thereof is introduced into the outer container and then the preform is blow-molded to give the intended compound container 100.

The extend elevation of the outer container 101 is shown in FIG. 27(c). The adhesive 104a, 104b is distributed only on the upper and lower portions thereof in a dot-like pattern. In this embodiment, any adhesive is not present on the portion which is initially picked up when the outer container 101 is separated from the inner container and thus the outer container can easily be peeled off starting from that portion. More specifically, the inner container 102 is not removed from the outer container 101 during use, while they can easily be removed from one another upon disposal.

Figure 27D:
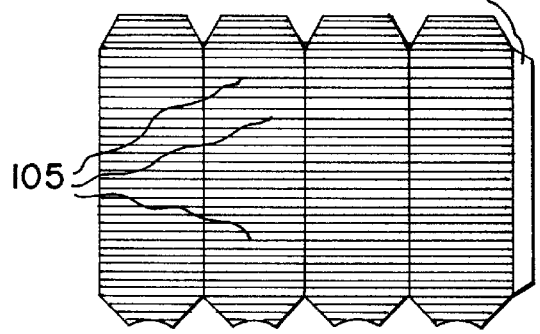
Figure 27E:

Extend elevations of another example are shown in FIGS. 27(d) and 27(e). The adhesive 105 is applied to the outer container 101 in such a manner that the adhered and unadhered portions are alternatively arranged in a stripe-like pattern and in this case, the adhesion strength of the compound container 100 can arbitrarily be adjusted by changing the ratio (by area) of the adhered portion to the unadhered portion.

The adhesive 105 used for assembling the compound container 100 is preferably a hot-melt adhesive which is not softened at the temperature for filling the container with contents and exhibits its adhesive action at the molding temperature of the inner container 102. Examples of such hot-melt adhesives are ethylene-vinyl acetate copolymers (EVA), ethylene-ethyl acrylate copolymers (EEA) and those each comprising an olefin as a main component.

Examples of materials for producing the inner container 102 usable herein are polyethylene terephthalate resins, polypropylene resins, resins having a high nitrile content, polystyrene resins, polyvinyl chloride resins, polycarbonate resins, polyamide resins and saponified products of ethylene-vinyl acetate copolymers, which may be used in the form of a single-layered or multi-layered structure.

Example 3 of 8th Embodiment

Then Example 3 of the 8th embodiment will be described below. In this Example 3, a compound container having an inner volume of 1000 ml and shown in FIG. 26 was produced by heating, with an infrared heater, a preform formed by injection-molding a polyethylene terephthalate resin and then biaxial stretch blow-molding the preform in a mold wherein an outer container 101, which had been produced, in advance, using manila board having a basis weight of 340 g/m$^2$ was arranged. The extend elevation of the outer container 101 is shown in FIG. 27(c). An EVA hot-melt adhesive 104a was applied to the shadowed portion at a rate of 5 g/m$^2$, in a dot-like pattern. After using the compound container, the outer container 101 and the inner container 102 of the container could quite easily be separated from one another, i.e., the plastic part was completely removed from the paper part.

Example 4 of 8th Embodiment

In this Example 4, a compound container having an inner volume of 1000 ml and shown in FIG. 26 was produced by heating, with an infrared heater, a preform formed by injection-molding a polyethylene terephthalate resin and then biaxial stretch blow-molding the preform in a mold wherein an outer container 101, which had been produced, in advance, using manila board having a basis weight of 340 g/m$^2$ was arranged. The extend elevation of the outer container 101 is shown in FIG. 27(d). An EVA hot-melt adhesive 105 was applied to the shadowed portion at a rate of 5 g/m$^2$, in a stripe-like pattern. After using the compound container, the outer container 101 and the inner container 102 of the compound container could quite easily be separated from one another, i.e., the plastic part was completely removed from the paper part.

Comparative Example 3 of 8th Embodiment

A compound container having an inner volume of 1000 ml and shown in FIG. 26 was produced by heating, with an infrared heater, a preform formed by injection-molding a polyethylene terephthalate resin and then biaxial stretch blow-molding the preform in a mold wherein an outer container, which had been produced, in advance, using manila board having a basis weight of 340 g/m$^2$ was arranged. The extend elevation of the outer container 101 is the same as that described in Example 3, but an EVA hot-melt adhesive was applied to the whole inner wall of the outer container at a rate of 5 g/m$^2$. After using the compound container, the outer container 101 and the inner container 102 of the compound container could not completely be separated from one another, i.e., the paper was adhered to the surface of the plastic part.

Embodiment 8-3

The shape of the compound container according to the embodiment 8-3 of the present invention is the same as that depicted on FIG. 26 and therefore, the same reference numerals are used for the explanation of this embodiment. In FIG. 26, the compound container 100 comprises an outer container 101 mainly comprising paper and a plastic inner container 102 accommodated in the outer container 101. The inner container 102 comprises a trunk part 6 and an opening 5 for pouring which are monolithically molded through blow molding. Moreover, the outer container 101 and the inner container 102 are adhered to one another through an adhesive layer 9b.

An example of the methods for preparing the compound container 100 comprises the steps of applying a hot-melt adhesive on one side of paperboard, subjecting the paperboard to ruling and punching processes and then sack-adhering the paperboard to give an outer container 101, the inner wall of which is coated with an adhesive. Then a plastic preform is formed by injection molding. The outer container 101 is placed in a mold for blow molding, then the preform previously heated to the molding temperature thereof is introduced into the outer container and then the preform is blow-molded to give the intended compound container 100.

Figure 27F:
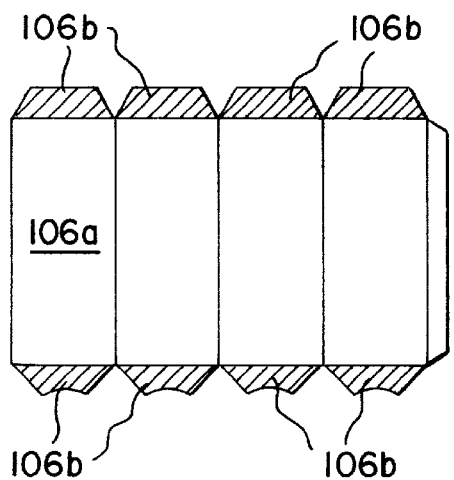

As shown in FIGS. 27(f) and 27 (g), the middle portion of the outer container 101 which undergoes severe deformation due to the reduction in the internal pressure of the bottle is coated with a low softening point adhesive 106 a having such a low softening point that it loses the adhesive strength by the action of the heat of the charged contents. On the other hand, the outer container 101 and the inner container 102 are adhered to one another at the upper and lower portions thereof through a high softening point adhesive 106b whose softening point is higher than the charging temperature of the contents and lower than the molding temperature of the inner container 102.

Accordingly, the inner container 102 can firmly be adhered to the outer container 101 during blow-molding the inner container 102. Since the adhesive 106a used for adhering the middle portion of the compound container 100 has a softening point lower than the temperature for charging contents, the adhesive 106a is fluidized at the middle portion of the container 100 when the contents are charged and then again solidified as the contents is cooled. However, the deformation at the middle portion of the inner container 102 due to pressure reduction never affects the shape or appearance of the outer container 101 since the softening point of the adhesive 106b adhering the upper and lower portions of the compound container 100 is higher than the temperature for charging the contents.

Moreover, since the middle portion of the compound container 100 is adhered with the low softening point adhesive 106a and the shoulder and bottom portions thereof are adhered with the high softening point adhesive 106b, the appearance of the container 100 is maintained through the removal of the middle portion of the outer container 101 from the inner container 102 when the charging temperature is high, while if the charging temperature is low, the appearance of the container 100 can sufficiently be held without causing any removal of the outer container 101 from the inner container 102 at the middle portion since the degree of deformation due to pressure reduction is low. Accordingly, the appearance of the container 100 can be maintained irrespective of the charging temperature of content and the adhesive strength of the container 100 is further improved since the outer container and the inner container are entirely be adhered when the charging temperature is low.

The adhesive 106a used for assembling the compound container is preferably a hot-melt adhesive which is not adhesive at ordinary temperature and exhibits its adhesive action at the temperature for filling the container with contents, for instance, about 70° C. On the other hand, the adhesive 106b used for assembling the compound container is preferably a hot-melt adhesive which is not adhesive at ordinary temperature and exhibits its adhesive action at the molding temperature of the inner container 102. Examples of such hot-melt adhesives are ethylene-vinyl acetate copolymers (EVA), ethylene-ethyl acrylate copolymers (EEA) and those each comprising an olefin as a main component. The adhesive temperature of these adhesives is controlled by adjusting the concentration thereof.

Examples of materials for producing the inner container 102 usable herein are polyethylene terephthalate resins, polypropylene resins, resins having a high nitrile content, polystyrene resins, polyvinyl chloride resins, polycarbonate resins, polyamide resins and saponified products of ethylene-vinyl acetate copolymers, which may be used in the form of a single-layered or multi-layered structure.

Then Examples and Comparative Examples of the embodiment 8-3 will be described below.

Example 5 of 8th Embodiment

In this Example 5, a compound container having an inner volume of 1000 ml and shown in FIG. 26 was produced by heating a preform formed by injection-molding a polyethylene terephthalate resin to 95° C. with an infrared heater and then biaxial stretch blow-molding the preform in a mold wherein an outer container 101, which had been produced, in advance, using manila board having a basis weight of 340 g/m$^2$ was arranged.

The extend elevation of the outer container 101 is shown in FIG. 27(f). An EVA hot-melt adhesive 106a having a softening point of 90° C. was applied to the shadowed portion at a rate of 5 g/m$^2$ and an EVA hot-melt adhesive 106b having a softening point of 75° C. was applied to the shoulder part and the bottom part at a rate of 5 g/m$^2$. After using the compound container 100, the outer container 101 and the inner container 102 of the compound container could be separated from one another and the inner container could be crushed to reduce the volume thereof.

The container was subjected to a drop test. The results obtained are listed in the following Table 9. When the container was filled with a juice of 85° C. during hot and then subjected to capping, any problem concerning the appearance of the compound container did not arise.

Example 6 of 8th Embodiment

In this Example 6, a compound container 100 having an inner volume of 1000 ml and shown in FIG. 26 was produced by heating a preform formed by injection-molding a polypropylene resin to 125° C. with an infrared heater and then biaxial stretch blow-molding the preform in a mold wherein an outer container 101, which had been produced, in advance, using manila board having a basis weight of 340 g/m$^2$ was arranged.

Figure 27G:
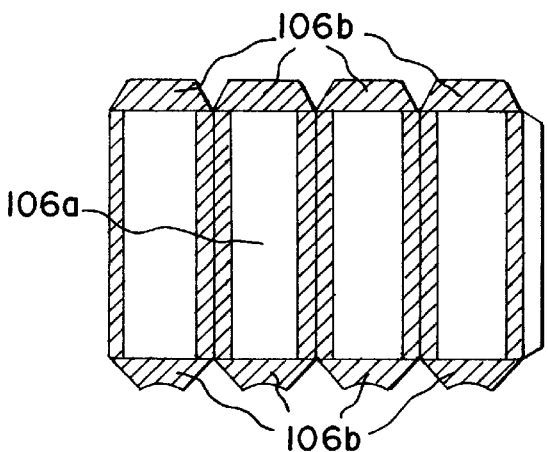

The extend elevation of the outer container 101 of Example 6 is shown in FIG. 27(g). An EVA hot-melt adhesive 106a having a softening point of 90° C. was applied to the shoulder part, the bottom part and portions supporting four corners at a rate of 5 g/m$^2$ and an EVA hot-melt adhesive 106b having a softening point of 75° C. was applied to the portion supporting the middle part of the container at a rate of 5 g/m$^2$. After using the compound container 100, the outer container 101 and the inner container 102 of the compound container could be separated from one another and the inner container could be crushed to reduce the volume thereof.

The container was subjected to a drop test. The results obtained are listed in the following Table 9. When the container was filled with water of 85° C. during hot and then subjected to capping, any problem concerning the appearance of the compound container did not arise.

Comparative Example 4

In this Comparative Example 4, a bag-in-box type container having a shape as shown in FIG. 28 and an inner volume of 1000 ml was produced. More specifically, the peripheral edges of a polyethylene film having a thickness of 0.2 mm were adhered to one another through heat sealing to give a bag-like product, followed by fusion-bonding a polyethylene opening for pouring formed by injection molding to give an inner container and then fitting an outer container of manila board having a basis weight of 340 g/m$^2$ to the inner container. The inner container and the outer container of the compound container could be separated from one another after using the container and the inner container could be crushed to reduce the volume thereof. The container was subjected to a drop test. The results obtained are listed in the following Table 9. The results of the drop test indicate that the strength is sometimes insufficient at the fusion-bonded portion of the opening for pouring.

Comparative Example 5 of 8th Embodiment

In this Comparative Example 5, a container shown in FIG. 26 having an inner volume of 1000 ml was produced by fitting an outer container produced from manila board having a basis weight of 340 g/m² to a mold, heating a preform prepared by injection-molding a polyethylene terephthalate resin with an infrared heater and then subjecting the preform to biaxial stretch blow molding in the mold.

The extend elevation of the outer container is the same as that of Example 1 of the 8th embodiment, but an EVA hot-melt adhesive having a softening point of 90° C. was applied to the whole inner wall of the outer container at a rate of 5 g/m². The outer container and the inner container of the compound container could be separated from one another after using the compound container and the inner container could easily be crushed to reduce the volume thereof.

The container was subjected to a drop test. The results obtained are listed in the following Table 9. When the container was filled with a juice of 85° C. during hot and then subjected to capping, even the outer container underwent deformation due to pressure reduction within the container and the compound container had poor appearance.

TABLE 9

| Ex. No. | Results of Drop Test (No. of Cracked Bottle) |
|---|---|
| Example 5 | 0 |
| Example 6 | 0 |
| Comp. Ex. 4 | 3 |
| Comp. Ex. 5 | 0 |

In Table 9, the drop test was carried out by adding a predetermined amount of water to each bottle (10 bottles in all), then storing at 5° C. for 12 hours and subjecting each bottle to free dropping on a concrete ground from a level of 1 m high to determine the number of bottles which were cracked.

In the foregoing embodiment of the compound container 100, the portions of the inner container 102 and the outer container 101 to be adhered to one another are not restricted to the shoulder and bottom parts and may be the upper and lower edges of the trunk part thereof. In short, the deformation of the outer container can be prevented and the strength of the compound container per se can be ensured by adhering the upper and lower portions of the compound container in such a manner that the portions sandwich the portion at which the degree of deformation is the highest when the internal pressure of the container is reduced as the container is cooled. Therefore, the outer container 101 may have a cylindrical shape.

The embodiment 8-1 can provide a compound container which does not cause any problem of the appearance due to deformation by pressure reduction observed when the container is filled with contents during hot, which permits substantial reduction of the amount of plastics to be used and which exhibits sufficient physical properties since the volume thereof can be reduced prior to the disposal. In other words, the container permits the reduction of the amount and volume of waste.

According to the compound container of the embodiment 8-2, the amount of plastics to be used can substantially be reduced, the volume thereof can likewise be reduced, i.e., the container does not suffer from a problem of physical properties, it can easily be separated into paper and plastic parts upon disposal and the adhesive force between the paper part and the plastic part may be arbitrarily be controlled by variously adjusting the dot density or the distance between the neighboring stripes in the coated adhesive pattern.

The embodiment 8-3 can provide a compound container which does not cause any problem of the appearance due to deformation by pressure reduction observed when the container is filled with contents during hot, which permits substantial reduction of the amount of plastics to be used and which exhibits sufficient physical properties since the volume thereof can be reduced prior to the disposal. In other words, the container permits the reduction of the amount and volume of waste.

As has been discussed above, the compound container according to the 8th embodiment has high falling impact resistance, can easily be prepared through a method comprising a reduced number of steps and does not undergo any deformation due to pressure reduction encountered when the container is filled with contents during hot. Moreover, the volume of the container can be reduced upon its disposal, it does not cause removal of the paper part during use and it can completely be separated into paper and plastic parts, i.e., the container is suitable for separate disposal of these parts. (Japanese Patent Application Serial No. Hei 7-90505) 9th Embodiment The compound container according to the 9th embodiment of the present invention will hereinafter be detailed with reference to the accompanying drawings.

Figure 2:
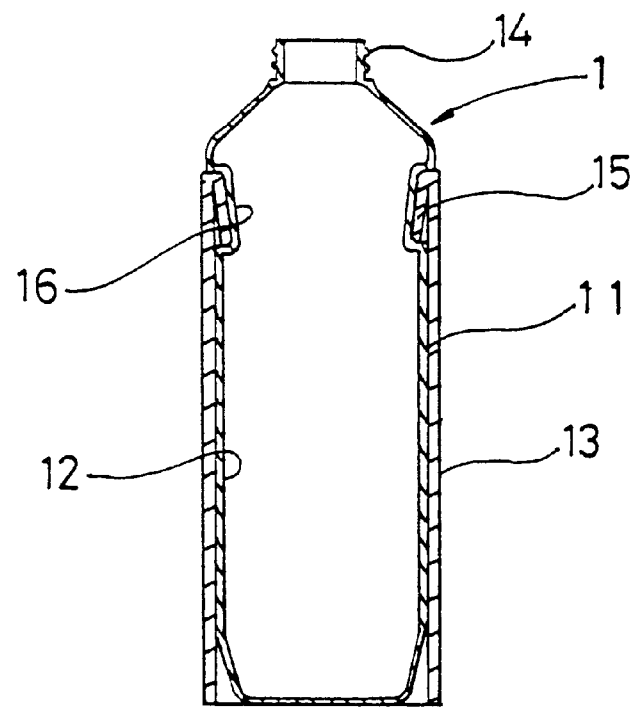
FIG. 2 is a cross sectional view illustrating another example of the compound container according to the present invention.
Figure 29:
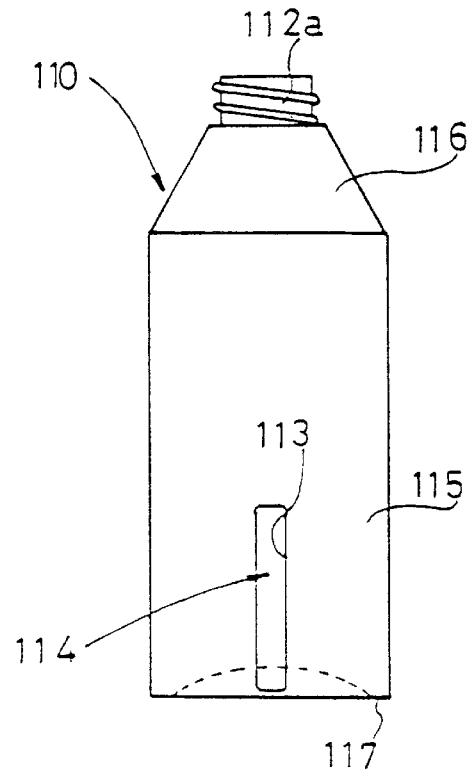
FIG. 29 is a diagram showing the compound container according to the 9th embodiment of the present invention.

FIG. 29 shows the compound container according to the 9th embodiment of the present invention. This compound container 110 comprises a cylindrical paper outer container 111 having a rectangular cross section and a bottle-like plastic inner container 112 having a rectangular cross section and accommodated in the outer container 111. The inner container 112 is provided with an opening 112a for pouring. The outer container 111 covers the shoulder, bottom and trunk parts of the inner container 112. As shown in FIG. 2, a slit-like opening 113 having a small width which extends in the longitudinal direction of the compound container 110 is formed at the lower side of and in the vicinity of the bottom of the outer container 111 and the inner container 112 exposed through the opening 113 serves as a window 114. In the inner container 112, the window 114 exposed through the opening 113 is formed in such a manner that it is in consistent with the peripheral plane of the outer container 111 and the contour of the window 114 is fitted to the edge of the opening 113.

The compound container 110 permits the confirmation of various conditions of the contents such as the remaining quantity and the color thereof since the opening 113 is formed on the outer container 111 and the inside of the container can be observed through the window. The opening 113 may be formed at any position on the outer container such as a position corresponding to the center of the side face of the inner container or a position in the vicinity of a corner so far as the shape retention of the outer container can be ensured and the size and shape may be arbitrarily be designed.

FIG. 31 shows an extend elevation of the outer container 111. In this extend elevation of the outer container 111, four trunk wall parts 115 have the same shape and size and connected in order, each trunk wall part 115 is provided with a trapezoid 116 projected from the upper edge thereof, which serves to cover the shoulder part of the inner container 112 and a flange 117 projected from the lower edge thereof, which covers the bottom of the inner container. The trunk wall part 115 positioned at the right end is provided with an overlap width 119 for adhesion, each trapezoid 116 is provided with an overlap width 120 and the edges of the flanges 117 are superimposed and adhered to one another. The trunk wall parts 115 or the like are bent, followed by applying an adhesive to the overlap widths 119, 120 and both corners of the flanges 117 and subjected to sack-adhesion to form the outer container 111 having a rectangular cross section.

This compound container 110 is prepared by first forming the outer container 111 in the extended shape shown in FIG. 31 into a cylindrical form, then fitting it to a mold for blow molding, inserting a preform which has been heated to soften into the outer container 111 through the upper opening thereof and then subjecting the preform to integral molding by the in-mold molding.

If the compound container is formed through in-mold molding technique, the window 114 of the inner container 112 is projected through the outer container to an extent corresponding to the thickness of the outer container 111 and therefore, the surface of the outer container 111 is in consistent with the surface of the window 114 at the opening 113 unless the mold is not provided with a corresponding recess. Moreover, if an adhesive is, in advance, applied to the inner wall which comes in contact with the outer wall of the inner container 112, the adhesion of the outer container 111 to the inner container 112 can be improved and any possibility of spontaneous removal of the former from the latter can be eliminated. However, the deformation of the inner container due to pressure reduction becomes inconspicuous if the outer container 111 and the inner container 112 are adhered at the shoulder and bottom parts of the compound container 110, while they are not adhered at the trunk part thereof.

The compound container 110 may likewise be produced by first forming the inner container 112 through blow molding and then fitting the outer container 111 to the resulting inner container 112. The inner container 112 can be prepared by direct blow molding and biaxial stretch blow molding techniques. It is also possible to form line marks or concave or convex portions at constant intervals as graduations for making the confirmation of the remaining quantity of the contents easy.

Examples of materials used for producing inner container 112 include polyethylene, polypropylene, polyacrylonitrile, nylon, polyethylene terephthalate and polyvinyl chloride, with the use of polyethylene terephthalate being preferred while taking into consideration the strength of the container and the moldability of the material. The use of polyethylene terephthalate permits substantial reduction of the thickness of the container if the biaxial stretching blow molding technique is adopted and this in turn permits the reduction of the amount of waste to be disposed. Moreover, the combustion energy generated when it is subjected to the incineration treatment is low as compared with other materials and thus the environment is not adversely affected so much.

Since the inner container 112 is reinforced by the outer container 111, the compound container 110 has high buckling strength and excellent falling impact resistance even when the plastic inner container 112 is very thin. Moreover, the outer container 111 is easily removed from the inner container 112, i.e., the container can be separated into the paper and plastic parts and thus can be disposed after using up the contents while reducing the volume of the waste.

Example 1 of 9th Embodiment

Figure 30:
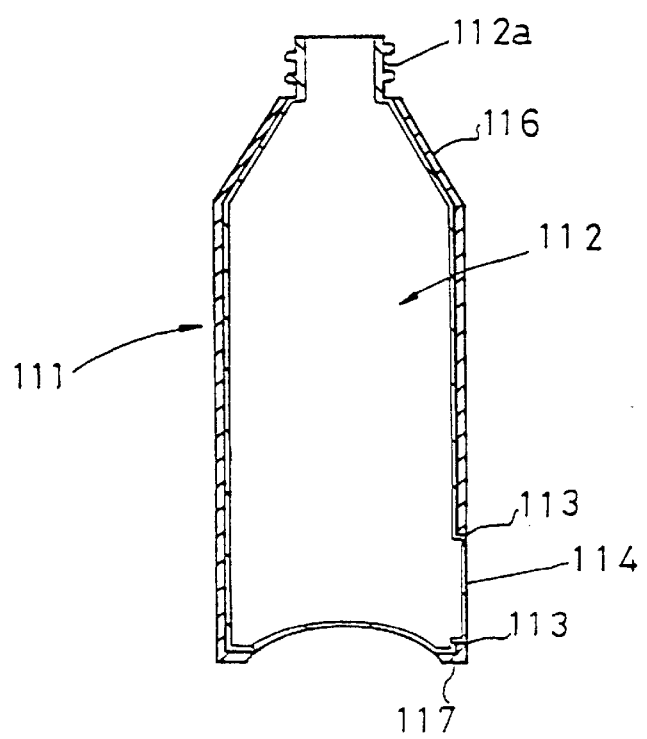
FIG. 30 is a cross sectional view of the compound container shown in FIG. 29.

In this Example 1, an inner container 112 is covered with an outer container 111 to form a compound container. First of all, an inner container 112 as shown in FIG. 30 having an amount for weighting of 33 g and an inner volume of 1000 ml was prepared by direct blow-molding a high density polyethylene resin. Then an outer container 111 of cardboard provided with a window was fitted to the outside of the inner container 112 to give a compound container 110 as shown in FIG. 29. The compound container 110 did not suffer from any problem of appearance, the inner container 112 could easily be removed from the outer container 111 after use and the conditions of the contents such as the color and the amount thereof could easily be confirmed through the window part.

Example 2 of 9th Embodiment

In this Example 2, the compound container was produced by in-mold molding technique. First, a polyethylene terephthalate resin was injection-molded into a preform and then an outer container 111 of cardboard was arranged in a mold for blow molding. The preform heated with an infrared heater was inserted into the outer container 111 arranged in the mold and then the preform was subjected to in-mold molding to give an inner container 112 having an amount for weighting of 15 g and an inner volume of 1000 ml. The compound container 110 did not suffer from any problem of appearance, the inner container 112 could easily be removed from the outer container 111 after use and the conditions of the contents such as the color and the remaining quantity thereof could easily be confirmed through the window part.

Example 3 of 9th Embodiment

In this Example 3, an inner container 112 was covered with an outer container 111 to give a compound container like Example 1. More specifically, a high density polyethylene resin was subjected to direct blow molding using a mold provided with concave and convex portions at constant intervals at position corresponding to a window 114 to form an inner container 112 having an amount for weighting of 33 g and an inner volume of 1000 ml. Then an outer container 111 of cardboard provided with an opening 113 was fitted to the outside of the inner container 112 to give a compound container as shown in FIG. 29. The compound container 110 did not suffer from any problem of appearance, the inner container 112 could easily be removed from the outer container 111 after use and the conditions of the contents such as the color and the amount thereof could easily be confirmed through the window part.

Example 4 of 9th Embodiment

In this Example 4, a compound container was produced by the in-mold molding technique used in Example 2. More specifically, an outer container of cardboard whose inner wall had been coated with an adhesive was first produced. Then a polyethylene terephthalate resin was injection-molded into a preform. The outer container 111 formed into a cylindrical shape was fitted to the cavity of a mold. In this respect, the mold is provided with concave portions at constant intervals on the portion corresponding to a window 114. After fitting the outer container 11 to the mold, the preform was heated with an infrared heater, then inserted into the outer container 111 and subjected to biaxial stretch blow molding to give a compound container 110 as shown in FIG. 30 having an amount for weighting of 15 g and an inner volume of 1000 ml. The compound container 110 did not suffer from any problem of appearance, the inner container 112 could easily be removed from the outer container 111 after use and the conditions of the contents such as the color and the quantity thereof could easily be confirmed through the window part.

According to the compound container of the 9th embodiment, since the surface of the inner container exposed through the opening of the outer container is inconsistent with the surface of the outer container, the conditions of the contents such as the remaining quantity and the color thereof can easily be observed with the naked eyes, the outer container can easily be removed from the inner container and the amount of plastics to be used can substantially be reduced. Therefore, the compound container is suitable for reducing the amount of waste and for protecting the environment. Moreover, if the container is produced by the in-mold molding technique, it is not necessary to form any concave portions on the mold wall to project the window of the inner container in such a manner that the surface thereof is in conformity with that of the outer container, i.e., a container in which the surface of the opening is in conformity with that of the window can easily be produced using an existing mold. This makes the formation of the container easy as compared with the method in which the inner container is separately produced in advance.

What we claim is:

1. A compound container which comprises an inner container having upper, middle and lower portions of a plastic and an outer container having upper, middle and lower portions comprising paper, wherein the inner container is produced by blow-molding or stretch blow-molding a resin composition comprising one or more resins including a barrier resin, the outer container is adhered to the inner container at upper and lower portions thereof, and the middle portion of the outer container being continuous while the middle portion of the outer container is not adhered to the inner container.

2. The compound container as set forth in claim 1 wherein the inner container comprises a mixture of polyester and a barrier resin.

3. The compound container as set forth in claim 2 wherein the barrier resin is a member selected from the group consisting of saponified products of ethylene-vinyl acetate copolymers, polyamide resins and polyethylene terephthalate resins.

4. The compound container as set forth in claim 2 wherein the barrier resin is a thermoplastic liquid crystal resin.

5. The compound container as set forth in claim 2 wherein the barrier resin is a non-crystalline polyolefin resin.

6. The compound container as set forth in claim 2 wherein the barrier resin is a mixture of one member selected from the group consisting of non-crystalline polyolefin resins, polyethylene terephthalate resins, polyamide resins, thermoplastic liquid crystal resins and saponified products of ethylene-vinyl acetate copolymers with another resin.

7. The compound container as set forth in claim 1 wherein the inner container comprises a mixture of a polyolefin resin with a barrier resin.

8. The compound container as set forth in claim 7 wherein the barrier resin is a member selected from the group consisting of polyester resins, polyamide resins, thermoplastic liquid crystal resins, saponified products of ethylene-vinyl acetate copolymers, non-crystalline polyolefin resins and mixture thereof.

9. The compound container as set forth in claim 1 wherein the inner container is one formed by stretch blow-molding a polypropylene resin.

10. The compound container as set forth in claim 9 wherein the inner container has a multi-layered structure which comprises at least one gas-barrier layer.

11. The compound container as set forth in claim 9 wherein the inner container has a multi-layered structure which comprises at least one water vapor-barrier layer.

12. The compound container as set forth in claim 1 wherein the inner container is formed from a resin which mainly comprises polyethylene-2,6-naphthalate and comprises an opening part, a shoulder part and a thin trunk part.

13. The compound container as set forth in claim 12 wherein the inner container is formed from a blend mainly comprising polyethylene-2,6-naphthalate.

14. The compound container as set forth in claim 12 wherein the inner container is formed from a mixture of polyethylene-2,6-naphthalate with polyethylene terephthalate.

15. The compound container as set forth in claim 12 wherein the inner container has a multi-layered structure comprising at least two layers of polyethylene-2,6-naphthalate and polyethylene terephthalate.

16. The compound container as set forth in claim 15 wherein the inner container comprises a material for solubilizing the barrier resin.

17. The compound container as set forth in claim 1 wherein the inner container has a layer comprising a reclaimed material.

18. The compound container as set forth in claim 17 wherein the inner container comprises polyethylene terephthalate.

19. The compound container as set forth in claim 17 wherein the inner container has a multi-layered structure in which the outermost and innermost layers are formed from fresh materials while an intermediate layer is formed from a reclaimed material.

20. The compound container as set forth in claim 19 wherein the intermediate layer of the inner container comprises polyethylene terephthalate.

21. The compound container as set forth in any one of claims 1 to 20 wherein the outer container is a cylindrical body.

22. The compound container as set forth in claim 21 wherein the outer container is a cylindrical body having a closed-bottom.

23. The compound container as set forth in claim 20 wherein the outer container is formed from a material which mainly comprises gas barrier material-containing paper.

24. The compound container as set forth in claim 20 wherein the outer container is formed from a water-resistant material.

25. The compound container as set forth in claim 20 wherein the outer container is formed from a laminated material comprising paper and a barrier film.

26. The compound container as set forth in claim 25 wherein the barrier film comprises a plastic film and a thin film of a metal oxide deposited on the surface of the plastic film.

27. The compound container as set forth in claim 20 wherein the outer container has a multi-layered structure comprising at least one layer composed of a barrier material.

28. The compound container as set forth in claim 20 wherein the thickness of the outer container ranges from 2.55 to 5 times the thickness of the side wall of the inner container.

29. The compound container as set forth in claim 20 wherein the thickness of the side wall of the trunk part constituting the inner container which is covered with the outer container is not more than ½ time that of the trunk part which is not covered with the outer container.

30. The compound container as set forth in claim 20 wherein the averaged thickness of the side wall of the outer container is not less than 2.5 times the averaged thickness of the side wall of the trunk part constituting the inner container.

31. The compound container as set forth in claim 20 wherein the outer container is freely detachably fitted to the inner container.

32. The compound container as set forth in claim 20 wherein the outer container is united to the inner container through fitting.

33. The compound container as set forth in claim 20 wherein the outer container is adhered to the inner container through an adhesive layer which is soluble in an alkaline solution.

34. The compound container as set forth in claim 20 wherein the outer container is adhered to the inner container through an adhesive layer which is soluble in warmed water.

35. The compound container as set forth in claim 20 wherein the outer container is adhered to the inner container through a photodegradable or biodegradable adhesive layer.

36. The compound container as set forth in claim 20 wherein the outer container is adhered to the inner container through an adhesive layer capable of being adhered thereto at the molding temperature of the inner container.

37. The compound container as set forth in claim 1 wherein the inner container is adhered to the outer container by an adhesive distributed in a dot pattern or a stripe-like pattern.

38. The compound container as set forth in claim 1 wherein it is designed such that the following relation holds: the molding temperature of the inner container>the softening point of the adhesive on the upper and lower portions>content-charging temperature>the softening point of the adhesive on the middle portion.

39. The compound container as set forth in claim 20 wherein the outer container is provided with a perforation formed thereon, which starts from either the upper or lower end and extends towards the other end and a non-adhered area is formed between the outer and inner containers along the perforation.

40. The compound container as set forth in claim 39 and 168 to 186 wherein the perforation extends along the axial direction of the inner container.

41. The compound container as set forth in claim 39 and 168 to 186 wherein the perforation is inclined with respect to the axial direction of the inner container.

42. The compound container as set forth in claim 39 wherein it is provided with a plurality of perforations.

43. The compound container as set forth in claim 39 wherein the perforation reaches the upper and lower ends of the outer container.

44. The compound container as set forth in claim 39 wherein the perforation extends spirally.

45. The compound container as set forth in claim 39 wherein a knob is formed at the end of the perforation on the outer container.

46. The compound container as set forth in claim 1 wherein the outer container has an opening for exposing a part of the inner container and the surface of a window of the inner container exposed at the opening is in consistent with the surface of the side wall of the outer container.

47. The compound container as set forth in claim 46 wherein the window of the inner container is graduated.

48. The compound container as set forth in claim 21 wherein the outer container is formed from a material which mainly comprises gas barrier material-containing paper.

49. The compound container as set forth in claim 22 wherein the outer container is formed from a material which mainly comprises gas barrier material-containing paper.

50. The compound container as set forth in claim 21 wherein the outer container is formed from a water-resistant material.

51. The compound container as set forth in claim 22 wherein the outer container is formed from a water-resistant material.

52. The compound container as set forth in claim 21 wherein the outer container is formed from a laminated material comprising paper and a barrier film.

53. The compound container as set forth in claim 22 wherein the outer container is formed from a laminated material comprising paper and a barrier film.

54. The compound container as set forth in claim 23 wherein the outer container is formed from a laminated material comprising paper and a barrier film.

55. The compound container as set forth in claim 24 wherein the outer container is formed from a laminated material comprising paper and a barrier film.

56. The compound container as set forth in claim 21 wherein the outer container has a multi-layered structure comprising at least one layer composed of a barrier material.

57. The compound container as set forth in claim 22 wherein the outer container has a multi-layered structure comprising at least one layer composed of a barrier material.

58. The compound container as set forth in claim 23 wherein the outer container has a multi-layered structure comprising at least one layer composed of a barrier material.

59. The compound container as set forth in claim 24 wherein the outer container has a multi-layered structure comprising at least one layer composed of a barrier material.

60. The compound container as set forth in claim 21 wherein the thickness of the outer container ranges from 2.55 to 5 times the thickness of the side wall of the inner container.

61. The compound container as set forth in claim 22 wherein the thickness of the outer container ranges from 2.55 to 5 times the thickness of the side wall of the inner container.

62. The compound container as set forth in claim 23 wherein the thickness of the outer container ranges from 2.55 to 5 times the thickness of the side wall of the inner container.

63. The compound container as set forth in claim 24 wherein the thickness of the outer container ranges from 2.55 to 5 times the thickness of the side wall of the inner container.

64. The compound container as set forth in claim 25 wherein the thickness of the outer container ranges from 2.55 to 5 times the thickness of the side wall of the inner container.

65. The compound container as set forth in claim 21 wherein the thickness of the side wall of the trunk part constituting the inner container which is covered with the outer container is not more than ½ time that of the trunk part which is not covered with the outer container.

66. The compound container as set forth in claim 22 wherein the thickness of the side wall of the trunk part constituting the inner container which is covered with the outer container is not more than ½ time that of the trunk part which is not covered with the outer container.

67. The compound container as set forth in claim 23 wherein the thickness of the side wall of the trunk part constituting the inner container which is covered with the outer container is not more than ½ time that of the trunk part which is not covered with the outer container.

68. The compound container as set forth in claim 24 wherein the thickness of the side wall of the trunk part constituting the inner container which is covered with the outer container is not more than ½ time that of the trunk part which is not covered with the outer container.

69. The compound container as set forth in claim 25 wherein the thickness of the side wall of the trunk part constituting the inner container which is covered with the outer container is not more than ½ time that of the trunk part which is not covered with the outer container.

70. The compound container as set forth in claim 27 wherein the thickness of the side wall of the trunk part constituting the inner container which is covered with the outer container is not more than ½ time that of the trunk part which is not covered with the outer container.

71. The compound container as set forth in claim 21 wherein the averaged thickness of the side wall of the outer container is not less than 2.5 times the averaged thickness of the side wall of the trunk part constituting the inner container.

72. The compound container as set forth in claim 22 wherein the averaged thickness of the side wall of the outer container is not less than 2.5 times the averaged thickness of the side wall of the trunk part constituting the inner container.

73. The compound container as set forth in claim 23 wherein the averaged thickness of the side wall of the outer container is not less than 2.5 times the averaged thickness of the side wall of the trunk part constituting the inner container.

74. The compound container as set forth in claim 24 wherein the averaged thickness of the side wall of the outer container is not less than 2.5 times the averaged thickness of the side wall of the trunk part constituting the inner container.

75. The compound container as set forth in claim 25 wherein the averaged thickness of the side wall of the outer container is not less than 2.5 times the averaged thickness of the side wall of the trunk part constituting the inner container.

76. The compound container as set forth in claim 27 wherein the averaged thickness of the side wall of the outer container is not less than 2.5 times the averaged thickness of the side wall of the trunk part constituting the inner container.

77. The compound container as set forth in claim 21 wherein the outer container is freely detachably fitted to the inner container.

78. The compound container as set forth in claim 22 wherein the outer container is freely detachably fitted to the inner container.

79. The compound container as set forth in claim 23 wherein the outer container is freely detachably fitted to the inner container.

80. The compound container as set forth in claim 24 wherein the outer container is freely detachably fitted to the inner container.

81. The compound container as set forth in claim 25 wherein the outer container is freely detachably fitted to the inner container.

82. The compound container as set forth in claim 27 wherein the outer container is freely detachably fitted to the inner container.

83. The compound container as set forth in claim 28 wherein the outer container is freely detachably fitted to the inner container.

84. The compound container as set forth in claim 29 wherein the outer container is freely detachably fitted to the inner container.

85. The compound container as set forth in claim 30 wherein the outer container is freely detachably fitted to the inner container.

86. The compound container as set forth in claim 21 wherein the outer container is united to the inner container through fitting.

87. The compound container as set forth in claim 22 wherein the outer container is united to the inner container through fitting.

88. The compound container as set forth in claim 23 wherein the outer container is united to the inner container through fitting.

89. The compound container as set forth in claim 24 wherein the outer container is united to the inner container through fitting.

90. The compound container as set forth in claim 25 wherein the outer container is united to the inner container through fitting.

91. The compound container as set forth in claim 27 wherein the outer container is united to the inner container through fitting.

92. The compound container as set forth in claim 28 wherein the outer container is united to the inner container through fitting.

93. The compound container as set forth in claim 29 wherein the outer container is united to the inner container through fitting.

94. The compound container as set forth in claim 30 wherein the outer container is united to the inner container through fitting.

95. The compound container as set forth in claim 31 wherein the outer container is united to the inner container through fitting.

96. The compound container as set forth in claim 21 wherein the outer container is adhered to the inner container through an adhesive layer which is soluble in an alkaline solution.

97. The compound container as set forth in claim 22 wherein the outer container is adhered to the inner container through an adhesive layer which is soluble in an alkaline solution.

98. The compound container as set forth in claim 23 wherein the outer container is adhered to the inner container through an adhesive layer which is soluble in an alkaline solution.

99. The compound container as set forth in claim 24 wherein the outer container is adhered to the inner container through an adhesive layer which is soluble in an alkaline solution.

100. The compound container as set forth in claim 25 wherein the outer container is adhered to the inner container through an adhesive layer which is soluble in an alkaline solution.

101. The compound container as set forth in claim 26 wherein the outer container is adhered to the inner container through an adhesive layer which is soluble in an alkaline solution.

102. The compound container as set forth in claim 27 wherein the outer container is adhered to the inner container through an adhesive layer which is soluble in an alkaline solution.

103. The compound container as set forth in claim 28 wherein the outer container is adhered to the inner container through an adhesive layer which is soluble in an alkaline solution.

104. The compound container as set forth in claim 29 wherein the outer container is adhered to the inner container through an adhesive layer which is soluble in an alkaline solution.

105. The compound container as set forth in claim 30 wherein the outer container is adhered to the inner container through an adhesive layer which is soluble in an alkaline solution.

106. The compound container as set forth in claim 31 wherein the outer container is adhered to the inner container through an adhesive layer which is soluble in an alkaline solution.

107. The compound container as set forth in claim 32 wherein the outer container is adhered to the inner container through an adhesive layer which is soluble in an alkaline solution.

108. The compound container as set forth in claim 21 wherein the outer container is adhered to the inner container through an adhesive layer which is soluble in warmed water.

109. The compound container as set forth in claim 22 wherein the outer container is adhered to the inner container through an adhesive layer which is soluble in warmed water.

110. The compound container as set forth in claim 23 wherein the outer container is adhered to the inner container through an adhesive layer which is soluble in warmed water.

111. The compound container as set forth in claim 24 wherein the outer container is adhered to the inner container through an adhesive layer which is soluble in warmed water.

112. The compound container as set forth in claim 25 wherein the outer container is adhered to the inner container through an adhesive layer which is soluble in warmed water.

113. The compound container as set forth in claim 26 wherein the outer container is adhered to the inner container through an adhesive layer which is soluble in warmed water.

114. The compound container as set forth in claim 27 wherein the outer container is adhered to the inner container through an adhesive layer which is soluble in warmed water.

115. The compound container as set forth in claim 28 wherein the outer container is adhered to the inner container through an adhesive layer which is soluble in warmed water.

116. The compound container as set forth in claim 29 wherein the outer container is adhered to the inner container through an adhesive layer which is soluble in warmed water.

117. The compound container as set forth in claim 30 wherein the outer container is adhered to the inner container through an adhesive layer which is soluble in warmed water.

118. The compound container as set forth in claim 31 wherein the outer container is adhered to the inner container through an adhesive layer which is soluble in warmed water.

119. The compound container as set forth in claim 32 wherein the outer container is adhered to the inner container through an adhesive layer which is soluble in warmed water.

120. The compound container as set forth in claim 21 wherein the outer container is adhered to the inner container through a photodegradable or biodegradable adhesive layer.

121. The compound container as set forth in claim 22 wherein the outer container is adhered to the inner container through a photodegradable or biodegradable adhesive layer.

122. The compound container as set forth in claim 23 wherein the outer container is adhered to the inner container through a photodegradable or biodegradable adhesive layer.

123. The compound container as set forth in claim 24 wherein the outer container is adhered to the inner container through a photodegradable or biodegradable adhesive layer.

124. The compound container as set forth in claim 25 wherein the outer container is adhered to the inner container through a photodegradable or biodegradable adhesive layer.

125. The compound container as set forth in claim 26 wherein the outer container is adhered to the inner container through a photodegradable or biodegradable adhesive layer.

126. The compound container as set forth in claim 27 wherein the outer container is adhered to the inner container through a photodegradable or biodegradable adhesive layer.

127. The compound container as set forth in claim 28 wherein the outer container is adhered to the inner container through a photodegradable or biodegradable adhesive layer.

128. The compound container as set forth in claim 29 wherein the outer container is adhered to the inner container through a photodegradable or biodegradable adhesive layer.

129. The compound container as set forth in claim 30 wherein the outer container is adhered to the inner container through a photodegradable or biodegradable adhesive layer.

130. The compound container as set forth in claim 31 wherein the outer container is adhered to the inner container through a photodegradable or biodegradable adhesive layer.

131. The compound container as set forth in claim 32 wherein the outer container is adhered to the inner container through a photodegradable or biodegradable adhesive layer.

132. The compound container as set forth in claim 21 wherein the outer container is adhered to the inner container through an adhesive layer capable of being adhered thereto at the molding temperature of the inner container.

133. The compound container as set forth in claim 22 wherein the outer container is adhered to the inner container through an adhesive layer capable of being adhered thereto at the molding temperature of the inner container.

134. The compound container as set forth in claim 23 wherein the outer container is adhered to the inner container through an adhesive layer capable of being adhered thereto at the molding temperature of the inner container.

135. The compound container as set forth in claim 24 wherein the outer container is adhered to the inner container through an adhesive layer capable of being adhered thereto at the molding temperature of the inner container.

136. The compound container as set forth in claim 25 wherein the outer container is adhered to the inner container through an adhesive layer capable of being adhered thereto at the molding temperature of the inner container.

137. The compound container as set forth in claim 26 wherein the outer container is adhered to the inner container through an adhesive layer capable of being adhered thereto at the molding temperature of the inner container.

138. The compound container as set forth in claim 27 wherein the outer container is adhered to the inner container through an adhesive layer capable of being adhered thereto at the molding temperature of the inner container.

139. The compound container as set forth in claim 28 wherein the outer container is adhered to the inner container through an adhesive layer capable of being adhered thereto at the molding temperature of the inner container.

140. The compound container as set forth in claim 29 wherein the outer container is adhered to the inner container through an adhesive layer capable of being adhered thereto at the molding temperature of the inner container.

141. The compound container as set forth in claim 30 wherein the outer container is adhered to the inner container through an adhesive layer capable of being adhered thereto at the molding temperature of the inner container.

142. The compound container as set forth in claim 31 wherein the outer container is adhered to the inner container through an adhesive layer capable of being adhered thereto at the molding temperature of the inner container.

143. The compound container as set forth in claim 32 wherein the outer container is adhered to the inner container through an adhesive layer capable of being adhered thereto at the molding temperature of the inner container.

144. The compound container as set forth in claim 33 wherein the outer container is adhered to the inner container through an adhesive layer capable of being adhered thereto at the molding temperature of the inner container.

145. The compound container as set forth in claim 34 wherein the outer container is adhered to the inner container through an adhesive layer capable of being adhered thereto at the molding temperature of the inner container.

146. The compound container as set forth in claim 35 wherein the outer container is adhered to the inner container through an adhesive layer capable of being adhered thereto at the molding temperature of the inner container.

147. The compound container as set forth in claim 21 wherein the outer container is adhered to the inner container at the upper and lower portions thereof, while the middle portion of the outer container is not adhered to the inner container.

148. The compound container as set forth in claim 22 wherein the outer container is adhered to the inner container at the upper and lower portions thereof, while the middle portion of the outer container is not adhered to the inner container.

149. The compound container as set forth in claim 23 wherein the outer container is adhered to the inner container at the upper and lower portions thereof, while the middle portion of the outer container is not adhered to the inner container.

150. The compound container as set forth in claim 24 wherein the outer container is adhered to the inner container at the upper and lower portions thereof, while the middle portion of the outer container is not adhered to the inner container.

151. The compound container as set forth in claim 25 wherein the outer container is adhered to the inner container at the upper and lower portions thereof, while the middle portion of the outer container is not adhered to the inner container.

152. The compound container as set forth in claim 26 wherein the outer container is adhered to the inner container at the upper and lower portions thereof, while the middle portion of the outer container is not adhered to the inner container.

153. The compound container as set forth in claim 27 wherein the outer container is adhered to the inner container at the upper and lower portions thereof, while the middle portion of the outer container is not adhered to the inner container.

154. The compound container as set forth in claim 28 wherein the outer container is adhered to the inner container at the upper and lower portions thereof, while the middle portion of the outer container is not adhered to the inner container.

155. The compound container as set forth in claim 29 wherein the outer container is adhered to the inner container at the upper and lower portions thereof, while the middle portion of the outer container is not adhered to the inner container.

156. The compound container as set forth in claim 30 wherein the outer container is adhered to the inner container at the upper and lower portions thereof, while the middle portion of the outer container is not adhered to the inner container.

157. The compound container as set forth in claim 31 wherein the outer container is adhered to the inner container at the upper and lower portions thereof, while the middle portion of the outer container is not adhered to the inner container.

158. The compound container as set forth in claim 32 wherein the outer container is adhered to the inner container at the upper and lower portions thereof, while the middle portion of the outer container is not adhered to the inner container.

159. The compound container as set forth in claim 33 wherein the outer container is adhered to the inner container at the upper and lower portions thereof, while the middle portion of the outer container is not adhered to the inner container.

160. The compound container as set forth in claim 34 wherein the outer container is adhered to the inner container at the upper and lower portions thereof, while the middle portion of the outer container is not adhered to the inner container.

161. The compound container as set forth in claim 35 wherein the outer container is adhered to the inner container at the upper and lower portions thereof, while the middle portion of the outer container is not adhered to the inner container.

162. The compound container as set forth in claim 38 wherein it is designed such that the following relation holds: the molding temperature of the inner container>the softening point of the adhesive on the upper and lower portions>content-charging temperature>the softening point of the adhesive on the middle portion.

163. The compound container as set forth in claim 21 wherein the outer container is provided with a perforation formed thereon, which starts from either the upper or lower end and extends towards the other end and a non-adhered area is formed between the outer and inner containers along the perforation.

164. The compound container as set forth in claim 22 wherein the outer container is provided with a perforation formed thereon, which starts from either the upper or lower end and extends towards the other end and a non-adhered area is formed between the outer and inner containers along the perforation.

165. The compound container as set forth in claim 23 wherein the outer container is provided with a perforation formed thereon, which starts from either the upper or lower end and extends towards the other end and a non-adhered area is formed between the outer and inner containers along the perforation.

166. The compound container as set forth in claim 24 wherein the outer container is provided with a perforation formed thereon, which starts from either the upper or lower end and extends towards the other end and a non-adhered area is formed between the outer and inner containers along the perforation.

167. The compound container as set forth in claim 25 wherein the outer container is provided with a perforation formed thereon, which starts from either the upper or lower end and extends towards the other end and a non-adhered area is formed between the outer and inner containers along the perforation.

168. The compound container as set forth in claim 26 wherein the outer container is provided with a perforation formed thereon, which starts from either the upper or lower end and extends towards the other end and a non-adhered area is formed between the outer and inner containers along the perforation.

169. The compound container as set forth in claim 27 wherein the outer container is provided with a perforation formed thereon, which starts from either the upper or lower end and extends towards the other end and a non-adhered area is formed between the outer and inner containers along the perforation.

170. The compound container as set forth in claim 28 wherein the outer container is provided with a perforation formed thereon, which starts from either the upper or lower end and extends towards the other end and a non-adhered area is formed between the outer and inner containers along the perforation.

171. The compound container as set forth in claim 29 wherein the outer container is provided with a perforation formed thereon, which starts from either the upper or lower 172. The compound container as set forth in claim 30 wherein the outer container is provided with a perforation formed thereon, which starts from either the upper or lower end and extends towards the other end and a non-adhered area is formed between the outer and inner containers along the perforation.

173. The compound container as set forth in claim 31 wherein the outer container is provided with a perforation formed thereon, which starts from either the upper or lower end and extends towards the other end and a non-adhered area is formed between the outer and inner containers along the perforation.

174. The compound container as set forth in claim 32 wherein the outer container is provided with a perforation formed thereon, which starts from either the upper or lower end and extends towards the other end and a non-adhered area is formed between the outer and inner containers along the perforation.

175. The compound container as set forth in claim 33 wherein the outer container is provided with a perforation formed thereon, which starts from either the upper or lower end and extends towards the other end and a non-adhered area is formed between the outer and inner containers along the perforation.

176. The compound container as set forth in claim 34 wherein the outer container is provided with a perforation formed thereon, which starts from either the upper or lower end and extends towards the other end and a non-adhered area is formed between the outer and inner containers along the perforation.

177. The compound container as set forth in claim 35 wherein the outer container is provided with a perforation formed thereon, which starts from either the upper or lower end and extends towards the other end and a non-adhered area is formed between the outer and inner containers along the perforation.

178. The compound container as set forth in claim 36 wherein the outer container is provided with a perforation formed thereon, which starts from either the upper or lower end and extends towards the other end and a non-adhered area is formed between the outer and inner containers along the perforation.

179. The compound container as set forth in claim 1 wherein the outer container is provided with a perforation formed thereon, which starts from either the upper or lower end and extends towards the other end and a non-adhered area is formed between the outer and inner containers along the perforation.

180. The compound container as set forth in claim 37 wherein the outer container is provided with a perforation formed thereon, which starts from either the upper or lower end and extends towards the other end and a non-adhered area is formed between the outer and inner containers along the perforation.

181. The compound container as set forth in claim 38 wherein the outer container is provided with a perforation formed thereon, which starts from either the upper or lower end and extends towards the other end and a non-adhered area is formed between the outer and inner containers along the perforation.

182. The compound container as set forth in claim 40 wherein it is provided with a plurality of perforations.

183. The compound container as set forth in claim 41 wherein it is provided with a plurality of perforations.

184. The compound container as set forth in claim 40 wherein the perforation reaches the upper and lower ends of the outer container.

185. The compound container as set forth in claim 41 wherein the perforation reaches the upper and lower ends of the outer container.

186. The compound container as set forth in claim 42 wherein the perforation reaches the upper and lower ends of the outer container.

187. The compound container as set forth in claim 40 wherein the perforation extends spirally.

188. The compound container as set forth in claim 41 wherein the perforation extends spirally.

189. The compound container as set forth in claim 42 wherein the perforation extends spirally.

190. The compound container as set forth in claim 43 wherein the perforation extends spirally.

191. The compound container as set forth in claim 40 wherein a knob is formed at the end of the perforation on the outer container.

192. The compound container as set forth in claim 41 wherein a knob is formed at the end of the perforation on the outer container.

193. The compound container as set forth in claim 42 wherein a knob is formed at the end of the perforation on the outer container.

194. The compound container as set forth in claim 43 wherein a knob is formed at the end of the perforation on the outer container.

195. The compound container as set forth in claim 44 wherein a knob is formed at the end of the perforation on the outer container.

196. The compound container as set forth in any one of claims 2 to 19 wherein the outer container has an opening for exposing a part of the inner container and the surface of a window of the inner container exposed at the opening is in consistent with the surface of the side wall of the outer container.

197. The compound container as set forth in any one of claims 22 to 36 and 37 to 45 wherein the outer container has an opening for exposing a part of the inner container and the surface of a window of the inner container exposed at the opening is in consistent with the surface of the side wall of the outer container.

198. The compound container as set forth in any one of claims 48 to 195 wherein the outer container has an opening for exposing a part of the inner container and the surface of a window of the inner container exposed at the opening is in consistent with the surface of the side wall of the outer container.

199. The compound container as set forth in claim 1, wherein the outer container is a rectangular body.

200. The compound container as set forth in any one of claims 1 to 20, wherein the outer container is a rectangular body.

* * * * *